(12) United States Patent
Ren et al.

(10) Patent No.: US 11,265,127 B2
(45) Date of Patent: Mar. 1, 2022

(54) METHOD AND APPARATUS FOR TRANSMITTING DMRS

(71) Applicant: Huawei Technologies Co., Ltd., Shenzhen (CN)

(72) Inventors: Xiang Ren, Shanghai (CN); Yong Liu, Shanghai (CN); Shibin Ge, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 16/566,362

(22) Filed: Sep. 10, 2019

(65) Prior Publication Data

US 2020/0007303 A1 Jan. 2, 2020

Related U.S. Application Data

(63) Continuation of application No. PCT/CN2018/080723, filed on Mar. 27, 2018.

(30) Foreign Application Priority Data

Apr. 1, 2017 (CN) .......................... 201710214876.X

(51) Int. Cl.
*H04L 5/00* (2006.01)
*H04L 5/02* (2006.01)
*H04L 5/10* (2006.01)

(52) U.S. Cl.
CPC .......... *H04L 5/0051* (2013.01); *H04L 5/0092* (2013.01); *H04L 5/023* (2013.01); *H04L 5/10* (2013.01)

(58) Field of Classification Search
None
See application file for complete search history.

(56) References Cited

U.S. PATENT DOCUMENTS

2011/0170631 A1* 7/2011 Kim ...................... H04L 1/0606
375/296
2011/0194551 A1* 8/2011 Lee ...................... H04B 7/0626
370/342
(Continued)

FOREIGN PATENT DOCUMENTS

CN 103179664 A 6/2013
CN 103944665 A 7/2014
(Continued)

OTHER PUBLICATIONS

"DMRS designs for NR MIMO," 3GPP TSG RAN WG1 Meeting #88bis, Spokane, USA, R1-1705814, 12 pages, 3rd Generation Partnership Project—Valbonne, France (Apr. 3-7, 2017).
(Continued)

*Primary Examiner* — Jamaal Henson
(74) *Attorney, Agent, or Firm* — Leydig, Voit & Mayer, Ltd.

(57) ABSTRACT

Embodiments of this application disclose a method and an apparatus for transmitting a DMRS, and relate to the field of communications technologies. The method and the apparatus are applicable to an NR system. The method for transmitting a DMRS may include: determining a time-frequency resource used to carry a DMRS; and then sending the DMRS by using the time-frequency resource.

20 Claims, 20 Drawing Sheets

(56) References Cited

U.S. PATENT DOCUMENTS

| | | | | |
|---|---|---|---|---|
| 2011/0310825 | A1* | 12/2011 | Hu | H04L 27/2613 |
| | | | | 370/329 |
| 2012/0114021 | A1* | 5/2012 | Chung | H04B 7/15557 |
| | | | | 375/211 |
| 2012/0245474 | A1* | 9/2012 | Ofek | A61B 5/377 |
| | | | | 600/483 |
| 2012/0275414 | A1* | 11/2012 | Hu | H04B 7/0452 |
| | | | | 370/329 |
| 2013/0265980 | A1* | 10/2013 | Zhu | H04B 7/0452 |
| | | | | 370/329 |
| 2015/0271814 | A1* | 9/2015 | Park | H04L 5/0082 |
| | | | | 370/329 |
| 2018/0270799 | A1* | 9/2018 | Noh | H04L 1/1812 |
| 2018/0278395 | A1* | 9/2018 | Yoon | H04L 5/0007 |
| 2020/0044809 | A1 | 2/2020 | Zhang | |

FOREIGN PATENT DOCUMENTS

| | | |
|---|---|---|
| CN | 103944847 A | 7/2014 |
| CN | 106534001 A | 3/2017 |
| CN | 108667586 B | 8/2019 |
| CN | 108989009 B | 8/2019 |
| WO | 2013117231 A1 | 8/2013 |
| WO | 2014113971 A1 | 7/2014 |
| WO | 2016008101 A1 | 1/2016 |

OTHER PUBLICATIONS

"Considerations on DMRS pattern design for NR," 3GPP TSG RAN WG1 Meeting #88-bis, R1-1705794, XP051252188, pp. 1-5, 3rd Generation Partnership Project—Valbonne, France (Apr. 3-7, 2017).

"Principles for DL Reference Signal Design and QCL Assumptions," 3GPP TSG RAN WG1 Meeting #86b, Lisbon Portugal, R1-1608816, 3rd Generation Partnership Project—Valbonne, France (Oct. 10-14, 2016).

"On downlink DMRS pattern," 3GPP TSG-RAN WG1 Meeting #88 bis, Spokane, USA, R1-1704469, 3 pages, 3rd Generation Partnership Project—Valbonne, France (Apr. 3-7, 2017).

"DMRS design for NR PDCCH," 3GPP TSG RAN WG1 Meeting #88bis, Spokane, USA, R1-1704744, XP051251472, 6 pages, 3rd Generation Partnership Project—Valbonne, France (Apr. 3-7, 2017).

"WF on NR DMRS," 3GPP TSG RAN WG1 Meeting #86bis, Lisbon, Portugal, R1-1610491, 3 pages, 3rd Generation Partnership Project—Valbonne, France (Oct. 10-14, 2016).

"Considerations on DMRS pattern design for NR," 3GPP TSG RAN WG1 Meeting #88-bis, Spokane, USA, R1-1705794, pp. 1-5, 3rd Generation Partnership Project—Valbonne, France (Apr. 3-7, 2017).

"On DMRS design for DL," 3GPP TSG RAN WG1 Meeting #90, Prague, Czechia, R1-1712383, XP051315199, 8 pages, 3rd Generation Partnership Project—Valbonne (Aug. 21-25, 2017).

"Details of QCL assumptions and related RS design considerations," 3GPP TSG RAN WG1 Meeting #87, Reno, USA, R1-1611239, 5 pages, 3rd Generation Partnership Project—Valbonne, France (Nov. 14-18, 2016).

"On the DMRS pattern," 3GPP TSG-RAN WG1 Meeting #88, R1-1702742, Athens, Greece, 8 pages, 3rd Generation Partnership Project—Valbonne, France (Feb. 13-17, 2017).

"Study of DM-RS pattern for NR," 3GPP TSG RAN WG1, Meeting #87, Reno, US, R1-1611974, 7 pages, 3rd Generation Partnership Project—Valbonne, France (Nov. 14-18, 2016).

"Views on DL DMRS," 3GPP TSG-RAN WG1 #87, Reno, Nevada, R1-1612051, 7 pages, 3rd Generation Partnership Project—Valbonne, France (Nov. 14-18, 2016).

"Demodulation reference signal design principles," 3GPP TSG-RAN WG1 Meeting #87, Reno, USA, R1-1612325, 4 pages, 3rd Generation Partnership Project—Valbonne, France (Nov. 14-18, 2016).

"DMRS Design Aspects for NR," 3GPP TSG RAN WG1 Meeting #87, Reno, USA, R1-1612497, 3 pages, 3rd Generation Partnership Project—Valbonne, France (Nov. 14-18, 2016).

"A view on the maximum number of orthogonal DL DMRS ports for NR MU-MIMO," 3GPP TSG-RAN WG1 #87, Reno, Nevada, R1-1612839, 4 pages, 3rd Generation Partnership Project—Valbonne, France (Nov. 14-18, 2016).

"Summary of [87-28] email discussion on DMRS design for DL data channel," 3GPP TSG RAN WG1 NR Ad-Hoc Meeting, Spokane, USA, R1-1700479, 15 pages, 3rd Generation Partnership Project—Valbonne, France (Jan. 16-20, 2017).

"Evaluation results of DMRS design for DL data channel," 3GPP TSG RAN WG1 Meeting #88, Athens, Greece, R1-1701693, 14 pages, 3rd Generation Partnership Project—Valbonne, France (Feb. 13-17, 2017).

"Discussion on downlink DMRS design," 3GPP TSG RAN WG1 Meeting #88, Athens, Greece, R1-1701815, 12 pages, 3rd Generation Partnership Project—Valbonne, France (Feb. 13-17, 2017).

"Discussion on uplink DMRS design," 3GPP TSG RAN WG1 Meeting #88, Athens, Greece, R1-1701816, 5 pages, 3rd Generation Partnership Project—Valbonne, France (Feb. 13-17, 2017).

"Discussion on DMRS Design and Evaluation Results," 3GPP TSG-RAN WG1 NR Ad Hoc, Athens, Greece, R1-1702024, 7 pages, 3rd Generation Partnership Project—Valbonne, France (Feb. 13-17, 2017).

"Evaluation results for DL DMRS," 3GPP TSG RAN WG1 Meeting #88, R1-1702074, 5 pages, 3rd Generation Partnership Project—Valbonne, France (Feb. 13-17, 2017).

"Additional evaluations results for DM-RS," 3GPP TSG RAN WG1 Meeting #88, Athens, Greece, R1-1702212, 7 pages, 3rd Generation Partnership Project—Valbonne, France (Feb. 13-17, 2017).

"Evaluation of DL DMRS design," 3GPP TSG RAN WG1 Meeting #88, R1-1702605, 51 pages, 3rd Generation Partnership Project—Valbonne, France (Feb. 13-17, 2017).

Huawei, HiSilicon, "Discussion on UE REFSENS SNR and simulation results," 3GPP TSG-RAN WG4 Meeting #85, Reno, Nevada, USA, R4-1714027, total 7 pages, 3rd Generation Partnership Project, Valbonne, France (Nov. 27-Dec. 1, 2017).

* cited by examiner (a) (b)

DMRS port group (three DMRS ports)

⟍ First DMRS port group

▦ Second DMRS port group (a) (b)

⟍ DMRS port group (six DMRS ports)

DMRS port group (three DMRS ports)

DMRS port group (six DMRS ports)

DMRS port group (six DMRS ports)

DMRS port group (six DMRS ports)

▨ First DMRS port group  ⊞ Second DMRS port group

DMRS port group (six DMRS ports)

▨ First DMRS port group  ⊞ Second DMRS port group

METHOD AND APPARATUS FOR TRANSMITTING DMRS

CROSS-REFERENCE TO RELATED APPLICATIONS

This application is a continuation of International Application No. PCT/CN2018/080723, filed on Mar. 27, 2018, which claims priority to Chinese Patent Application No. 201710214876.X, filed on Apr. 1, 2017. The disclosures of the aforementioned applications are hereby incorporated by reference in their entireties.

TECHNICAL FIELD

Embodiments of this application relate to the field of communications technologies, and in particular, to a method and an apparatus for transmitting a demodulation reference signal (DMRS).

BACKGROUND

In an existing long term evolution (LTE) standard, single user (SU) multiple-input multiple-output (MIMO) supports multiplexing for a maximum of eight layers of orthogonal DMRS ports, and a DMRS occupies 24 REs. Specifically, the DMRS ports may be mapped to a subcarrier 0, a subcarrier 1, a subcarrier 5, a subcarrier 6, a subcarrier 10, and a subcarrier 11 of each resource block (RB) pair in frequency domain, and the DMRS ports may be mapped to a symbol 5, a symbol 6, a symbol 12, and a symbol 13 of each subframe in a time domain, as shown in FIG. 1.

The foregoing technical solution is not applicable to a new radio (NR) system. For example, a DMRS in LTE is placed in the middle or rear of each subframe. A receive end needs to receive all DMRSs before performing data demodulation. Consequently, a requirement for rapid data demodulation in NR cannot be satisfied.

SUMMARY

This application provides a method and an apparatus for transmitting a DMRS, which are applicable to an NR system.

According to a first aspect, this application provides a method and an apparatus for determining a time-frequency resource used to carry a DMRS.

In a possible design, the method may include: determining a time-frequency resource used to carry a DMRS. For a related description of the time-frequency resource, refer to the following descriptions.

Correspondingly, this application further provides the apparatus for determining a time-frequency resource used to carry a DMRS. The apparatus may implement the method for determining a time-frequency resource used to carry a DMRS. For example, the apparatus may be a chip (for example, a baseband chip or a communications chip) or a transmit end (for example, a base station or a terminal). The apparatus may implement the foregoing method by using software or hardware or by using hardware by executing corresponding software.

In a possible design, the apparatus may include a processor and a memory. The processor is configured to support the apparatus in performing corresponding functions in the foregoing method for determining a time-frequency resource used to carry a DMRS. The memory is configured to be coupled to the processor, and store a program (an instruction) and data that are necessary for the apparatus. Optionally, the apparatus may further include a communications interface, configured to support communication between the apparatus and another network element. The communications interface may be a transceiver.

In another possible design, the apparatus may include: a determining unit, configured to determine a time-frequency resource used to carry a DMRS. For a related description of the time-frequency resource, refer to the following descriptions.

According to a second aspect, this application provides a method and an apparatus for sending a DMRS.

In a possible design, the method may include: determining a time-frequency resource used to carry a DMRS; and then sending the DMRS by using the time-frequency resource, that is, determining the time-frequency resource used to carry the DMRS, and then sending the DMRS by using the determined time-frequency resource.

In a possible design, the DMRS is carried in at least one resource unit; and if a total quantity of system-supported DMRS ports is 6, in each resource unit, a time-frequency resource occupied by the DMRS includes a first symbol in time domain, and includes any one of the following subcarriers in frequency domain: a subcarrier 6n, a subcarrier 6n+1, a subcarrier 6n+2, a subcarrier 6n+3, a subcarrier 6n+4, and a subcarrier 6n+5, where n may be any one or more integers greater than or equal to 0 and less than $\lfloor M/6 \rfloor$. For a specific example and a related description thereof, refer to (a) in FIG. 7. It can be understood that the "DMRS" herein is a reference signal; the "time-frequency resource used to carry a DMRS" may be understood as an RE that is in one or more resource units and that is used to carry the DMRS; and the "time-frequency resource occupied by the DMRS in each resource unit" is an RE that is in one resource unit and that is used to carry the DMRS. These terms in the following examples have similar meanings as those described above, and therefore details are not described.

In a possible design, the DMRS is carried in at least one resource unit; and if a total quantity of system-supported DMRS ports is 6, the six DMRS ports are divided into three DMRS port groups, and a same time-frequency resource is multiplexed for DMRS ports in each DMRS port group in a CDM manner, in each resource unit, a time-frequency resource occupied by the DMRS includes a first symbol in time domain, and includes any one of the following subcarriers in frequency domain: a subcarrier 3n, a subcarrier 3n+1, and a subcarrier 3n+2, where n may be any one or more integers greater than or equal to 0 and less than $\lfloor M/3 \rfloor$; and for a specific example and a related description thereof, reference may be made to (a) in FIG. 8.

In a possible design, the DMRS is carried in at least one resource unit; and if a total quantity of system-supported DMRS ports is 6, in each resource unit, a time-frequency resource occupied by the DMRS has any one of the following features:

when the time-frequency resource occupied by the DMRS is a first symbol in time domain, the time-frequency resource includes a subcarrier 6n of the resource unit in frequency domain; and when the time-frequency resource occupied by the DMRS is a second symbol in time domain, the time-frequency resource includes a subcarrier 6n+3 of the resource unit in frequency domain;

when the time-frequency resource occupied by the DMRS is a first symbol in time domain, the time-frequency resource includes a subcarrier 6n+1 of the resource unit in frequency domain; and when the time-frequency resource occupied by the DMRS is a second symbol in time domain, the time-frequency resource includes a subcarrier 6n+4 of the resource unit in frequency domain;

when the time-frequency resource occupied by the DMRS is a first symbol in time domain, the time-frequency resource includes a subcarrier 6n+2 of the resource unit in frequency domain; and when the time-frequency resource occupied by the DMRS is a second symbol in time domain, the time-frequency resource includes a subcarrier 6n+5 of the resource unit in frequency domain;

when the time-frequency resource occupied by the DMRS is a first symbol in time domain, the time-frequency resource includes a subcarrier 6n+3 of the resource unit in frequency domain; and when the time-frequency resource occupied by the DMRS is a second symbol in time domain, the time-frequency resource includes a subcarrier 6n of the resource unit in frequency domain;

when the time-frequency resource occupied by the DMRS is a first symbol in time domain, the time-frequency resource includes a subcarrier 6n+4 of the resource unit in frequency domain; and when the time-frequency resource occupied by the DMRS is a second symbol in time domain, the time-frequency resource includes a subcarrier 6n+1 of the resource unit in frequency domain; or when the time-frequency resource occupied by the DMRS is a first symbol in time domain, the time-frequency resource includes a subcarrier 6n+5 of the resource unit in frequency domain; and when the time-frequency resource occupied by the DMRS is a second symbol in time domain, the time-frequency resource includes a subcarrier 6n+2 of the resource unit in frequency domain, where n may be any one or more integers greater than or equal to 0 and less than $\lfloor M/6 \rfloor$; and for a specific example and a related description thereof, reference may be made to (c) in FIG. 11.

In a possible design, the DMRS is carried in at least one resource unit; and if a total quantity of system-supported DMRS ports is 6, the six DMRS ports are divided into three DMRS port groups, and a same time-frequency resource is multiplexed for DMRS ports in each DMRS port group in a CDM manner, in each resource unit, a time-frequency resource occupied by the DMRS has any one of the following features:

when the time-frequency resource occupied by the DMRS is a first symbol in time domain, the time-frequency resource includes a subcarrier 3n of the resource unit in frequency domain; and when the time-frequency resource occupied by the DMRS is a second symbol in time domain, the time-frequency resource includes a subcarrier 3n+2 of the resource unit in frequency domain;

when the time-frequency resource occupied by the DMRS is a first symbol in time domain, the time-frequency resource includes a subcarrier 3n+1 of the resource unit in frequency domain; and when the time-frequency resource occupied by the DMRS is a second symbol in time domain, the time-frequency resource includes a subcarrier 3n of the resource unit in frequency domain; or when the time-frequency resource occupied by the DMRS is a first symbol in time domain, the time-frequency resource includes a subcarrier 3n+2 of the resource unit in frequency domain; and when the time-frequency resource occupied by the DMRS is a second symbol in time domain, the time-frequency resource includes a subcarrier 3n+1 of the resource unit in frequency domain, where n may be any one or more integers greater than or equal to 0 and less than $\lfloor M/3 \rfloor$; and for a specific example and a related description thereof, reference may be made to (c) in FIG. 12.

It can be understood that the foregoing lists features of a time-frequency resource occupied by one DMRS in different situations. During specific implementation, for features in other examples in the following, refer to features of a time-frequency resource occupied by one DMRS in other situations in the foregoing manner, and features of time-frequency resources occupied by a plurality of DMRSs may be inferred based on the features. Details are not described herein.

Correspondingly, this application further provides the apparatus for sending a DMRS. The apparatus may implement the method for sending a DMRS according to the second aspect. For example, the apparatus may be a transmit end (for example, a base station or a terminal), and may implement the foregoing method by using software or hardware or by using hardware by executing corresponding software.

In a possible design, the apparatus may include a processor and a memory. The processor is configured to support the apparatus in performing corresponding functions in the method according to the second aspect. The memory is configured to be coupled to the processor, and store a program (an instruction) and data that are necessary for the apparatus. Optionally, the apparatus may further include a communications interface, configured to support communication between the apparatus and another network element. The communications interface may be a transceiver.

In another possible design, the apparatus may include a determining unit and a sending unit. The determining unit is configured to determine a time-frequency resource used to carry a DMRS. The sending unit is configured to send the DMRS by using the time-frequency resource.

According to a third aspect, this application provides a method and an apparatus for obtaining a DMRS.

In a possible design, the method may include: determining a time-frequency resource used to carry a DMRS; and then obtaining the DMRS by using the time-frequency resource.

Correspondingly, this application further provides the apparatus for obtaining a DMRS. The apparatus may implement the method for obtaining a DMRS according to the third aspect. For example, the apparatus may be a receive end (for example, a base station or a terminal), and may implement the foregoing method by using software or hardware or by using hardware by executing corresponding software.

In a possible design, the apparatus may include a processor and a memory. The processor is configured to support the apparatus in performing corresponding functions in the method according to the third aspect. The memory is configured to be coupled to the processor, and store a program (an instruction) and data that are necessary for the apparatus. Optionally, the apparatus may further include a communications interface, configured to support communication between the apparatus and another network element. The communications interface may be a transceiver.

In another possible design, the apparatus may include a determining unit and an obtaining unit. The determining unit may be configured to determine a time-frequency resource used to carry a DMRS. The obtaining unit may be configured to obtain the DMRS by using the time-frequency resource.

According to a fourth aspect, this application provides an indication method and apparatus.

In a possible design, the method may include: generating indication information, where the indication information is used to indicate a time-frequency resource used to carry a DMRS; and then sending the indication information. The method may be performed by a base station. Optionally, the indication information may be information used to indicate a pilot pattern, for example, an index of a pilot pattern, and is used to instruct a terminal to determine a pilot pattern used by the base station in a current scheduling process. This optional implementation is applicable to a scenario in which a plurality of pilot patterns may be used during communication between the base station and the terminal. Optionally, the indication information may be information used to indicate a DMRS port, for example, a DMRS port identifier (for example, a DMRS port number), and is used to instruct a terminal to determine a DMRS port allocated by the base station to the terminal in a current scheduling process. This optional implementation is applicable to a scenario in which one or more pilot patterns may be used during communication between the base station and the terminal.

Correspondingly, this application further provides the apparatus for sending a DMRS. The apparatus may implement the indication method according to the fourth aspect. For example, the apparatus may be a base station, and may implement the foregoing method by using software or hardware or by using hardware by executing corresponding software.

In a possible design, the apparatus may include a processor and a memory. The processor is configured to support the apparatus in performing corresponding functions in the method according to the fourth aspect. The memory is configured to be coupled to the processor, and store a program (an instruction) and data that are necessary for the apparatus. Optionally, the apparatus may further include a communications interface, configured to support communication between the apparatus and another network element. The communications interface may be a transceiver.

In another possible design, the apparatus may include a generation unit and a sending unit. The generation unit is configured to generate indication information, where the indication information is used to indicate a time-frequency resource used to carry a DMRS. The sending unit is configured to send the indication information.

According to a fifth aspect, this application provides a method and an apparatus for determining a time-frequency resource.

In a possible design, the method may include: receiving indication information, where the indication information is used to indicate a time-frequency resource used to carry a DMRS; and then determining, based on the indication information, the time-frequency resource used to carry the DMRS.

Correspondingly, this application further provides the apparatus for obtaining a DMRS. The apparatus may implement the method for determining a time-frequency resource according to the fifth aspect. For example, the apparatus may be a terminal, and may implement the foregoing method by using software or hardware or by using hardware by executing corresponding software.

In a possible design, the apparatus may include a processor and a memory. The processor is configured to support the apparatus in performing corresponding functions in the method according to the fifth aspect. The memory is configured to be coupled to the processor, and store a program (an instruction) and data that are necessary for the apparatus. In addition, the apparatus may further include a communications interface, configured to support communication between the apparatus and another network element. The communications interface may be a transceiver.

In another possible design, the apparatus may include a receiving unit and a determining unit. The receiving unit is configured to receive indication information, where the indication information is used to indicate a time-frequency resource used to carry a DMRS. The determining unit is configured to determine, based on the indication information, the time-frequency resource used to carry the DMRS.

This application further provides a computer storage medium. The computer storage medium stores a computer program (an instruction). When the program (instruction) runs on a computer, the computer performs the method according to any one of the foregoing aspects.

This application further provides a computer program product. When the computer program product runs on a computer, the computer performs the method according to any one of the foregoing aspects.

The foregoing provided time-frequency resource used to carry the DMRS has a mapping relationship with the DMRS port. Therefore, this application further provides several mapping rules between a DMRS port and a time-frequency resource. For a detailed description of each rule and analysis of a beneficial effect of the rule, refer to the following specific implementations. Details are not described herein.

It can be understood that any one of the foregoing provided apparatuses, computer storage medium, or computer program product is configured to perform the foregoing provided corresponding method. A beneficial effect that can be achieved by using the foregoing provided method is related to the mapping relationship between a time-frequency resource used to carry a DMRS and a DMRS port. Therefore, for a beneficial effect that can be achieved by the apparatuses, computer storage medium, or computer program product, refer to a beneficial effect of a corresponding solution in the following specific implementations. Details are not described herein.

DESCRIPTION OF EMBODIMENTS

First, terms related to this specification are briefly described to help a reader have a better understanding.

(1) Resource Unit

Similar to an RB and an RB pair in the LTE standard, a resource unit is provided in some embodiments of this application. The resource unit may be used as a basic unit for scheduling a terminal to perform resource allocation, or may be used to describe an arrangement manner of a plurality of reference signals.

The resource unit may include a plurality of consecutive subcarriers in frequency domain and one time interval (TI) in time domain. In different scheduling processes, sizes of resource units may be the same or different. The TI herein may be a transmission time interval (TTI) in an LTE system, a symbol-level short TTI, a short TTI of a large subcarrier spacing in a high-frequency system, a slot or a mini-slot in a 5G system, or the like. This is not limited in this application.

Figure 1:
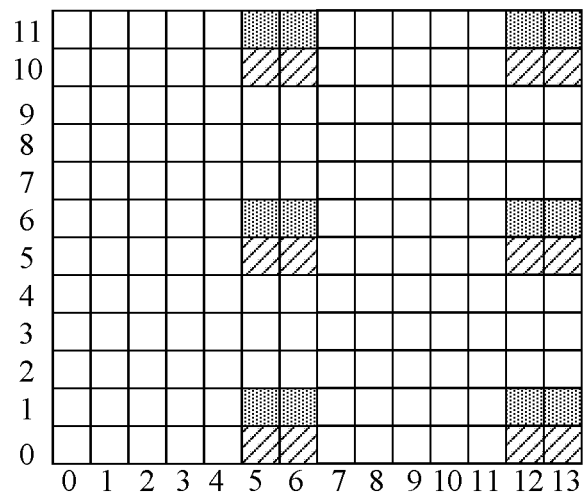
FIG. 1 is a schematic diagram of a pilot pattern according to the prior art.
Figure 2:
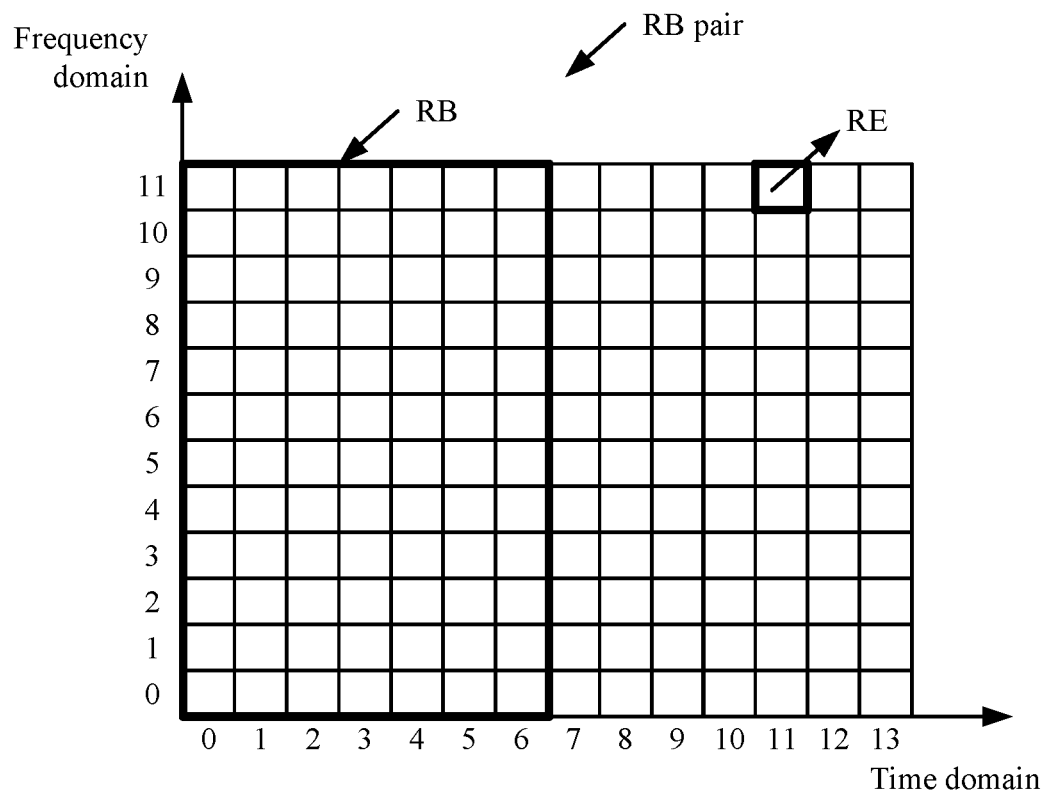
FIG. 2 is a schematic diagram of a resource unit according to an embodiment of this application.

Optionally, one resource unit may include one or more RBs, one or more RB pairs, or the like, or may be half an RB or the like. Alternatively, one resource unit may be another time-frequency resource. This is not limited in this application. One RB pair includes 12 consecutive subcarriers in frequency domain and one subframe in time domain. A time-frequency resource that includes one subcarrier in frequency domain and one symbol in time domain is a resource element (RE), as shown in FIG. 2. An RB pair in FIG. 2 includes 12 consecutive subcarriers (numbered from 0 to 11) in frequency domain and 14 symbols (numbered from 0 to 13) in time domain. In FIG. 2, a horizontal coordinate axis indicates a time domain and vertical coordinate axis indicates frequency domain. It should be noted that the accompanying drawings that are included in this application and that indicate a time-frequency domain resource are described by using the RB pair shown in FIG. 2 as an example. A person skilled in the art may understand that this is not limited during specific implementation. It can be understood that a "symbol" in this application may include, but is not limited to, any one of the following: an orthogonal frequency division multiplexing (OFDM) symbol, a universal filtered multi-carrier (UFMC) signal, a filter bank multi-carrier (FBMC) symbol, a generalized frequency-division multiplexing (GFDM) symbol, and the like.

(2) DMRS Port Group

A "DMRS port group" in this application is a logical concept introduced to clearly describe the technical solutions provided in this application, and specifically, is a logical concept introduced to clearly describe a pilot pattern or a variation of the pilot pattern provided in this application. It can be understood that during actual implementation, a base station and a terminal may not perform an action of grouping DMRS ports. Any manner used to design the pilot pattern or the variation of the pilot pattern described in this application shall fall within the protection scope of this application.

One DMRS port group may include one or more DMRS ports. In this application, a same time-frequency resource is multiplexed for DMRSs corresponding to ports in a DMRS port group in a (code division multiplexing (CDM) manner, for example, by using a method such as orthogonal cover code (OCC), cyclic shift (CS), or cyclic phase rotation. A technical solution in which a time-frequency resource is multiplexed for a plurality of reference signals in a CDM manner has been clearly described in the prior art. Details are not described in this specification.

(3) System-Supported DMRS Port

A system-supported DMRS port may be considered as a DMRS port that can be used by a base station. During actual implementation, the base station may schedule the terminal by using some or all DMRS ports supported by the base station. In this application, that a quantity of system-supported DMRS ports is 6, 8, 12, or 16 is used as an example for description.

(4) Other Terms

The term "a plurality of" in this specification means at least two.

The terms "first", "second", and the like in this specification are merely used to differentiate different objects, but are not intended to limit a sequence of the terms. For example, a first symbol group and a second symbol group are merely used to differentiate different symbol groups, but are not intended to limit a sequence of the symbol groups.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes the technical solutions provided in this application with reference to the accompanying drawings.

The technical solutions provided in this application may be applied to various communications systems, for example, current 2G, 3G, and 4G communications systems, and a future evolved network such as a 5G communications system. For example, the communications systems may be an LTE system, a 3rd generation partnership project (3GPP) related cellular system, and other communications systems. Particularly, the technical solutions may be applied to a 5G NR system. It should be noted that a 5G standard may include scenarios such as machine to machine (M2M), D2M, macro-micro communication, enhanced mobile broadband (eMBB), ultra-reliable and low latency communications (uRLLC), and massive Internet of things communication (massive machine type communication, mMTC). These scenarios may include, but are not limited to, a communication scenario between terminals, a communication scenario between base stations, a communication scenario between a base station and a terminal, and the like. The technical solutions provided in the embodiments of this application may be further applied to a scenario of communication between terminals, communication between base stations, or the like in a 5G communications system.

Figure 3:
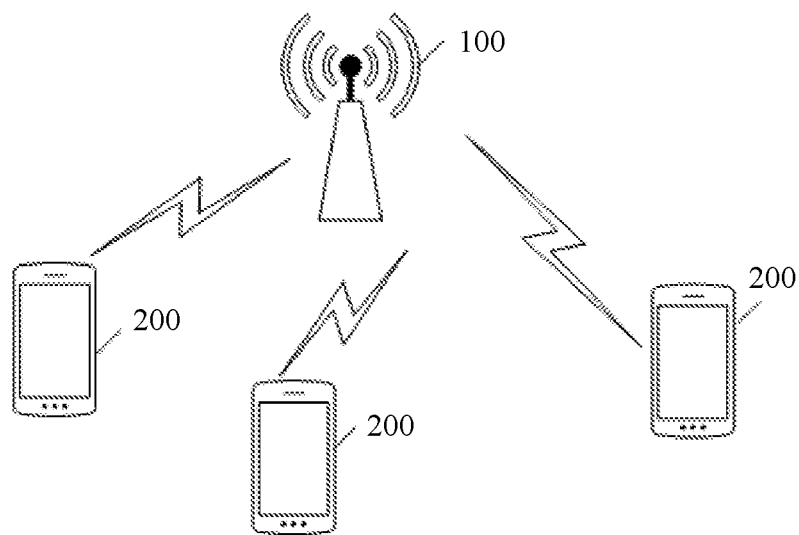
FIG. 3 is a schematic diagram of a system architecture to which a technical solution is applied according to an embodiment of this application.

The technical solutions provided in the embodiments of this application may be applied to a system architecture shown in FIG. 3. The system architecture may include a base station 100 and one or more terminals 200 connected to the base station 100.

Figure 4:
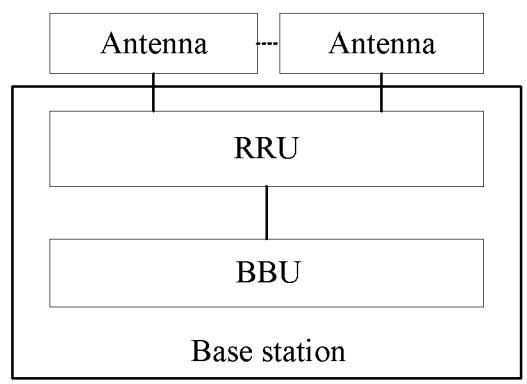
FIG. 4 is a schematic structural diagram of a base station according to an embodiment of this application.

In an example, the base station 100 may be implemented by using a structure shown in FIG. 4.

The base station 100 may be a device that can communicate with the terminal 200. The base station 100 may be a relay station, an access point, or the like. The base station 100 may be a base transceiver station (BTS) in a global system for mobile communications (GSM) or a code division multiple access (CDMA) network, may be an NB (NodeB) in wideband code division multiple access (WCDMA), or may be an eNB or an eNodeB (evolutional NodeB) in LTE. Alternatively, the base station 100 may be a radio controller in a cloud radio access network (CRAN) scenario. Alternatively, the base station 100 may be a network device in a future 5G network or a network device in a future evolved PLMN network, or may be a wearable device, an in-vehicle device, or the like.

The terminal 200 may be user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a future 5G network, a terminal in a future evolved PLMN network, or the like.

A general-purpose hardware architecture of the base station 100 is described. As shown in FIG. 4, the base station may include a building baseband unit (BBU) and a remote radio module (RRU). The RRU is connected to an antenna system (that is, an antenna), and the BBU and the RRU may be separately used based on a requirement. It should be noted that, in a specific implementation process, the base station 100 may alternatively use another general-purpose hardware architecture, and is not merely limited to the general-purpose hardware architecture shown in FIG. 4.

Figure 5:
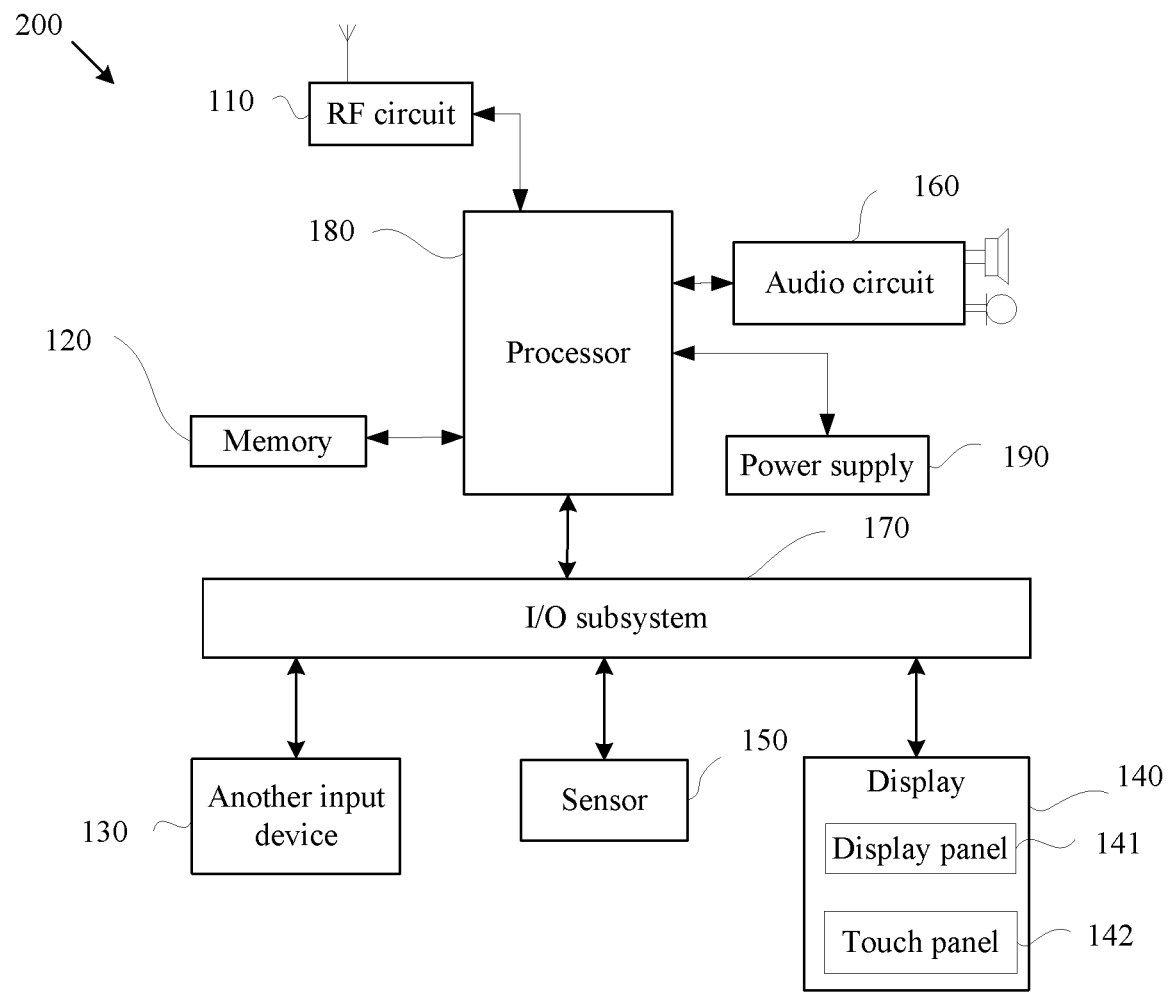
FIG. 5 is a schematic structural diagram of a terminal according to an embodiment of this application.

For example, the terminal 200 is a mobile phone, and a general-purpose hardware architecture of the mobile phone is described. As shown in FIG. 5, the mobile phone may include components such as a radio frequency (RF) circuit 110, a memory 120, another input device 130, a display 140, a sensor 150, an audio circuit 160, an I/O subsystem 170, a processor 180, and a power supply 190. A person skilled in the art may understand that a structure of the mobile phone shown in FIG. 5 constitutes no limitation on the mobile phone, and the mobile phone may include components more or fewer than those shown in FIG. 5. Some components may be combined, some components may be disassembled, or those components may be disposed in different manners. A person skilled in the art may understand that the display 140 belongs to a user interface (UI), and the display 140 may include a display panel 141 and a touch panel 142. In addition, the mobile phone may include components more or fewer than those shown in FIG. 5. The mobile phone may further include function modules or devices such as a camera and a Bluetooth module, which are not shown in FIG. 5. Details are not described herein.

Further, the processor 180 is separately connected to the RF circuit 110, the memory 120, the audio circuit 160, the I/O subsystem 170, and the power supply 190. The I/O subsystem 170 is separately connected to another input device 130, the display 140, and the sensor 150. The RF circuit 110 may be configured to: receive or send a signal in an information receiving or sending process or in a call process. Particularly, after receiving downlink information of the base station, the RF circuit 110 sends the downlink information to the processor 180 for processing. The memory 120 may be configured to store a software program and module. The processor 180 processes various function applications and data of the mobile phone by running the software program and module that are stored in the memory 120. Another input device 130 may be configured to: receive entered digit or character information, and generate key signal input related to a user setting and function control of the mobile phone. The display 140 may be configured to display information input by a user or information provided for a user, and various menus of the mobile phone, and may receive user input. The sensor 150 may be an optical sensor, a motion sensor, or another sensor. The audio circuit 160 may provide an audio interface between a user and the mobile phone. The I/O subsystem 170 is configured to control a peripheral device that is configured to perform input and output, and the peripheral device may include another device input controller, a sensor controller, and a display controller. The processor 180 is a control center of the mobile phone 200, and is connected to all parts of the entire mobile phone by using various interfaces and lines. The processor 180 performs various functions of the mobile phone 200 and processes data by running or executing the software program and/or module that are/is stored in the memory 120 and by invoking data stored in the memory 120, to perform overall monitoring on the mobile phone. The power supply 190 (for example, a battery) is configured to supply power to all the foregoing components. The power supply may be logically connected to the processor 180 by using a power supply management system, to implement functions such as charging and discharging management and power consumption management by using the power supply management system.

The technical solutions provided in this application may be used in a single-carrier transmission scenario or a multi-carrier transmission scenario, and may be applied to an uplink transmission scenario or a downlink transmission scenario.

The following describes a method for transmitting a DMRS provided in this application. The method for transmitting a DMRS may include a method for sending a DMRS by a transmit end and a method for obtaining a DMRS by a receive end.

Figure 6:
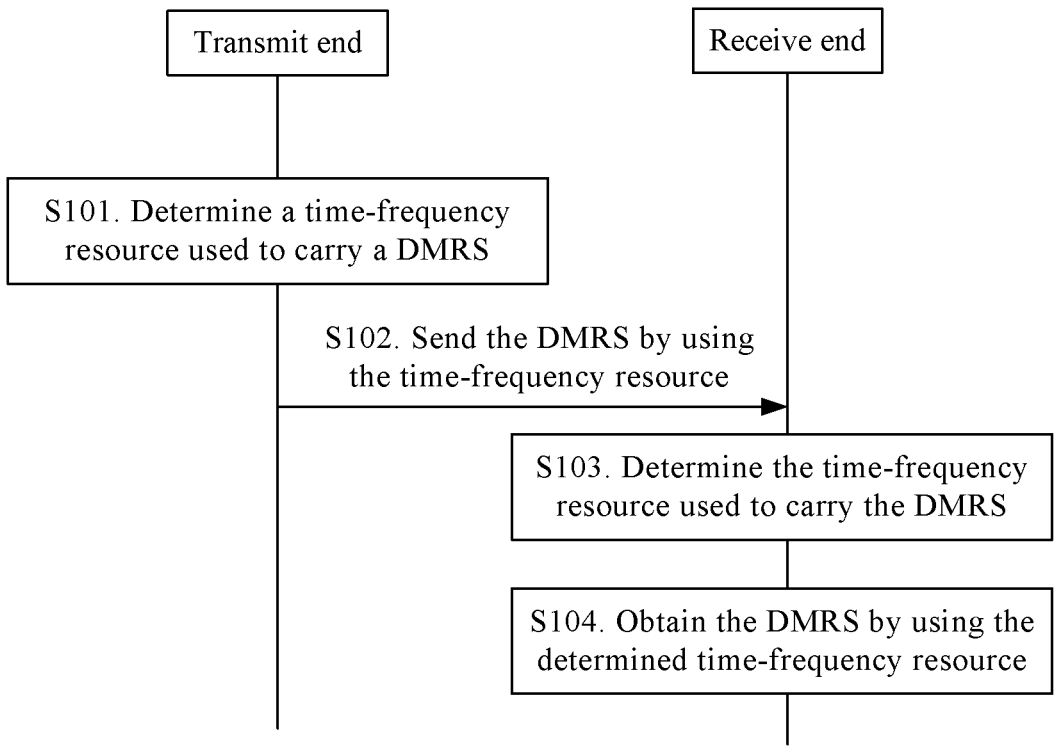
FIG. 6 is a schematic interaction diagram of a method for transmitting a DMRS according to an embodiment of this application.

FIG. 6 shows a method for transmitting a DMRS provided in this application. The method may include the following steps.

S101. A transmit end determines a time-frequency resource used to carry a DMRS.

The DMRS is carried in at least one resource unit. For a feature of the time-frequency resource occupied by the DMRS in each resource unit, refer to any feature of a time-frequency resource occupied by a DMRS in any one of FIG. 7 to FIG. 34 and related descriptions in FIG. 7 to FIG. 34.

S102. The transmit end sends the DMRS by using the time-frequency resource.

S103. A receive end determines the time-frequency resource used to carry the DMRS.

S104. The receive end obtains the DMRS by using the determined time-frequency resource.

The time-frequency resource used to carry the DMRS may include one or more symbols in time domain, or may include one or more subcarriers in frequency domain. When the time-frequency resource includes a plurality of symbols in time domain, the plurality of symbols may be a plurality of consecutive or discrete symbols. When the time-frequency resource includes a plurality of subcarriers in frequency domain, the plurality of subcarriers may be a plurality of consecutive or discrete subcarriers. This is not limited in this application. After S101 and before S102, the method may further include: mapping, by the transmit end, the DMRS to the determined time-frequency resource. For a related description of the time-frequency resource and a beneficial effect that can be achieved, refer to the following descriptions.

If the technical solution is applied to an uplink transmission scenario, the transmit end may be a terminal, and the receive end may be a base station. If the technical solution is applied to a downlink transmission scenario, the transmit end may be a base station, and the receive end may be a terminal.

Figure 6A:
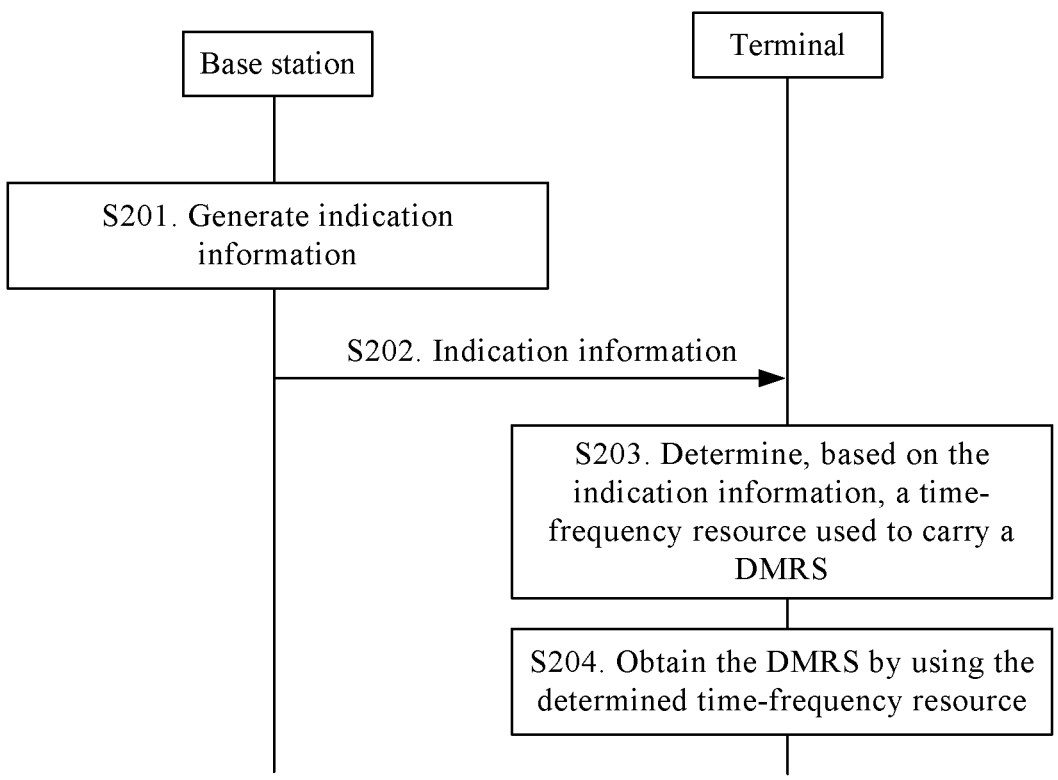
FIG. 6a is a schematic interaction diagram of another method for transmitting a DMRS according to an embodiment of this application.

FIG. 6a shows another method for transmitting a DMRS provided in this application. The method may include the following steps:

S201. A base station generates indication information, where the indication information is used to indicate a time-frequency resource used to carry a DMRS.

S202. The base station sends the indication information to a terminal.

S203. The terminal receives the indication information, and determines, based on the indication information, the time-frequency resource used to carry the DMRS.

S204. The terminal obtains the DMRS by using the determined time-frequency resource.

One DMRS port corresponds to one DMRS, and one DMRS may be carried on one or more REs. In one aspect, a mapping rule that is between a DMRS port and a time-frequency resource and that is used by the base station and the terminal may be fixed, or may be semi-statically adjusted, or may be dynamically adjusted. In another aspect, a DMRS port allocated by the base station to the terminal may be semi-statically adjusted or may be dynamically adjusted. Based on either of the two aspects, during semi-static adjustment or dynamic adjustment, a peer end may be notified by using an instruction. The instruction (namely, the indication information) may include, but is not limited to, any one of the following: radio resource control (RRC) signaling, media access control (MAC) signaling, downlink control information (DCI), and the like.

Optionally, the indication information may include DMRS port information, for example, a DMRS port number, and is used to indicate a time-frequency resource corresponding to the DMRS port allocated by the base station to the terminal.

According to the method for transmitting a DMRS provided in this application, a proper mapping rule between a DMRS port and a time-frequency resource is set, so that the method can be applied to a complex and changing NR scenario.

Based on this, several mapping rules between a DMRS port and a time-frequency resource are further provided in this application. Before this, the following needs to be explained.

First, in this application, for ease of description, system-supported DMRS ports may be consecutively numbered, for example, consecutively numbered from 1. For example, if a system supports six DMRS ports, the six DMRS ports are denoted as DMRS ports 1 to 6. In this application, for ease of description, symbols included in a resource unit are consecutively numbered from 0 in time domain, and subcarriers included in the resource unit are numbered from 0 in frequency domain. For example, that a resource unit is an RB pair is used as an example. The RB pair may include symbols 0 to 13 in time domain and may include subcarriers 0 to 11 in frequency domain. Certainly, this is not limited during specific implementation. It should be noted that the foregoing description is a setting for ease of describing the technical solution provided in this embodiment of this application, but is not intended to limit the scope of this application.

Second, a DMRS port may be mapped to one or more symbols of a resource unit. Optionally, each of the one or more symbols may be a front symbol, a middle symbol, or a rear symbol of a TI. The front symbol is a symbol located in the front of a TI, for example, may correspond to a symbol numbered 2 (that is, a symbol 2) and/or a symbol numbered 3 (that is, a symbol 3) in a subframe in LTE. Which symbols in a subframe are specifically defined as front symbols is not limited in this application. Alternatively, each of the one or more symbols may be a middle symbol. The middle symbol is a symbol located in the middle of a subframe, for example, may be a symbol numbered 5 (that is, a symbol 5) and/or a symbol numbered 6 (that is, a symbol 6) in the subframe. Which symbols in a subframe are specifically defined as middle symbols is not limited in this application. Alternatively, each of the one or more symbols may be a rear symbol. The rear symbol is a symbol located in the rear of a subframe, for example, may be a symbol numbered 9 (that is, a symbol 9) and/or a symbol numbered 10 (that is, a symbol 10) in the subframe. Which symbols in a subframe are specifically defined as rear symbols is not limited in this application. It can be understood that, during actual implementation, if a DMRS port is mapped to a plurality of symbols, the plurality of symbols may be different types of symbols, and the types of symbols include front symbols, middle symbols, and rear symbols. For example, some of the plurality of symbols may be front symbols, and some other symbols are middle symbols.

In the following, if a DMRS port is mapped to one symbol, the symbol is referred to as a first symbol. If a DMRS port is mapped to a plurality of symbols, that the plurality of symbols are two symbols that are respectively referred to as a first symbol and a second symbol is used as an example for description. The first symbol and the second symbol may be consecutive or may be discrete. In other words, the first symbol and the second symbol may be adjacent symbols or may be non-adjacent symbols. In all of the following specific examples, that the first symbol and the second symbol are consecutive is used as an example for description. Specifically, that the first symbol is a symbol numbered 2 in a subframe and the second symbol is a symbol numbered 3 in the subframe is used as an example for description, and this is not limited during actual implementation.

It can be understood that the DMRS port herein is all system-supported DMRS ports. During actual implementation, whether all the DMRS ports are used or some of all the DMRS ports are used in one scheduling process is not limited in this application.

It can be understood that, in this application, some or all DMRSs may be mapped to a front symbol. In this way, compared with the prior art, this application allows a receive end to receive all the DMRSs more quickly and then start data demodulation. Therefore, a requirement for rapid data demodulation in NR can be satisfied.

Third, for a related description of a DMRS port group, refer to the foregoing descriptions. It should be noted that a specific implementation in which specific ports are used as one DMRS port group is not limited in this application. For example, if DMRS ports 1 to 8 are divided into two groups, any four ports in the DMRS ports may be used as one DMRS port group, and the other four ports are used as one DMRS port group. In addition, different DMRS port groups do not include a same DMRS port. For another example, if DMRS ports 1 to 12 are divided into three groups, any four ports in the DMRS ports may be used as one DMRS port group, any four of other eight DMRS ports are used as one DMRS port group, and then the remaining four ports are used as one DMRS port group.

Fourth, the following describes a plurality of mapping rules between a DMRS port and a time-frequency resource. Specifically, the mapping rules may be presented by using pilot patterns. In a specific implementation process, the mapping rules may be implemented by using formulas or tables or in other manners. In a specific implementation process, the receive end may learn of, by using a DMRS port or by using other information used to indicate a time-frequency resource corresponding to a DMRS, the time-frequency resource corresponding to the DMRS. How the receive end obtains the DMRS from the time-frequency resource is not limited in this application, and this may be implemented by using a method in the prior art. In principle, if multiplexing is performed for m DMRS ports in a CDM manner, the receive end may obtain the m DMRS ports from only REs whose quantity is greater than or equal to m and on which the m DMRS ports are carried, where m is an integer greater than or equal to 2. A specific DMRS value (which is usually a complex number, namely, a modulation symbol) is usually selected from a value sequence. A specific selected value is loaded, by using a multiplex code used to implement CDM, onto a plurality of REs allocated for the DMRS. For a specific loading manner, refer to the prior art. These REs may correspond to different subcarriers in a same symbol, may correspond to same subcarriers in different symbols, or may correspond to different subcarriers in different symbols.

Fifth, in the following, that a quantity of subcarriers of a resource unit in frequency domain is M is used as an example for description, where M is an integer greater than or equal to 1. For example, if a resource unit is one RB pair (that is, two RBs in time domain), M=12; and if a resource unit is two RBs in frequency domain, M=24.

In addition, in the accompanying drawings of this specification, an RE corresponding to a symbol to which a DMRS port is mapped is shown, and an RE corresponding to another symbol is not shown. Information carried on another RE is not limited in this application.

The following describes the mapping rules between a DMRS port and a time-frequency resource provided in this application.

A total quantity of system-supported DMRS ports is 6.

1. Time-frequency resources to which the six DMRS ports are mapped include a first symbol of a resource unit in time domain.

(1) The six DMRS ports include: a first DMRS port, a second DMRS port, a third DMRS port, a fourth DMRS port, a fifth DMRS port, and a sixth DMRS port. It should be noted that "include" specifically means "are". This is similar in examples below, and therefore details are not described. Mapping rules of the six DMRS ports are as follows:

First:

A time-frequency resource to which the first DMRS port is mapped includes a subcarrier 6n of the resource unit in frequency domain.

A time-frequency resource to which the second DMRS port is mapped includes a subcarrier 6n+1 of the resource unit in frequency domain.

A time-frequency resource to which the third DMRS port is mapped includes a subcarrier 6n+2 of the resource unit in frequency domain.

A time-frequency resource to which the fourth DMRS port is mapped includes a subcarrier 6n+3 of the resource unit in frequency domain.

A time-frequency resource to which the fifth DMRS port is mapped includes a subcarrier 6n+4 of the resource unit in frequency domain.

A time-frequency resource to which the sixth DMRS port is mapped includes a subcarrier 6n+5 of the resource unit in frequency domain.

n may be any one or more integers greater than or equal to 0 and less than $\lfloor M/6 \rfloor$.

In this specification, ⌊ ⌋ means rounding down. In addition, in various mapping rules provided in this specification, if time-frequency resources used to carry a plurality of DMRS ports (that is, carry DMRSs corresponding to the plurality of DMRS ports) do not occupy all subcarriers of the resource unit in frequency domain, the subcarriers used to carry the DMRS ports may be offset to some extent based on a requirement. For example, after being offset, the subcarrier 6n used to carry the first DMRS port may be changed to a subcarrier 6th+Δ, where Δ is a preset offset.

Figure 7:
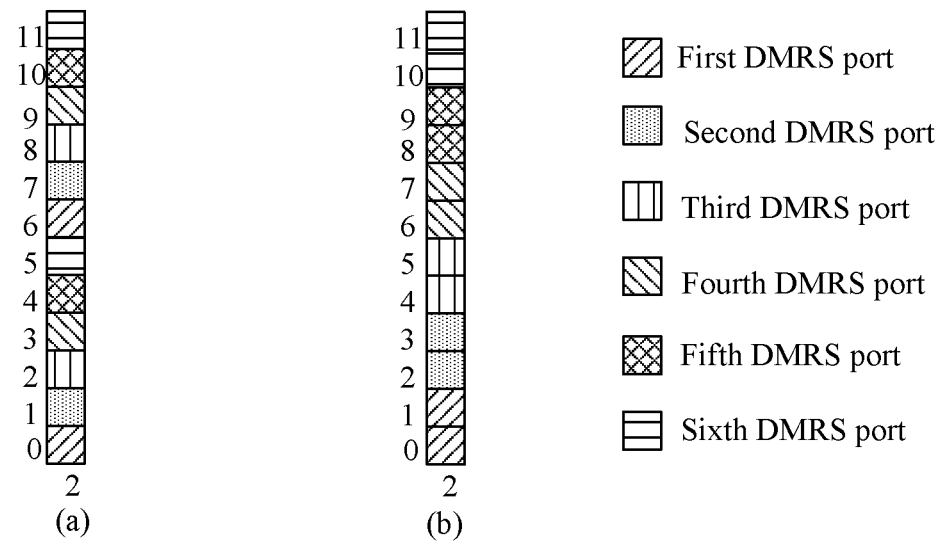
FIG. 7 is a schematic diagram of a pilot pattern for six ports according to an embodiment of this application.

(a) in FIG. 7 is a schematic diagram of a mapping rule of the six DMRS ports. Each small shaded block indicates an RE to which a DMRS port is mapped, and n=0 or 1.

Second:

A time-frequency resource to which the first DMRS port is mapped includes at least one of a subcarrier 12n and a subcarrier 12n+1 of the resource unit in frequency domain.

A time-frequency resource to which the second DMRS port is mapped includes at least one of a subcarrier 12n+2 and a subcarrier 12n+3 of the resource unit in frequency domain.

A time-frequency resource to which the third DMRS port is mapped includes at least one of a subcarrier 12n+4 and a subcarrier 12n+5 of the resource unit in frequency domain.

A time-frequency resource to which the fourth DMRS port is mapped includes at least one of a subcarrier 12n+6 and a subcarrier 12n+7 of the resource unit in frequency domain.

A time-frequency resource to which the fifth DMRS port is mapped includes at least one of a subcarrier 12n+8 and a subcarrier 12n+9 of the resource unit in frequency domain.

A time-frequency resource to which the sixth DMRS port is mapped includes at least one of a subcarrier 12n+10 and a subcarrier 12n+11 of the resource unit in frequency domain.

n may be any one or more integers greater than or equal to 0 and less than or equal to $\lfloor M/12 \rfloor$.

(b) in FIG. 7 is a schematic diagram of a mapping rule of the six DMRS ports. Each small shaded block indicates an RE to which a DMRS port group is mapped, and n=0.

(2) The six DMRS ports are divided into three DMRS port groups, and each DMRS port group includes two DMRS ports. The three DMRS port groups include a first DMRS port group, a second DMRS port group, and a third DMRS port group. A same time-frequency resource is multiplexed in a CDM manner for DMRSs corresponding to DMRS ports in each DMRS port group. Mapping rules of the three DMRS port groups are as follows:

First:

A time-frequency resource to which the first DMRS port group is mapped includes a subcarrier 3n of the resource unit in frequency domain.

A time-frequency resource to which the second DMRS port group is mapped includes a subcarrier 3n+1 of the resource unit in frequency domain.

A time-frequency resource to which the third DMRS port group is mapped includes a subcarrier 3n+2 of the resource unit in frequency domain.

n may be any one or more integers greater than or equal to 0 and less than $\lfloor M/3 \rfloor$.

Figure 8:
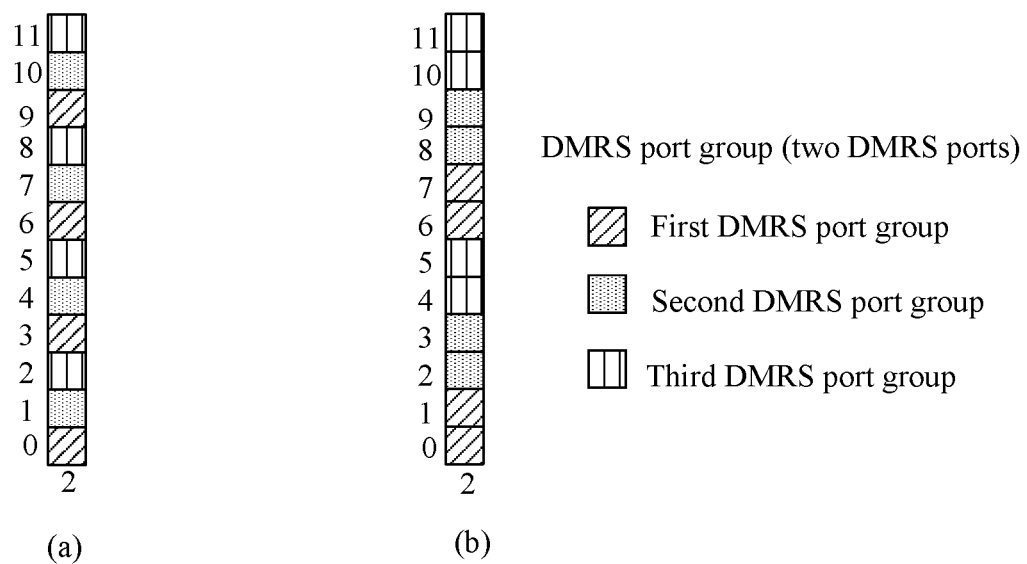
FIG. 8 is a schematic diagram of another pilot pattern for six ports according to an embodiment of this application.

(a) in FIG. 8 is a schematic diagram of a mapping rule of the six DMRS ports. Each small shaded block indicates an RE to which a DMRS port group is mapped, and n=0, 1, 2, or 3. For example, any three ports in the DMRS ports may be used as one DMRS port group, and the other three ports may be used as one DMRS port group. For example, DMRS ports 1 to 3 are used as a first DMRS port group, and DMRS ports 4 to 6 are used as a second DMRS port group. Certainly, this is not limited during specific implementation. In this solution, the ports are evenly distributed in frequency domain and have a high density. This ensures high channel estimation accuracy in various scenarios. In addition, the ports are evenly distributed but are mutually discrete in frequency domain. Therefore, this solution has a feature of a low peak-to-average power ratio (PAPR), and is applicable to both a multi-carrier transmission scenario and a single-carrier transmission scenario, thereby facilitating joint design of uplink and downlink transmission or multi-waveform transmission; and this solution is applicable to a multi-user MIMO (MU-MIMO) scenario (MU-MIMO scenario), thereby reducing DMRS indication overheads and design complexity of a system. In this solution, only one symbol is occupied. Therefore, system overheads are low, and this solution can be used in a high-frequency scenario. This solution may further support more ports in a manner of adding symbols, and therefore flexibility is better. In addition, the ports are evenly mapped in frequency domain, thereby facilitating flexible scheduling. Further, power boosting or data transmission may be performed at a location of an unoccupied port group.

Second:

A time-frequency resource to which the first DMRS port group is mapped includes at least one of a subcarrier 12n, a subcarrier 12n+1, a subcarrier 12n+6, and a subcarrier 12n+7 of the resource unit in frequency domain.

A time-frequency resource to which the second DMRS port group is mapped includes at least one of a subcarrier 12n+2, a subcarrier 12n+3, a subcarrier 12n+8, and a subcarrier 12n+9 of the resource unit in frequency domain.

A time-frequency resource to which the third DMRS port group is mapped includes at least one of a subcarrier 12n+4, a subcarrier 12n+5, a subcarrier 12n+10, and a subcarrier 12n+11 of the resource unit in frequency domain.

n may be any one or more integers greater than or equal to 0 and less than $\lfloor M/12 \rfloor$.

(b) in FIG. 8 is a schematic diagram of a mapping rule of the six DMRS ports. Each small shaded block indicates an RE to which a DMRS port group is mapped, and n=0.

(3) The six DMRS ports are divided into two DMRS port groups, and each DMRS port group includes three DMRS ports. The two DMRS port groups include a first DMRS port group and a second DMRS port group. A same time-frequency resource is multiplexed in a CDM manner for DMRSs corresponding to DMRS ports in each DMRS port group. Mapping rules of the two DMRS port groups are as follows:

First:

A time-frequency resource to which the first DMRS port group is mapped includes a subcarrier 2n of the resource unit in frequency domain.

A time-frequency resource to which the second DMRS port group is mapped includes a subcarrier 2n+1 of the resource unit in frequency domain.

n may be any one or more integers greater than or equal to 0 and less than $\lfloor M/2 \rfloor$.

Figure 9:
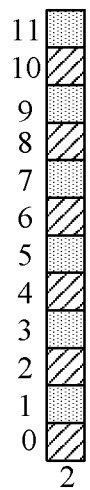
FIG. 9 is a schematic diagram of another pilot pattern for six ports according to an embodiment of this application.
Figure 9:

(a) in FIG. 9 is a schematic diagram of a mapping rule of the six DMRS ports. Each small shaded block indicates an RE to which a DMRS port group is mapped, and n=0, 1, 2, 3, 4, or 5. In this solution, the ports are evenly distributed in frequency domain and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In this solution, only one symbol is occupied. Therefore, system overheads are low, and this solution can be used in a high-frequency scenario. This solution may further support more ports in a manner of adding symbols, and therefore flexibility is better. In addition, the ports are evenly mapped in frequency domain, thereby facilitating flexible scheduling. Further, power boosting or data transmission may be performed at a location of an unoccupied port group.

Second:

A time-frequency resource to which the first DMRS port group is mapped includes at least one of a subcarrier 12n, a subcarrier 12n+1, a subcarrier 12n+2, a subcarrier 12n+6, a subcarrier 12n+7, and a subcarrier 12n+8 of the resource unit in frequency domain.

A time-frequency resource to which the second DMRS port group is mapped includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

(b) in FIG. 9 is a schematic diagram of a mapping rule of the six DMRS ports. Each small shaded block indicates an RE to which a DMRS port group is mapped, and n=0.

(4) A same time-frequency resource is multiplexed in a CDM manner for DMRSs corresponding to the six DMRS ports. In this case, the six DMRS ports may be considered as one DMRS port group. Mapping rules of the DMRS port group are as follows:

First:

A time-frequency resource to which the DMRS port group is mapped includes a subcarrier 2n of the resource unit in frequency domain; or a time-frequency resource to which the DMRS port group is mapped includes a subcarrier 2n+1 of the resource unit in frequency domain.

n may be any one or more integers greater than or equal to 0 and less than $\lfloor M/2 \rfloor$.

Figure 10:
FIG. 10 is a schematic diagram of another pilot pattern for six ports according to an embodiment of this application.
Figure 10:
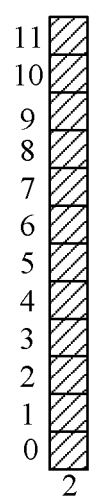

(a) in FIG. 10 is a schematic diagram of a mapping rule of the six DMRS ports. In the figure, that a time-frequency resource to which the DMRS port group is mapped includes the subcarrier 2n of the resource unit in frequency domain is used as an example for description. Each small shaded block indicates an RE to which a DMRS port group is mapped, and n=0, 1, 2, 3, 4, or 5. A small blank block indicates an RE to which a DMRS port is not mapped.

Second:

A time-frequency resource to which the DMRS port group is mapped includes a subcarrier n of the resource unit in frequency domain.

n may be any one or more integers greater than or equal to 0 and less than M.

(b) in FIG. 10 is a schematic diagram of a mapping rule of the six DMRS ports. Each small shaded block indicates an RE to which a DMRS port group is mapped, and n=0, 1, 2, 3, 4, 5, 6, 7, 8, 9, 10, or 11.

2. Time-frequency resources to which the six DMRS ports are mapped include a first symbol and a second symbol of a resource unit in time domain.

(1) The six DMRS ports include: a first DMRS port, a second DMRS port, a third DMRS port, a fourth DMRS port, a fifth DMRS port, and a sixth DMRS port. Mapping rules of the six DMRS ports are as follows:

First: The time-frequency resources to which the six DMRS ports are mapped include subcarriers of the resource unit in frequency domain, where the subcarriers are the same as those in the first solution corresponding to (a) in FIG. 7. In this case, an example is shown in (a) in FIG. 11.

Second: The time-frequency resources to which the six DMRS ports are mapped include subcarriers of the resource unit in frequency domain, where the subcarriers are the same as those in the second solution corresponding to (b) in FIG. 7. In this case, an example is shown in (b) in FIG. 11.

Third: A time-frequency resource to which each DMRS port group is mapped includes the first symbol and the second symbol.

When a time-frequency resource to which the first DMRS port is mapped is the first symbol in time domain, the time-frequency resource includes a subcarrier 6n of the resource unit in frequency domain; and when a time-frequency resource to which the first DMRS port is mapped is the second symbol in time domain, the time-frequency resource includes a subcarrier 6n+3 of the resource unit in frequency domain.

When a time-frequency resource to which the second DMRS port is mapped is the first symbol in time domain, the time-frequency resource includes a subcarrier 6n+1 of the resource unit in frequency domain; and when a time-frequency resource to which the second DMRS port is mapped is the second symbol in time domain, the time-frequency resource includes a subcarrier 6n+4 of the resource unit in frequency domain.

When a time-frequency resource to which the third DMRS port is mapped is the first symbol in time domain, the time-frequency resource includes a subcarrier 6n+2 of the resource unit in frequency domain; and when a time-frequency resource to which the third DMRS port is mapped is the second symbol in time domain, the time-frequency resource includes a subcarrier 6n+5 of the resource unit in frequency domain.

When a time-frequency resource to which the fourth DMRS port is mapped is the first symbol in time domain, the time-frequency resource includes a subcarrier 6n+3 of the resource unit in frequency domain; and when a time-frequency resource to which the fourth DMRS port is mapped is the second symbol in time domain, the time-frequency resource includes a subcarrier 6n of the resource unit in frequency domain.

When a time-frequency resource to which the fifth DMRS port is mapped is the first symbol in time domain, the time-frequency resource includes a subcarrier 6n+4 of the resource unit in frequency domain; and when a time-frequency resource to which the fifth DMRS port is mapped is the second symbol in time domain, the time-frequency resource includes a subcarrier 6n+1 of the resource unit in frequency domain.

When a time-frequency resource to which the sixth DMRS port is mapped is the first symbol in time domain, the time-frequency resource includes a subcarrier 6n+5 of the resource unit in frequency domain; and when a time-frequency resource to which the sixth DMRS port is mapped is the second symbol in time domain, the time-frequency resource includes a subcarrier 6n+2 of the resource unit in frequency domain.

n may be any one or more integers greater than or equal to 0 and less than $\lfloor M/6 \rfloor$.

Figure 11:
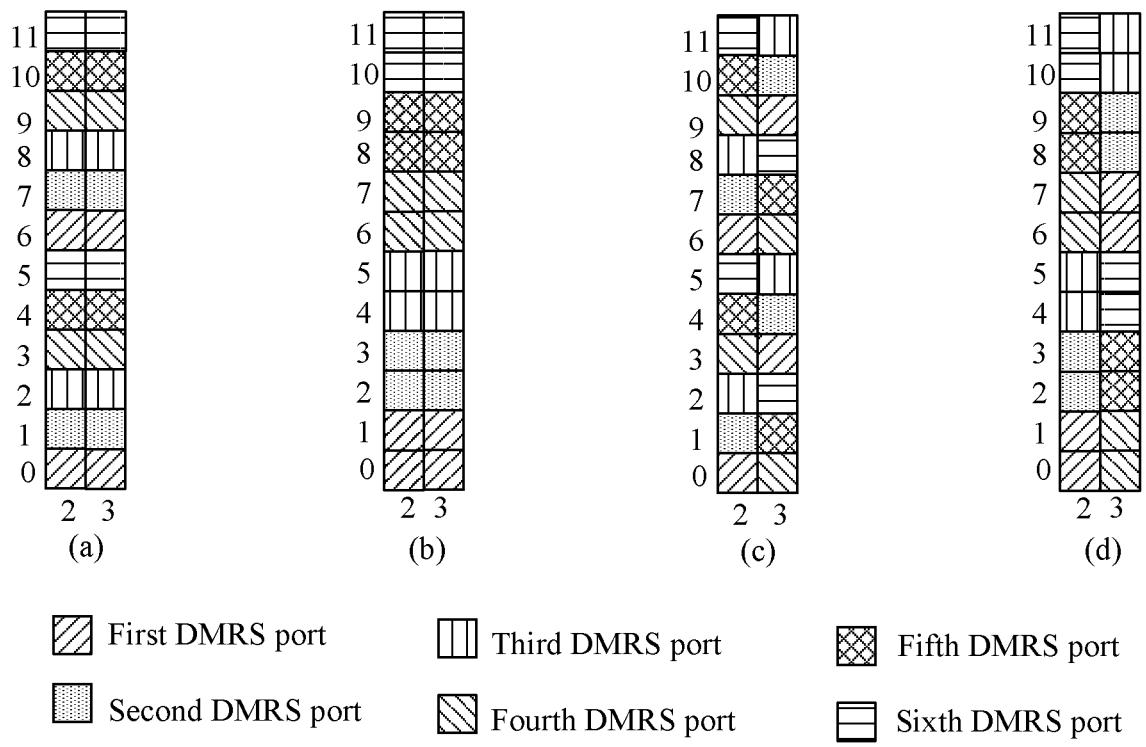
FIG. 11 is a schematic diagram of another pilot pattern for six ports according to an embodiment of this application.

(c) in FIG. 11 is a schematic diagram of a mapping rule of the six DMRS ports. Each small shaded block indicates an RE to which a DMRS port is mapped, and n=0 or 1.

Fourth: A time-frequency resource to which each DMRS port group is mapped includes the first symbol and the second symbol.

When a time-frequency resource to which the first DMRS port is mapped is the first symbol in time domain, the time-frequency resource includes at least one of a subcarrier 12n and a subcarrier 12n+1 of the resource unit in frequency domain; and when a time-frequency resource to which the first DMRS port is mapped is the second symbol in time domain, the time-frequency resource includes at least one of a subcarrier 12n+6 and a subcarrier 12n+7 of the resource unit in frequency domain.

When a time-frequency resource to which the second DMRS port is mapped is the first symbol in time domain, the time-frequency resource includes at least one of a subcarrier 12n+2 and a subcarrier 12n+3 of the resource unit in frequency domain; and when a time-frequency resource to which the second DMRS port is mapped is the second symbol in time domain, the time-frequency resource includes at least one of a subcarrier 12n+8 and a subcarrier 12n+9 of the resource unit in frequency domain.

When a time-frequency resource to which the third DMRS port is mapped is the first symbol in time domain, the time-frequency resource includes at least one of a subcarrier 12n+4 and a subcarrier 12n+5 of the resource unit in frequency domain; and when a time-frequency resource to which the third DMRS port is mapped is the second symbol in time domain, the time-frequency resource includes at least one of a subcarrier 12n+10 and a subcarrier 12n+11 of the resource unit in frequency domain.

When a time-frequency resource to which the fourth DMRS port is mapped is the first symbol in time domain, the time-frequency resource includes at least one of a subcarrier 12n+6 and a subcarrier 12n+7 of the resource unit in frequency domain; and when a time-frequency resource to which the fourth DMRS port is mapped is the second symbol in time domain, the time-frequency resource includes at least one of a subcarrier 12n and a subcarrier 12n+1 of the resource unit in frequency domain.

When a time-frequency resource to which the fifth DMRS port is mapped is the first symbol in time domain, the time-frequency resource includes at least one of a subcarrier 12n+8 and a subcarrier 12n+9 of the resource unit in frequency domain; and when a time-frequency resource to which the fifth DMRS port is mapped is the second symbol in time domain, the time-frequency resource includes at least one of a subcarrier 12n+2 and a subcarrier 12n+3 of the resource unit in frequency domain.

When a time-frequency resource to which the sixth DMRS port is mapped is the first symbol in time domain, the time-frequency resource includes at least one of a subcarrier 12n+10 and a subcarrier 12n+11 of the resource unit in frequency domain; and when a time-frequency resource to which the sixth DMRS port is mapped is the second symbol in time domain, the time-frequency resource includes at least one of a subcarrier 12n+4 and a subcarrier 12n+5 of the resource unit in frequency domain.

n may be any one or more integers greater than or equal to 0 and less than or equal to $\lfloor M/12 \rfloor$.

(d) in FIG. 11 is a schematic diagram of a mapping rule of the six DMRS ports. Each small shaded block indicates an RE to which a DMRS port group is mapped, and n=0.

(2) The six DMRS ports are divided into three DMRS port groups, and each DMRS port group includes two DMRS ports. The three DMRS port groups include a first DMRS port group, a second DMRS port group, and a third DMRS port group. A same time-frequency resource is multiplexed in a CDM manner for DMRSs corresponding to DMRS ports in each DMRS port group. Mapping rules of the three DMRS port groups are as follows:

First: A time-frequency resource to which each DMRS port group is mapped includes the first symbol and the second symbol; and for the time-frequency resource to which each DMRS port group is mapped in frequency domain, reference may be made to the first solution corresponding to (a) in FIG. 8. In this case, an example is shown in (a) in FIG. 12. In this solution, the ports are evenly distributed in frequency domain and distributed on the two symbols, and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In addition, in this solution, a method for performing multiplexing for more ports in each port group supports transmission through more ports without changing an original port mapping. Therefore, this solution is more generally used. In addition, the ports are evenly mapped in frequency domain, thereby facilitating flexible scheduling. Further, power boosting or data transmission may be performed at a location of an unoccupied port group. A CDM length is small, thereby ensuring better orthogonality between the ports.

Second: A time-frequency resource to which each DMRS port group is mapped includes the first symbol and the second symbol; and for the time-frequency resource to which each DMRS port group is mapped in frequency domain, reference may be made to the second solution corresponding to (b) in FIG. 8. In this case, an example is shown in (b) in FIG. 12.

Third: A time-frequency resource to which each DMRS port group is mapped includes the first symbol and the second symbol.

When a time-frequency resource to which the first DMRS port group is mapped is the first symbol in time domain, the time-frequency resource includes a subcarrier 3n of the resource unit in frequency domain; and when a time-frequency resource to which the first DMRS port group is mapped is the second symbol in time domain, the time-frequency resource includes a subcarrier 3n+2 of the resource unit in frequency domain.

When a time-frequency resource to which the second DMRS port group is mapped is the first symbol in time domain, the time-frequency resource includes a subcarrier 3n+1 of the resource unit in frequency domain; and when a time-frequency resource to which the second DMRS port group is mapped is the second symbol in time domain, the time-frequency resource includes a subcarrier 3n of the resource unit in frequency domain.

When a time-frequency resource to which the third DMRS port group is mapped is the first symbol in time domain, the time-frequency resource includes a subcarrier 3n+2 of the resource unit in frequency domain; and when a time-frequency resource to which the third DMRS port group is mapped is the second symbol in time domain, the time-frequency resource includes a subcarrier 3n+1 of the resource unit in frequency domain.

n may be any one or more integers greater than or equal to 0 and less than $\lfloor M/3 \rfloor$.

Figure 12:
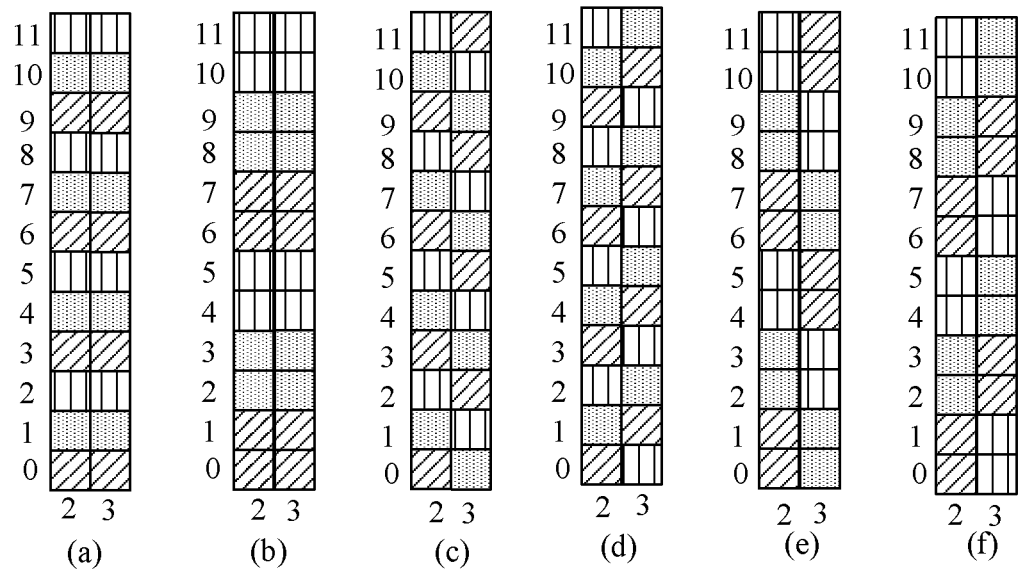
FIG. 12 is a schematic diagram of another pilot pattern for six ports according to an embodiment of this application.
Figure 12:
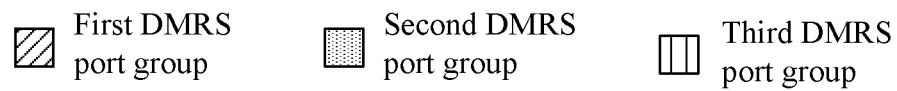

(c) in FIG. 12 is a schematic diagram of a mapping rule of the six DMRS ports. Each small shaded block indicates an RE to which a DMRS port group is mapped, and n=0, 1, 2, or 3.

Fourth: A time-frequency resource to which each DMRS port group is mapped includes the first symbol and the second symbol.

When a time-frequency resource to which the first DMRS port group is mapped is the first symbol in time domain, the time-frequency resource includes a subcarrier 3n of the resource unit in frequency domain; and when a time-frequency resource to which the first DMRS port group is mapped is the second symbol in time domain, the time-frequency resource includes a subcarrier 3n+1 of the resource unit in frequency domain.

When a time-frequency resource to which the second DMRS port group is mapped is the first symbol in time domain, the time-frequency resource includes a subcarrier 3n+1 of the resource unit in frequency domain; and when a time-frequency resource to which the second DMRS port group is mapped is the second symbol in time domain, the time-frequency resource includes a subcarrier 3n+2 of the resource unit in frequency domain.

When a time-frequency resource to which the third DMRS port group is mapped is the first symbol in time domain, the time-frequency resource includes a subcarrier 3n+2 of the resource unit in frequency domain; and when a time-frequency resource to which the third DMRS port group is mapped is the second symbol in time domain, the time-frequency resource includes a subcarrier 3n of the resource unit in frequency domain.

n may be any one or more integers greater than or equal to 0 and less than $\lfloor M/3 \rfloor$.

(d) in FIG. 12 is a schematic diagram of a mapping rule of the six DMRS ports. Each small shaded block indicates an RE to which a DMRS port group is mapped, and n=0, 1, 2, or 3.

Fifth: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+6, and a subcarrier 12n+7 of the resource unit in frequency domain; and when a time-frequency resource to which the first DMRS port group is mapped is the second symbol in time domain, the time-frequency resource includes at least one of a subcarrier 12n+4, a subcarrier 12n+5, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+2, a subcarrier 12n+3, a subcarrier 12n+8, and a subcarrier 12n+9 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+6, and a subcarrier 12n+7 of the resource unit in frequency domain.

When a time-frequency resource to which the third DMRS port group is mapped is the first symbol in time domain, the time-frequency resource includes at least one of a subcarrier 12n+4, a subcarrier 12n+5, a subcarrier 12n+10, and a subcarrier 12n+11 of the resource unit in frequency domain; and when a time-frequency resource to which the third DMRS port group is mapped is the second symbol in time domain, the time-frequency resource includes at least one of a subcarrier 12n+2, a subcarrier 12n+3, a subcarrier 12n+8, and a subcarrier 12n+9 of the resource unit in frequency domain.

n may be any one or more integers greater than or equal to 0 and less than $\lfloor M/12 \rfloor$.

(e) in FIG. 12 is a schematic diagram of a mapping rule of the six DMRS ports. Each small shaded block indicates an RE to which a DMRS port group is mapped, and n=0.

Sixth: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+6, and a subcarrier 12n+7 of the resource unit in frequency domain; and when a time-frequency resource to which the first DMRS port group is mapped is the second symbol in time domain, the time-frequency resource includes at least one of a subcarrier 12n+2, a subcarrier 12n+3, a subcarrier 12n+8, and a subcarrier 12n+9 of the resource unit in frequency domain.

When a time-frequency resource to which the second DMRS port group is mapped is the first symbol in time domain, the time-frequency resource includes at least one of a subcarrier 12n+2, a subcarrier 12n+3, a subcarrier 12n+8, and a subcarrier 12n+9 of the resource unit in frequency domain; and when a time-frequency resource to which the second DMRS port group is mapped is the second symbol in time domain, the time-frequency resource includes at least one of a subcarrier 12n+4, a subcarrier 12n+5, a subcarrier 12n+10, and a subcarrier 12n+11 of the resource unit in frequency domain.

When a time-frequency resource to which the third DMRS port group is mapped is the first symbol in time domain, the time-frequency resource includes at least one of a subcarrier 12n+4, a subcarrier 12n+5, a subcarrier 12n+10, and a subcarrier 12n+11 of the resource unit in frequency domain; and when a time-frequency resource to which the third DMRS port group is mapped is the second symbol in time domain, the time-frequency resource includes at least one of a subcarrier 12n, a subcarrier 12n+1, a subcarrier 12n+6, and a subcarrier 12n+7 of the resource unit in frequency domain.

n may be any one or more integers greater than or equal to 0 and less than $\lfloor M/12 \rfloor$.

(f) in FIG. 12 is a schematic diagram of a mapping rule of the six DMRS ports. Each small shaded block indicates an RE to which a DMRS port group is mapped, and n=0.

(3) The six DMRS ports are divided into two DMRS port groups, and each DMRS port group includes three DMRS ports. The two DMRS port groups include a first DMRS port group and a second DMRS port group. A same time-frequency resource is multiplexed in a CDM manner for DMRSs corresponding to DMRS ports in each DMRS port group. Mapping rules of the two DMRS port groups are as follows:

First: A time-frequency resource to which each DMRS port group is mapped includes the first symbol and the second symbol; and for the time-frequency resource to which each DMRS port group is mapped in frequency domain, reference may be made to the first solution corresponding to (a) in FIG. 9. In this case, an example is shown in (a) in FIG. 13. In this solution, the ports are evenly distributed in frequency domain and distributed on both the symbols, and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In addition, in this solution, a method for performing multiplexing for more ports in each port group supports transmission through more ports without changing an original port mapping. Therefore, this solution is more generally used. In addition, the ports are evenly mapped in frequency domain, thereby facilitating flexible scheduling. Further, power boosting or data transmission may be performed at a location of an unoccupied port group. In addition, a CDM length in a port group is small, thereby ensuring better orthogonality between the ports.

Second: A time-frequency resource to which each DMRS port group is mapped includes the first symbol and the second symbol; and for the time-frequency resource to which each DMRS port group is mapped in frequency domain, reference may be made to the second solution corresponding to (b) in FIG. 9. In this case, an example is shown in (b) in FIG. 13.

Third: A time-frequency resource to which each DMRS port group is mapped includes the first symbol and the second symbol.

When a time-frequency resource to which the first DMRS port group is mapped is the first symbol in time domain, the time-frequency resource includes a subcarrier 2n of the resource unit in frequency domain; and when a time-frequency resource to which the first DMRS port group is mapped is the second symbol in time domain, the time-frequency resource includes a subcarrier 2n+1 of the resource unit in frequency domain.

When a time-frequency resource to which the second DMRS port group is mapped is the first symbol in time domain, the time-frequency resource includes a subcarrier 2n+1 of the resource unit in frequency domain; and when a time-frequency resource to which the second DMRS port group is mapped is the second symbol in time domain, the time-frequency resource includes a subcarrier 2n of the resource unit in frequency domain.

n may be any one or more integers greater than or equal to 0 and less than $\lfloor M/2 \rfloor$.

Figure 13:
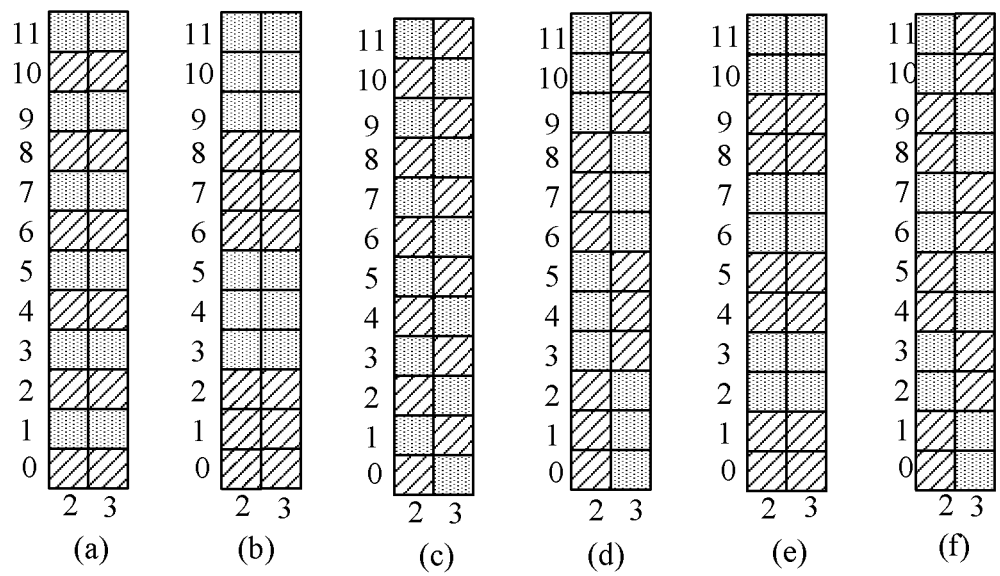
FIG. 13 is a schematic diagram of another pilot pattern for six ports according to an embodiment of this application.

(c) in FIG. 13 is a schematic diagram of a mapping rule of the six DMRS ports. Each small shaded block indicates an RE to which a DMRS port group is mapped, and n=0, 1, 2, 3, 4, or 5.

Fourth: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+2, a subcarrier 12n+6, a subcarrier 12n+7, and a subcarrier 12n+8 of the resource unit in frequency domain; and when a time-frequency resource to which the first DMRS port group is mapped is the second symbol in time domain, the time-frequency resource includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+2, a subcarrier 12n+6, a subcarrier 12n+7, and a subcarrier 12n+8 of the resource unit in frequency domain.

n may be any one or more integers greater than or equal to 0 and less than $\lfloor M/12 \rfloor$.

(d) in FIG. 13 is a schematic diagram of a mapping rule of the six DMRS ports. Each small shaded block indicates an RE to which a DMRS port group is mapped, and n=0.

Fifth: A time-frequency resource to which each DMRS port group is mapped includes the first symbol and the second symbol.

When a time-frequency resource to which the first DMRS port group is mapped is the first symbol and the second symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

When a time-frequency resource to which the second DMRS port group is mapped is the first symbol and the second symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

n may be any one or more integers greater than or equal to 0 and less than $\lfloor M/12 \rfloor$.

(e) in FIG. 13 is a schematic diagram of a mapping rule of the six DMRS ports. Each small shaded block indicates an RE to which a DMRS port group is mapped, and n=0.

Sixth: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain; and when a time-frequency resource to which the first DMRS port group is mapped is the second symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

n may be any one or more integers greater than or equal to 0 and less than $\lfloor M/12 \rfloor$.

(f) in FIG. 13 is a schematic diagram of a mapping rule of the six DMRS ports. Each small shaded block indicates an RE to which a DMRS port group is mapped, and n=0.

(4) A same time-frequency resource is multiplexed in a CDM manner for DMRSs corresponding to the six DMRS ports. In this case, the six DMRS ports may be considered as one DMRS port group. Mapping rules of the DMRS port group are as follows:

First: A time-frequency resource to which the DMRS port group is mapped includes the first symbol and the second symbol; and for the time-frequency resource to which the DMRS port group is mapped in frequency domain, reference may be made to the first solution corresponding to (a) in FIG. 10. In this case, an example is shown in (a) in FIG. 14.

Second: A time-frequency resource to which the DMRS port group is mapped includes the first symbol and the second symbol; and for the time-frequency resource to which the DMRS port group is mapped in frequency domain, reference may be made to the second solution corresponding to (b) in FIG. 10. In this case, an example is shown in (b) in FIG. 14.

Third:

When a time-frequency resource to which the DMRS port group is mapped is the first symbol in time domain, the time-frequency resource includes a subcarrier 2n of the resource unit in frequency domain; and when a time-frequency resource to which the DMRS port group is mapped is the second symbol in time domain, the time-frequency resource includes a subcarrier 2n+1 of the resource unit in frequency domain.

n may be any one or more integers greater than or equal to 0 and less than $\lfloor M/2 \rfloor$.

Figure 14:
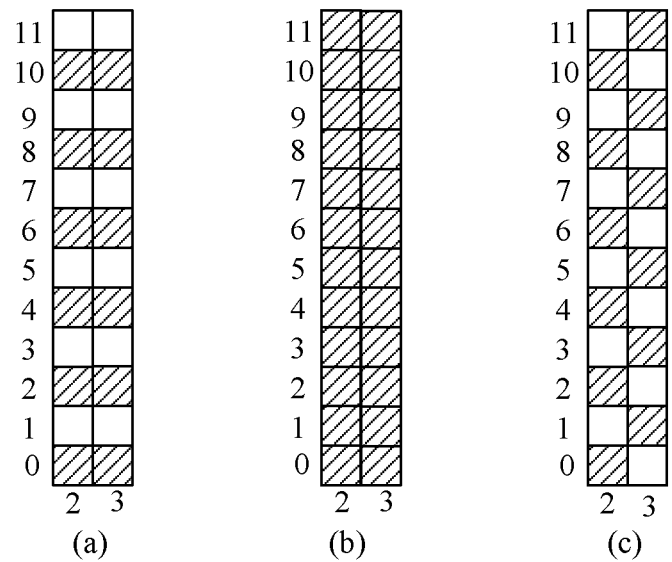
FIG. 14 is a schematic diagram of another pilot pattern for six ports according to an embodiment of this application.

(c) in FIG. 14 is a schematic diagram of a mapping rule of the six DMRS ports. Each small shaded block indicates an RE to which a DMRS port group is mapped, and n=0, 1, 2, 3, 4, or 5. A small blank block indicates an RE to which a DMRS port is not mapped.

A total quantity of system-supported DMRS ports is 8.

1. Time-frequency resources to which the eight DMRS ports are mapped include a first symbol of a resource unit in time domain.

The eight DMRS ports are divided into four DMRS port groups, and each DMRS port group includes two DMRS ports. The four DMRS port groups include a first DMRS port group, a second DMRS port group, a third DMRS port group, and a fourth DMRS port group. A same time-frequency resource is multiplexed in a CDM manner for DMRSs corresponding to DMRS ports in each DMRS port group. Mapping rules of the four DMRS port groups are as follows:

A time-frequency resource to which the first DMRS port group is mapped includes at least one of a subcarrier 12n, a subcarrier 12n+1, and a subcarrier 12n+2 of the resource unit in frequency domain.

A time-frequency resource to which the second DMRS port group is mapped includes at least one of a subcarrier 12n+3, a subcarrier 12n+4, and a subcarrier 12n+5 of the resource unit in frequency domain.

A time-frequency resource to which the third DMRS port group is mapped includes at least one of a subcarrier 12n+6, a subcarrier 12n+7, and a subcarrier 12n+8 of the resource unit in frequency domain.

A time-frequency resource to which the fourth DMRS port group is mapped includes at least one of a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

Figure 15:
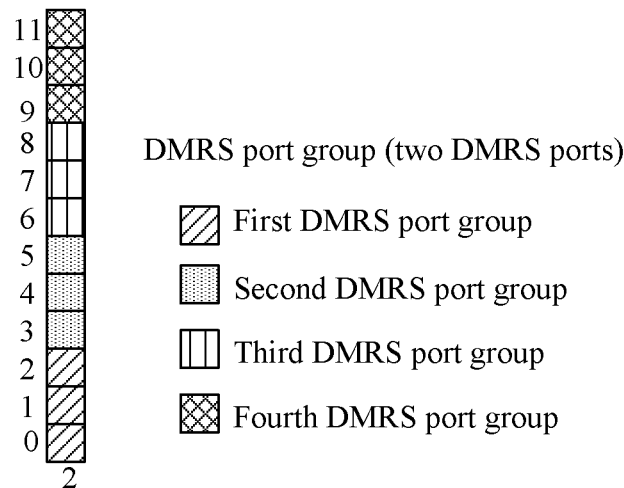
FIG. 15 is a schematic diagram of a pilot pattern for eight ports according to an embodiment of this application.

FIG. 15 is a schematic diagram of a mapping rule of the eight DMRS ports. Each small shaded block indicates an RE to which a DMRS port group is mapped, and n=0.

2. Time-frequency resources to which the eight DMRS ports are mapped include a first symbol and a second symbol of a resource unit in time domain.

(1) The eight DMRS ports are divided into four DMRS port groups, and each DMRS port group includes two DMRS ports. The four DMRS port groups include a first DMRS port group, a second DMRS port group, a third DMRS port group, and a fourth DMRS port group. A same time-frequency resource is multiplexed in a CDM manner for DMRSs corresponding to DMRS ports in each DMRS port group. Mapping rules of the four DMRS port groups are as follows:

First: A time-frequency resource to which each DMRS port group is mapped includes the first symbol and the second symbol; and for the time-frequency resource to which each DMRS port group is mapped in frequency domain, reference may be made to the solution corresponding to FIG. 15. In this case, an example is shown in (a) in FIG. 16.

Second: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, and a subcarrier 12n+2 of the resource unit in frequency domain; and when a time-frequency resource to which the first DMRS port group is mapped is the second symbol in time domain, the time-frequency resource includes at least one of a subcarrier 12n+6, a subcarrier 12n+7, and a subcarrier 12n+8 of the resource unit in frequency domain.

When a time-frequency resource to which the second DMRS port group is mapped is the first symbol in time domain, the time-frequency resource includes at least one of a subcarrier 12n+3, a subcarrier 12n+4, and a subcarrier 12n+5 of the resource unit in frequency domain; and when a time-frequency resource to which the second DMRS port group is mapped is the second symbol in time domain, the time-frequency resource includes at least one of a subcarrier 12n+9, a subcarrier 12n+10, and a subcarrier 12n+11 of the resource unit in frequency domain.

When a time-frequency resource to which the third DMRS port group is mapped is the first symbol in time domain, the time-frequency resource includes at least one of a subcarrier 12n+6, a subcarrier 12n+7, and a subcarrier 12n+8 of the resource unit in frequency domain; and when a time-frequency resource to which the third DMRS port group is mapped is the second symbol in time domain, the time-frequency resource includes at least one of a subcarrier 12n, a subcarrier 12n+1, and a subcarrier 12n+2 of the resource unit in frequency domain.

When a time-frequency resource to which the fourth DMRS port group is mapped is the first symbol in time domain, the time-frequency resource includes at least one of a subcarrier 12n+9, a subcarrier 12n+10, and a subcarrier 12n+11 of the resource unit in frequency domain; and when a time-frequency resource to which the fourth DMRS port group is mapped is the second symbol in time domain, the time-frequency resource includes at least one of a subcarrier 12n+3, a subcarrier 12n+4, and a subcarrier 12n+5 of the resource unit in frequency domain.

n may be any one or more integers greater than or equal to 0 and less than $\lfloor M/12 \rfloor$.

Figure 16:
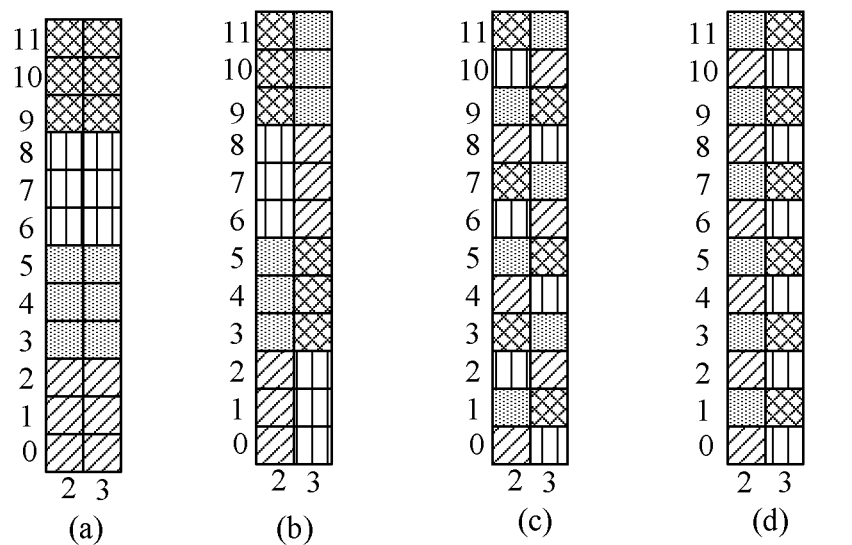
FIG. 16 is a schematic diagram of another pilot pattern for eight ports according to an embodiment of this application.

(b) in FIG. 16 is a schematic diagram of a mapping rule of the eight DMRS ports. Each small shaded block indicates an RE to which a DMRS port group is mapped, and n=0.

Third: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+4, and a subcarrier 12n+8 of the resource unit in frequency domain; and when a time-frequency resource to which the first DMRS port group is mapped is the second symbol in time domain, the time-frequency resource includes at least one of a subcarrier 12n+2, a subcarrier 12n+6, and a subcarrier 12n+10 of the resource unit in frequency domain.

When a time-frequency resource to which the second DMRS port group is mapped is the first symbol in time domain, the time-frequency resource includes at least one of a subcarrier 12n+1, a subcarrier 12n+5, and a subcarrier 12n+9 of the resource unit in frequency domain; and when a time-frequency resource to which the second DMRS port group is mapped is the second symbol in time domain, the time-frequency resource includes at least one of a subcarrier 12n+3, a subcarrier 12n+7, and a subcarrier 12n+11 of the resource unit in frequency domain.

When a time-frequency resource to which the third DMRS port group is mapped is the first symbol in time domain, the time-frequency resource includes at least one of a subcarrier 12n+2, a subcarrier 12n+6, and a subcarrier 12n+10 of the resource unit in frequency domain; and when a time-frequency resource to which the third DMRS port group is mapped is the second symbol in time domain, the time-frequency resource includes at least one of a subcarrier 12n, a subcarrier 12n+4, and a subcarrier 12n+8 of the resource unit in frequency domain.

When a time-frequency resource to which the fourth DMRS port group is mapped is the first symbol in time domain, the time-frequency resource includes at least one of a subcarrier 12n+3, a subcarrier 12n+7, and a subcarrier 12n+11 of the resource unit in frequency domain; and when a time-frequency resource to which the fourth DMRS port group is mapped is the second symbol in time domain, the time-frequency resource includes at least one of a subcarrier 12n+1, a subcarrier 12n+5, and a subcarrier 12n+9 of the resource unit in frequency domain.

n may be any one or more integers greater than or equal to 0 and less than $\lfloor M/12 \rfloor$.

(c) in FIG. 16 is a schematic diagram of a mapping rule of the eight DMRS ports. Each small shaded block indicates an RE to which a DMRS port group is mapped, and n=0.

Fourth: Time-frequency resources to which the first and second DMRS port groups are mapped include the first symbol in time domain, and time-frequency resources to which the third and fourth DMRS port groups are mapped include the second symbol in time domain.

When the time-frequency resource to which the first DMRS port group is mapped is the first symbol in time domain, the time-frequency resource includes a subcarrier 2n of the resource unit in frequency domain.

When the time-frequency resource to which the second DMRS port group is mapped is the first symbol in time domain, the time-frequency resource includes a subcarrier 2n+1 of the resource unit in frequency domain.

When the time-frequency resource to which the third DMRS port group is mapped is the second symbol in time domain, the time-frequency resource includes a subcarrier 2n of the resource unit in frequency domain.

When the time-frequency resource to which the fourth DMRS port group is mapped is the second symbol in time domain, the time-frequency resource includes a subcarrier 2n+1 of the resource unit in frequency domain.

n may be any one or more integers greater than or equal to 0 and less than $\lfloor M/2 \rfloor$.

(d) in FIG. 16 is a schematic diagram of a mapping rule of the eight DMRS ports. Each small shaded block indicates an RE to which a DMRS port group is mapped, and n=0, 1, 2, 3, 4, or 5. In this solution, the ports are evenly distributed in frequency domain and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In this solution, each port is mapped to only one symbol. Therefore, phase noise impact is avoided, and this solution may be used in a high-frequency scenario. In this solution, different quantities of symbols may also be used for different ports, and a port mapping location is fixed. Therefore, flexibility is better, performance is ensured, and overheads are reduced. In addition, the ports are evenly mapped in frequency domain, thereby facilitating flexible scheduling.

(2) The eight DMRS ports are divided into two DMRS port groups, and each DMRS port group includes four DMRS ports. The two DMRS port groups include a first DMRS port group and a second DMRS port group. A same time-frequency resource is multiplexed in a CDM manner for DMRSs corresponding to DMRS ports in each DMRS port group. Mapping rules of the two DMRS port groups are as follows:

First: A time-frequency resource to which each DMRS port group is mapped includes the first symbol and the second symbol.

When a time-frequency resource to which the first DMRS port group is mapped is the first symbol and the second symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

When a time-frequency resource to which the second DMRS port group is mapped is the first symbol and the second symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

n may be any one or more integers greater than or equal to 0 and less than $\lfloor M/12 \rfloor$.

Figure 17:
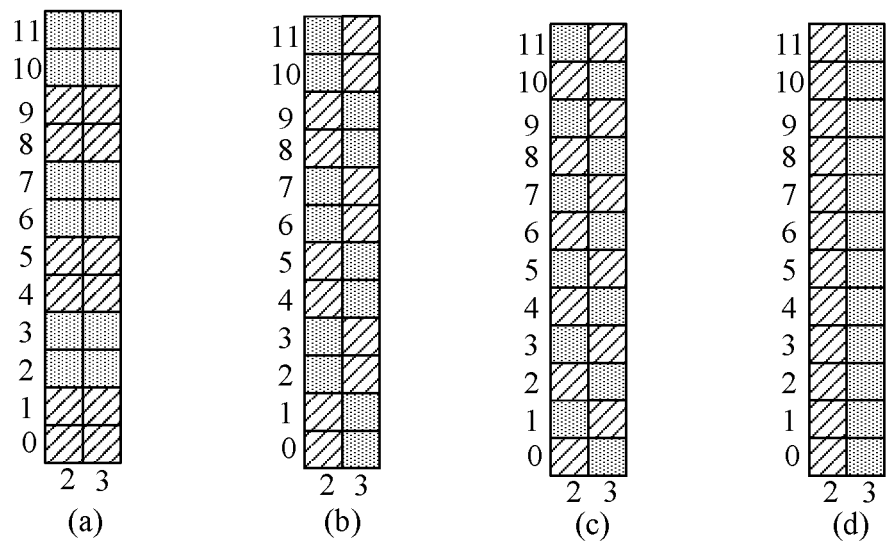
FIG. 17 is a schematic diagram of another pilot pattern for eight ports according to an embodiment of this application.

(a) in FIG. 17 is a schematic diagram of a mapping rule of the eight DMRS ports. Each small shaded block indicates an RE to which a DMRS port group is mapped, and n=0. In this solution, the ports are evenly distributed in two symbols in time domain and in frequency domain and have a high density. This ensures high channel estimation accuracy in various scenarios. In addition, this solution is applicable to a plurality of types of carrier systems, and uplink and downlink systems, thereby reducing DMRS indication overheads and design complexity. In this solution, each port is mapped to only consecutive REs, so that orthogonality between ports in a port group is less affected by a channel. This ensures channel estimation accuracy. In addition, the ports are evenly mapped in frequency domain, thereby facilitating flexible scheduling. Further, power boosting or data transmission may be performed at a location of an unoccupied port group.

Second: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain; and when a time-frequency resource to which the first DMRS port group is mapped is the second symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

n may be any one or more integers greater than or equal to 0 and less than $\lfloor M/12 \rfloor$.

(b) in FIG. 17 is a schematic diagram of a mapping rule of the eight DMRS ports. Each small shaded block indicates an RE to which a DMRS port group is mapped, and n=0.

Third: A time-frequency resource to which each DMRS port group is mapped includes the first symbol and the second symbol.

When a time-frequency resource to which the first DMRS port group is mapped is the first symbol in time domain, the time-frequency resource includes a subcarrier 2n of the resource unit in frequency domain; and when a time-frequency resource to which the first DMRS port group is mapped is the second symbol in time domain, the time-frequency resource includes a subcarrier 2n+1 of the resource unit in frequency domain.

When a time-frequency resource to which the second DMRS port group is mapped is the first symbol in time domain, the time-frequency resource includes a subcarrier 2n+1 of the resource unit in frequency domain; and when a time-frequency resource to which the second DMRS port group is mapped is the second symbol in time domain, the time-frequency resource includes a subcarrier 2n of the resource unit in frequency domain.

n may be any one or more integers greater than or equal to 0 and less than $\lfloor M/2 \rfloor$.

(c) in FIG. 17 is a schematic diagram of a mapping rule of the eight DMRS ports. Each small shaded block indicates an RE to which a DMRS port group is mapped, and n=0, 1, 2, 3, 4, or 5.

Fourth: A time-frequency resource to which the first DMRS port group is mapped includes the first symbol in time domain, and a time-frequency resource to which the second DMRS port group is mapped includes the second symbol in time domain.

When the time-frequency resource to which the first DMRS port group is mapped is the first symbol in time domain, the time-frequency resource includes a subcarrier n of the resource unit in frequency domain.

When the time-frequency resource to which the second DMRS port group is mapped is the second symbol in time domain, the time-frequency resource includes a subcarrier n of the resource unit in frequency domain.

n may be any one or more integers greater than or equal to 0 and less than M.

(d) in FIG. 17 is a schematic diagram of a mapping rule of the eight DMRS ports. Each small shaded block indicates an RE to which a DMRS port group is mapped, and n=0, 1, 2, 3, 4, 5, 6, 7, 8, 9, 10, or 11.

(3) A same time-frequency resource is multiplexed in a CDM manner for DMRSs corresponding to the eight DMRS ports. In this case, the eight DMRS ports may be considered as one DMRS port group. Mapping rules of the DMRS port group are as follows:

When a time-frequency resource to which the DMRS port group is mapped includes the first symbol and the second symbol in time domain, the time-frequency resource includes a subcarrier n of the resource unit in frequency domain.

n may be any one or more integers greater than or equal to 0 and less than M.

Figure 18:
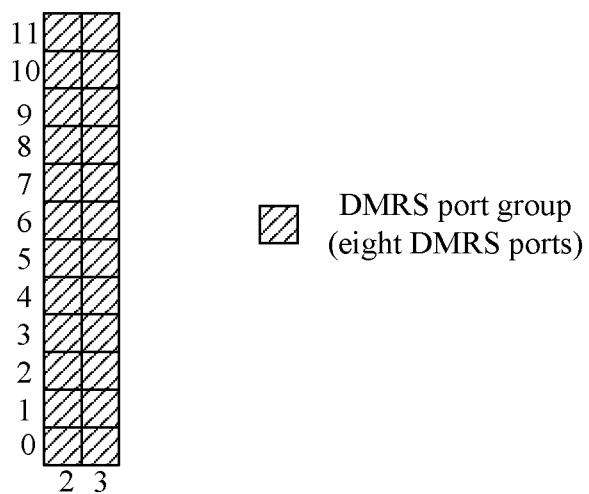
FIG. 18 is a schematic diagram of another pilot pattern for eight ports according to an embodiment of this application.

FIG. 18 is a schematic diagram of a mapping rule of the eight DMRS ports. Each small shaded block indicates an RE to which a DMRS port group is mapped, and n=0, 1, 2, 3, 4, 5, 6, 7, 8, 9, 10, or 11.

A total quantity of system-supported DMRS ports is 12.

1. Time-frequency resources to which the 12 DMRS ports are mapped include a first symbol of a resource unit in time domain.

(1) The 12 DMRS ports are divided into six DMRS port groups, and each DMRS port group includes two DMRS ports. The six DMRS port groups include a first DMRS port group, a second DMRS port group, a third DMRS port group, a fourth DMRS port group, a fifth DMRS port group, and a sixth DMRS port group. A same time-frequency resource is multiplexed in a CDM manner for DMRSs corresponding to DMRS ports in each DMRS port group. Mapping rules of the six DMRS port groups are as follows:

First:

A time-frequency resource to which the first DMRS port group is mapped includes at least one of a subcarrier 12n and a subcarrier 12n+1 of the resource unit in frequency domain.

A time-frequency resource to which the second DMRS port group is mapped includes at least one of a subcarrier 12n+2 and a subcarrier 12n+3 of the resource unit in frequency domain.

A time-frequency resource to which the third DMRS port group is mapped includes at least one of a subcarrier 12n+4 and a subcarrier 12n+5 of the resource unit in frequency domain.

A time-frequency resource to which the fourth DMRS port group is mapped includes at least one of a subcarrier 12n+6 and a subcarrier 12n+7 of the resource unit in frequency domain.

A time-frequency resource to which the fifth DMRS port group is mapped includes at least one of a subcarrier 12n+8 and a subcarrier 12n+9 of the resource unit in frequency domain.

A time-frequency resource to which the sixth DMRS port group is mapped includes at least one of a subcarrier 12n+10 and a subcarrier 12n+11 of the resource unit in frequency domain.

n may be any one or more integers greater than or equal to 0 and less than $\lfloor M/12 \rfloor$.

Figure 19:
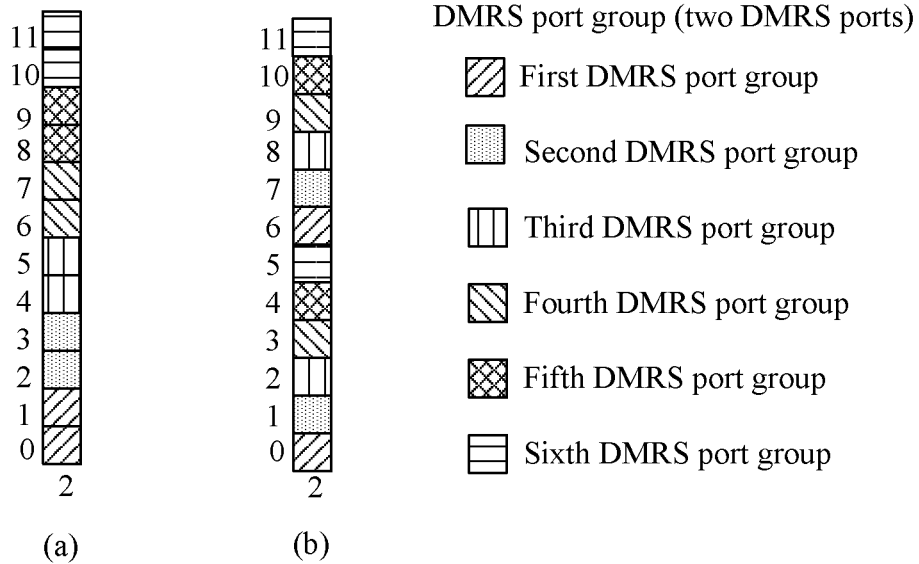
FIG. 19 is a schematic diagram of a pilot pattern for 12 ports according to an embodiment of this application.

(a) in FIG. 19 is a schematic diagram of a mapping rule of the twelve DMRS ports. Each small shaded block indicates an RE to which a DMRS port group is mapped, and n=0.

Second:

A time-frequency resource to which the first DMRS port group is mapped includes a subcarrier 6n of the resource unit in frequency domain.

A time-frequency resource to which the second DMRS port group is mapped includes a subcarrier 6n+1 of the resource unit in frequency domain.

A time-frequency resource to which the third DMRS port group is mapped includes a subcarrier 6n+2 of the resource unit in frequency domain.

A time-frequency resource to which the fourth DMRS port group is mapped includes a subcarrier 6n+3 of the resource unit in frequency domain.

A time-frequency resource to which the fifth DMRS port group is mapped includes a subcarrier 6n+4 of the resource unit in frequency domain.

A time-frequency resource to which the sixth DMRS port group is mapped includes a subcarrier 6n+5 of the resource unit in frequency domain.

n may be any one or more integers greater than or equal to 0 and less than $\lfloor M/6 \rfloor$.

(b) in FIG. 19 is a schematic diagram of a mapping rule of the 12 DMRS ports. Each small shaded block indicates an RE to which a DMRS port group is mapped, and n=0 or 1. The ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In this solution, only one symbol is occupied. Therefore, system overheads are low, and this solution can be used in a high-frequency scenario. This solution may further support more ports in a manner of adding symbols, and therefore flexibility is better. In addition, the ports are evenly mapped in frequency domain, thereby facilitating flexible scheduling. Further, power boosting or data transmission may be performed at a location of an unoccupied port group. In addition, in this solution, a port mapping location is fixed, a same pilot pattern is used for different ports, and therefore system indication overheads are reduced.

(2) The 12 DMRS ports are divided into four DMRS port groups, and each DMRS port group includes three DMRS ports. The four DMRS port groups include a first DMRS port group, a second DMRS port group, a third DMRS port group, and a fourth DMRS port group. A same time-frequency resource is multiplexed in a CDM manner for DMRSs corresponding to DMRS ports in each DMRS port group. Mapping rules of the four DMRS port groups are as follows:

A time-frequency resource to which the first DMRS port group is mapped includes at least one of a subcarrier 12n, a subcarrier 12n+1, and a subcarrier 12n+2 of the resource unit in frequency domain.

A time-frequency resource to which the second DMRS port group is mapped includes at least one of a subcarrier 12n+3, a subcarrier 12n+4, and a subcarrier 12n+5 of the resource unit in frequency domain.

A time-frequency resource to which the third DMRS port group is mapped includes at least one of a subcarrier 12n+6, a subcarrier 12n+7, and a subcarrier 12n+8 of the resource unit in frequency domain.

A time-frequency resource to which the fourth DMRS port group is mapped includes at least one of a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

Figure 20:
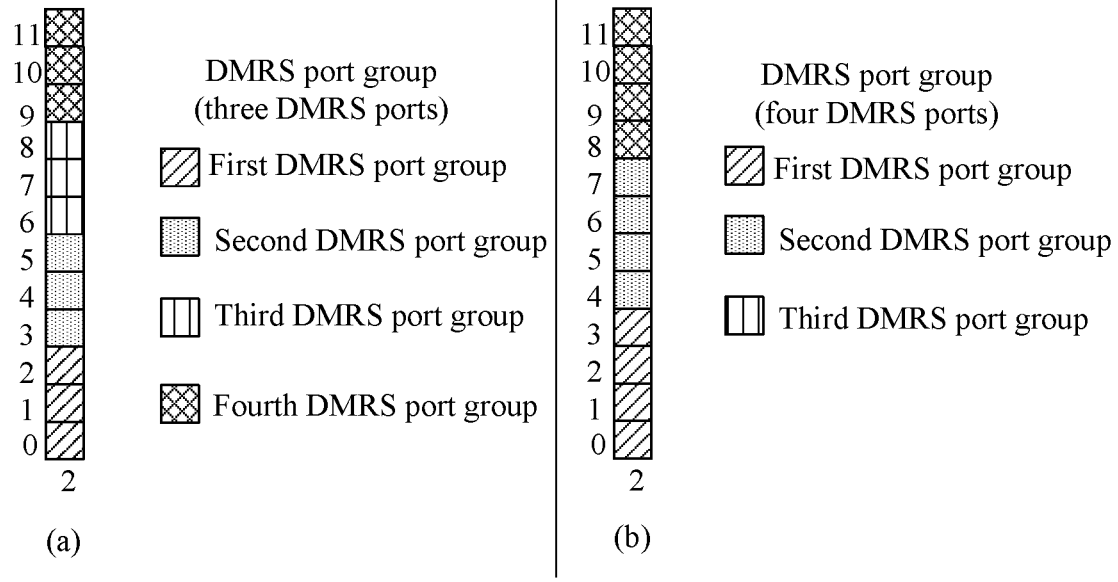
FIG. 20 is a schematic diagram of another pilot pattern for 12 ports according to an embodiment of this application.

(a) in FIG. 20 is a schematic diagram of a mapping rule of the 12 DMRS ports. Each small shaded block indicates an RE to which a DMRS port group is mapped, and n=0.

(3) The 12 DMRS ports are divided into three DMRS port groups, and each DMRS port group includes four DMRS ports. The three DMRS port groups include a first DMRS port group, a second DMRS port group, and a third DMRS port group. A same time-frequency resource is multiplexed in a CDM manner for DMRSs corresponding to DMRS ports in each DMRS port group. Mapping rules of the three DMRS port groups are as follows:

A time-frequency resource to which the first DMRS port group is mapped includes at least one of a subcarrier 12n, a subcarrier 12n+1, a subcarrier 12n+2, and a subcarrier 12n+3 of the resource unit in frequency domain.

A time-frequency resource to which the second DMRS port group is mapped includes at least one of a subcarrier 12n+4, a subcarrier 12n+5, a subcarrier 12n+6, and a subcarrier 12n+7 of the resource unit in frequency domain.

A time-frequency resource to which the third DMRS port group is mapped includes at least one of a subcarrier 12n+8, a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

(b) in FIG. 20 is a schematic diagram of a mapping rule of the 12 DMRS ports. Each small shaded block indicates an RE to which a DMRS port group is mapped, and n=0.

(4) The 12 DMRS ports are divided into two DMRS port groups, and each DMRS port group includes six DMRS ports. The two DMRS port groups include a first DMRS port group and a second DMRS port group. A same time-frequency resource is multiplexed in a CDM manner for DMRSs corresponding to DMRS ports in each DMRS port group. Mapping rules of the two DMRS port groups are as follows:

First:

A time-frequency resource to which the first DMRS port group is mapped includes at least one of a subcarrier 12n, a subcarrier 12n+1, a subcarrier 12n+2, a subcarrier 12n+3, a subcarrier 12n+4, and a subcarrier 12n+5 of the resource unit in frequency domain.

A time-frequency resource to which the second DMRS port group is mapped includes at least one of a subcarrier 12n+6, a subcarrier 12n+7, a subcarrier 12n+8, a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

Figure 21:
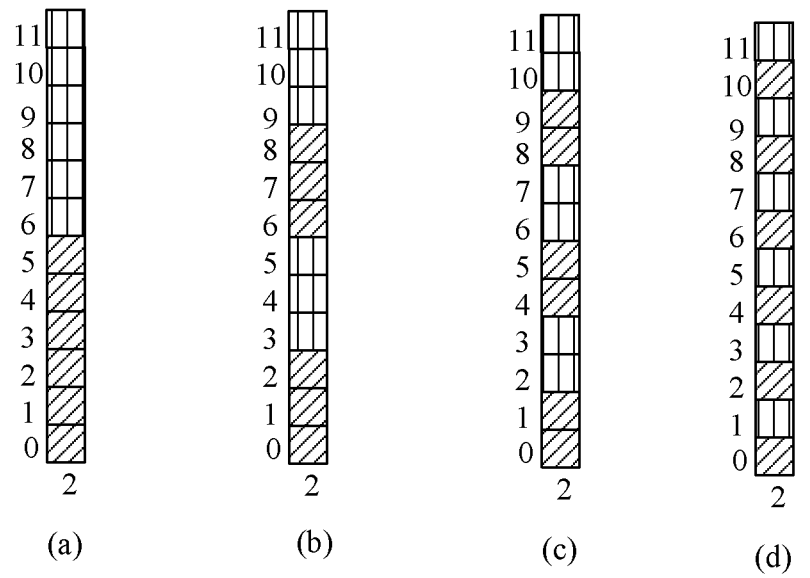
FIG. 21 is a schematic diagram of another pilot pattern for 12 ports according to an embodiment of this application.

(a) in FIG. 21 is a schematic diagram of a mapping rule of the 12 DMRS ports. Each small shaded block indicates an RE to which a DMRS port group is mapped, and n=0.

Second:

A time-frequency resource to which the first DMRS port group is mapped includes at least one of a subcarrier 12n, a subcarrier 12n+1, a subcarrier 12n+2, a subcarrier 12n+6, a subcarrier 12n+7, and a subcarrier 12n+8 of the resource unit in frequency domain.

A time-frequency resource to which the second DMRS port group is mapped includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

(b) in FIG. 21 is a schematic diagram of a mapping rule of the 12 DMRS ports. Each small shaded block indicates an RE to which a DMRS port group is mapped, and n=0.

Third:

A time-frequency resource to which the first DMRS port group is mapped includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

A time-frequency resource to which the second DMRS port group is mapped includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

n may be any one or more integers greater than or equal to 0 and less than $\lfloor M/12 \rfloor$.

(c) in FIG. 21 is a schematic diagram of a mapping rule of the 12 DMRS ports. Each small shaded block indicates an RE to which a DMRS port group is mapped, and n=0.

Fourth:

A time-frequency resource to which the first DMRS port group is mapped includes a subcarrier 2n of the resource unit in frequency domain.

A time-frequency resource to which the second DMRS port group is mapped includes a subcarrier 2n+1 of the resource unit in frequency domain.

n may be any one or more integers greater than or equal to 0 and less than $\lfloor M/2 \rfloor$.

(d) in FIG. 21 is a schematic diagram of a mapping rule of the 12 DMRS ports. Each small shaded block indicates an RE to which a DMRS port group is mapped, and n=0, 1, 2, 3, 4, or 5. In this solution, the ports are evenly distributed in frequency domain and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In this solution, only one symbol is occupied. Therefore, system overheads are low, and this solution can be used in a high-frequency scenario. In addition, the ports are evenly mapped in frequency domain, thereby facilitating flexible scheduling. Further, power boosting or data transmission may be performed at a location of an unoccupied port group. A port mapping location is fixed, a same pilot pattern is used for different ports, and therefore system indication overheads are reduced.

(4) A same time-frequency resource is multiplexed in a CDM manner for DMRSs corresponding to the 12 DMRS ports. In this case, the 12 DMRS ports may be considered as one DMRS port group. Mapping rules of the DMRS port group are as follows:

A time-frequency resource to which the DMRS port group is mapped includes a subcarrier n of the resource unit in frequency domain.

n may be any one or more integers greater than or equal to 0 and less than M.

Figure 22:
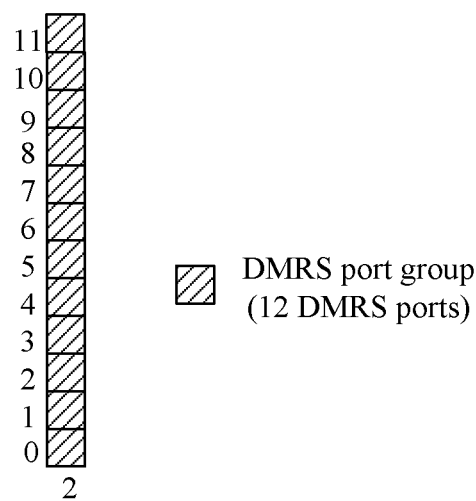
FIG. 22 is a schematic diagram of another pilot pattern for 12 ports according to an embodiment of this application.

FIG. 22 is a schematic diagram of a mapping rule of the 12 DMRS ports. Each small shaded block indicates an RE to which a DMRS port group is mapped, and n=0, 1, 2, 3, 4, 5, 6, 7, 8, 9, 10, or 11.

2. Time-frequency resources to which the 12 DMRS ports are mapped include a first symbol and a second symbol of a resource unit in time domain.

(1) The 12 DMRS ports are divided into six DMRS port groups, and each DMRS port group includes two DMRS ports. The six DMRS port groups include a first DMRS port group, a second DMRS port group, a third DMRS port group, a fourth DMRS port group, a fifth DMRS port group, and a sixth DMRS port group. A same time-frequency resource is multiplexed in a CDM manner for DMRSs corresponding to DMRS ports in each DMRS port group. Mapping rules of the six DMRS port groups are as follows:

First: A time-frequency resource to which each DMRS port group is mapped includes the first symbol and the second symbol; and for the time-frequency resource to which each DMRS port group is mapped in frequency domain, reference may be made to the solution corresponding to (a) in FIG. 19. In this case, an example is shown in (a) in FIG. 23.

Second: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n and a subcarrier 12n+1 of the resource unit in frequency domain; and when a time-frequency resource to which the first DMRS port group is mapped is the second symbol in time domain, the time-frequency resource includes at least one of a subcarrier 12n+6 and a subcarrier 12n+7 of the resource unit in frequency domain.

When a time-frequency resource to which the second DMRS port group is mapped is the first symbol in time domain, the time-frequency resource includes at least one of a subcarrier 12n+2 and a subcarrier 12n+3 of the resource unit in frequency domain; and when a time-frequency resource to which the second DMRS port group is mapped is the second symbol in time domain, the time-frequency resource includes at least one of a subcarrier 12n+8 and a subcarrier 12n+9 of the resource unit in frequency domain.

When a time-frequency resource to which the third DMRS port group is mapped is the first symbol in time domain, the time-frequency resource includes at least one of a subcarrier 12n+4 and a subcarrier 12n+5 of the resource unit in frequency domain; and when a time-frequency resource to which the third DMRS port group is mapped is the second symbol in time domain, the time-frequency resource includes at least one of a subcarrier 12n+10 and a subcarrier 12n+11 of the resource unit in frequency domain.

When a time-frequency resource to which the fourth DMRS port group is mapped is the first symbol in time domain, the time-frequency resource includes at least one of a subcarrier 12n+6 and a subcarrier 12n+7 of the resource unit in frequency domain; and when a time-frequency resource to which the fourth DMRS port group is mapped is the second symbol in time domain, the time-frequency resource includes at least one of a subcarrier 12n and a subcarrier 12n+1 of the resource unit in frequency domain.

When a time-frequency resource to which the fifth DMRS port group is mapped is the first symbol in time domain, the time-frequency resource includes at least one of a subcarrier 12n+8 and a subcarrier 12n+9 of the resource unit in frequency domain; and when a time-frequency resource to which the fifth DMRS port group is mapped is the second symbol in time domain, the time-frequency resource includes at least one of a subcarrier 12n+2 and a subcarrier 12n+3 of the resource unit in frequency domain.

When a time-frequency resource to which the sixth DMRS port group is mapped is the first symbol in time domain, the time-frequency resource includes at least one of a subcarrier 12n+10 and a subcarrier 12n+11 of the resource unit in frequency domain; and when a time-frequency resource to which the sixth DMRS port group is mapped is the second symbol in time domain, the time-frequency resource includes at least one of a subcarrier 12n+4 and a subcarrier 12n+5 of the resource unit in frequency domain.

n may be any one or more integers greater than or equal to 0 and less than $\lfloor M/12 \rfloor$.

Figure 23:
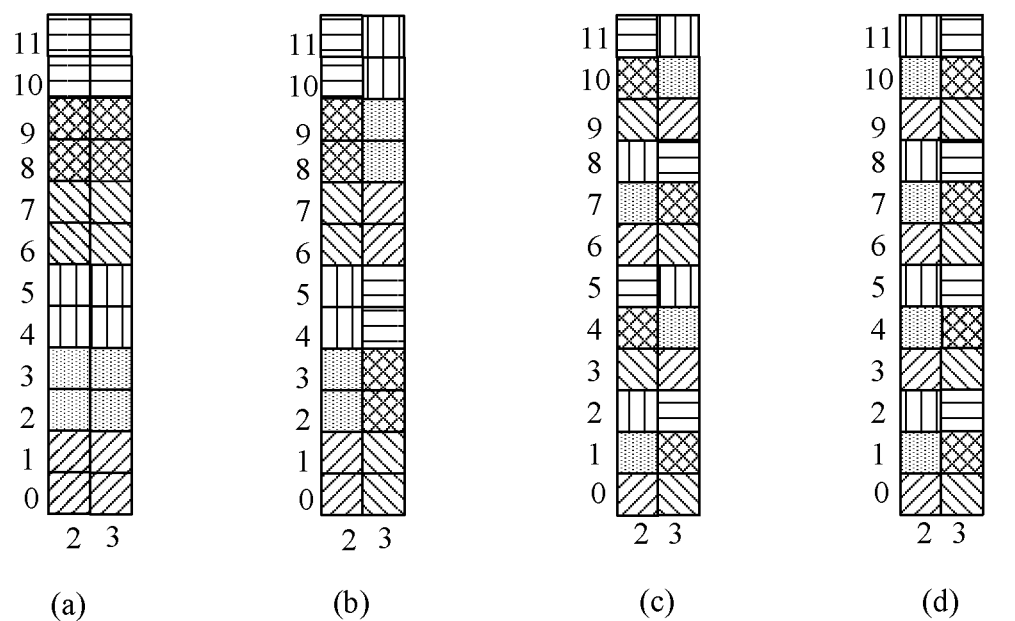
FIG. 23 is a schematic diagram of another pilot pattern for 12 ports according to an embodiment of this application.

(b) in FIG. 23 is a schematic diagram of a mapping rule of the 12 DMRS ports. Each small shaded block indicates an RE to which a DMRS port group is mapped, and n=0.

Third: A time-frequency resource to which each DMRS port group is mapped includes the first symbol and the second symbol.

When a time-frequency resource to which the first DMRS port group is mapped is the first symbol in time domain, the time-frequency resource includes a subcarrier 6n of the resource unit in frequency domain; and when a time-frequency resource to which the first DMRS port group is mapped is the second symbol in time domain, the time-frequency resource includes a subcarrier 6n+3 of the resource unit in frequency domain.

When a time-frequency resource to which the second DMRS port group is mapped is the first symbol in time domain, the time-frequency resource includes a subcarrier 6n+1 of the resource unit in frequency domain; and when a time-frequency resource to which the second DMRS port group is mapped is the second symbol in time domain, the time-frequency resource includes a subcarrier 6n+4 of the resource unit in frequency domain.

When a time-frequency resource to which the third DMRS port group is mapped is the first symbol in time domain, the time-frequency resource includes a subcarrier 6n+2 of the resource unit in frequency domain; and when a time-frequency resource to which the third DMRS port group is mapped is the second symbol in time domain, the time-frequency resource includes a subcarrier 6n+5 of the resource unit in frequency domain.

When a time-frequency resource to which the fourth DMRS port group is mapped is the first symbol in time domain, the time-frequency resource includes a subcarrier 6n+3 of the resource unit in frequency domain; and when a time-frequency resource to which the fourth DMRS port group is mapped is the second symbol in time domain, the time-frequency resource includes a subcarrier 6n of the resource unit in frequency domain.

When a time-frequency resource to which the fifth DMRS port group is mapped is the first symbol in time domain, the time-frequency resource includes a subcarrier 6n+4 of the resource unit in frequency domain; and when a time-frequency resource to which the fifth DMRS port group is mapped is the second symbol in time domain, the time-frequency resource includes a subcarrier 6n+1 of the resource unit in frequency domain.

When a time-frequency resource to which the sixth DMRS port group is mapped is the first symbol in time domain, the time-frequency resource includes a subcarrier 6n+5 of the resource unit in frequency domain; and when a time-frequency resource to which the sixth DMRS port group is mapped is the second symbol in time domain, the time-frequency resource includes a subcarrier 6n+2 of the resource unit in frequency domain.

n may be any one or more integers greater than or equal to 0 and less than $\lfloor M/6 \rfloor$.

(c) in FIG. 23 is a schematic diagram of a mapping rule of the 12 DMRS ports. Each small shaded block indicates an RE to which a DMRS port group is mapped, and n=0 or 1.

Fourth: Time-frequency resources to which the first, second, and third DMRS port groups are mapped include the first symbol in time domain, and time-frequency resources to which the fourth, fifth, and sixth DMRS port groups are mapped include the second symbol in time domain.

When the time-frequency resource to which the first DMRS port group is mapped is the first symbol in time domain, the time-frequency resource includes a subcarrier 3n of the resource unit in frequency domain.

When the time-frequency resource to which the second DMRS port group is mapped is the first symbol in time domain, the time-frequency resource includes a subcarrier 3n+1 of the resource unit in frequency domain.

When the time-frequency resource to which the third DMRS port group is mapped is the first symbol in time domain, the time-frequency resource includes a subcarrier 3n+2 of the resource unit in frequency domain.

When the time-frequency resource to which the fourth DMRS port group is mapped is the second symbol in time domain, the time-frequency resource includes a subcarrier 3n of the resource unit in frequency domain.

When the time-frequency resource to which the fifth DMRS port group is mapped is the second symbol in time domain, the time-frequency resource includes a subcarrier 3n+1 of the resource unit in frequency domain.

When the time-frequency resource to which the sixth DMRS port group is mapped is the second symbol in time domain, the time-frequency resource includes a subcarrier 3n+2 of the resource unit in frequency domain.

n may be any one or more integers greater than or equal to 0 and less than $\lfloor M/3 \rfloor$.

(d) in FIG. 23 is a schematic diagram of a mapping rule of the 12 DMRS ports. Each small shaded block indicates an RE to which a DMRS port group is mapped, and n=0, 1, 2, or 3. In this solution, the ports are evenly distributed in frequency domain and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In this solution, each port is mapped to only one symbol. Therefore, phase noise impact is avoided, and this solution may be used in a high-frequency scenario. In this solution, a quantity of symbols may be dynamically configured when quantities of ports are different. Therefore, flexibility is better, performance is ensured, and overheads are reduced. In addition, the ports are evenly mapped in frequency domain, thereby facilitating flexible scheduling.

(2) The 12 DMRS ports are divided into four DMRS port groups, and each DMRS port group includes three DMRS ports. The four DMRS port groups include a first DMRS port group, a second DMRS port group, a third DMRS port group, and a fourth DMRS port group. A same time-frequency resource is multiplexed in a CDM manner for DMRSs corresponding to DMRS ports in each DMRS port group. Mapping rules of the four DMRS port groups are as follows:

First: A time-frequency resource to which each DMRS port group is mapped includes the first symbol and the second symbol; and for the time-frequency resource to which each DMRS port group is mapped in frequency domain, reference may be made to the solution corresponding to (a) in FIG. 20. In this case, an example is shown in (a) in FIG. 24.

Second: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, and a subcarrier 12n+2 of the resource unit in frequency domain; and when a time-frequency resource to which the first DMRS port group is mapped is the second symbol in time domain, the time-frequency resource includes at least one of a subcarrier 12n+6, a subcarrier 12n+7, and a subcarrier 12n+8 of the resource unit in frequency domain.

When a time-frequency resource to which the second DMRS port group is mapped is the first symbol in time domain, the time-frequency resource includes at least one of a subcarrier 12n+3, a subcarrier 12n+4, and a subcarrier 12n+5 of the resource unit in frequency domain; and when a time-frequency resource to which the second DMRS port group is mapped is the second symbol in time domain, the time-frequency resource includes at least one of a subcarrier 12n+9, a subcarrier 12n+10, and a subcarrier 12n+11 of the resource unit in frequency domain.

When a time-frequency resource to which the third DMRS port group is mapped is the first symbol in time domain, the time-frequency resource includes at least one of a subcarrier 12n+6, a subcarrier 12n+7, and a subcarrier 12n+8 of the resource unit in frequency domain; and when a time-frequency resource to which the third DMRS port group is mapped is the second symbol in time domain, the time-frequency resource includes at least one of a subcarrier 12n, a subcarrier 12n+1, and a subcarrier 12n+2 of the resource unit in frequency domain.

When a time-frequency resource to which the fourth DMRS port group is mapped is the first symbol in time domain, the time-frequency resource includes at least one of a subcarrier 12n+9, a subcarrier 12n+10, and a subcarrier 12n+11 of the resource unit in frequency domain; and when a time-frequency resource to which the fourth DMRS port group is mapped is the second symbol in time domain, the time-frequency resource includes at least one of a subcarrier 12n+3, a subcarrier 12n+4, and a subcarrier 12n+5 of the resource unit in frequency domain.

n may be any one or more integers greater than or equal to 0 and less than $\lfloor M/12 \rfloor$.

Figure 24:
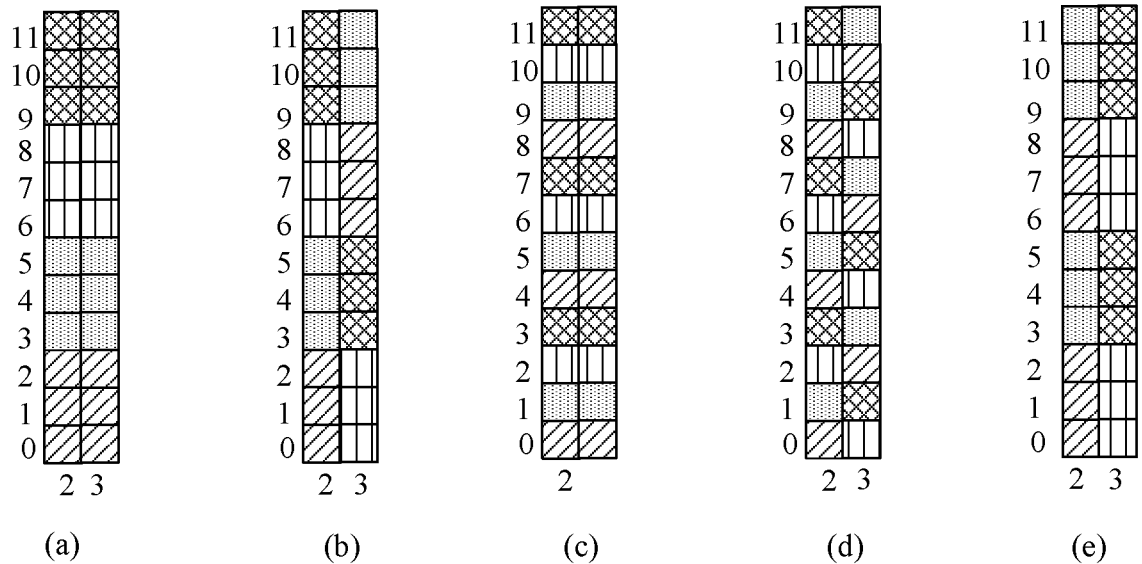
FIG. 24 is a schematic diagram of another pilot pattern for 12 ports according to an embodiment of this application.

(b) in FIG. 24 is a schematic diagram of a mapping rule of the 12 DMRS ports. Each small shaded block indicates an RE to which a DMRS port group is mapped, and n=0.

Third: A time-frequency resource to which each DMRS port group is mapped includes the first symbol and the second symbol.

When a time-frequency resource to which the first DMRS port group is mapped is the first symbol and the second symbol in time domain, the time-frequency resource includes a subcarrier 4n of the resource unit in frequency domain.

When a time-frequency resource to which the second DMRS port group is mapped is the first symbol and the second symbol in time domain, the time-frequency resource includes a subcarrier 4n+1 of the resource unit in frequency domain.

When a time-frequency resource to which the third DMRS port group is mapped is the first symbol and the second symbol in time domain, the time-frequency resource includes a subcarrier 4n+2 of the resource unit in frequency domain.

When a time-frequency resource to which the fourth DMRS port group is mapped is the first symbol and the second symbol in time domain, the time-frequency resource includes a subcarrier 4n+3 of the resource unit in frequency domain.

n may be any one or more integers greater than or equal to 0 and less than $\lfloor M/4 \rfloor$.

(c) in FIG. 24 is a schematic diagram of a mapping rule of the 12 DMRS ports. Each small shaded block indicates an RE to which a DMRS port group is mapped, and n=0, 1, or 2. In this solution, the ports are evenly distributed in frequency domain and distributed on the two symbols, and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In addition, a port mapping location is fixed, and flexible port transmission is supported without changing an original port mapping. Therefore, this solution is more generally used, and system indication overheads are reduced. In addition, the ports are evenly mapped in frequency domain, thereby facilitating flexible scheduling. Further, power boosting or data transmission may be performed at a location of an unoccupied port group. In addition, a CDM length in each port group is small, thereby ensuring better orthogonality between the ports.

Fourth: A time-frequency resource to which each DMRS port group is mapped includes the first symbol and the second symbol.

When a time-frequency resource to which the first DMRS port group is mapped is the first symbol in time domain, the time-frequency resource includes a subcarrier 4n of the resource unit in frequency domain; and when a time-frequency resource to which the first DMRS port group is mapped is the second symbol in time domain, the time-frequency resource includes a subcarrier 4n+2 of the resource unit in frequency domain.

When a time-frequency resource to which the second DMRS port group is mapped is the first symbol in time domain, the time-frequency resource includes a subcarrier 4n+1 of the resource unit in frequency domain; and when a time-frequency resource to which the second DMRS port group is mapped is the second symbol in time domain, the time-frequency resource includes a subcarrier 4n+3 of the resource unit in frequency domain.

When a time-frequency resource to which the third DMRS port group is mapped is the first symbol in time domain, the time-frequency resource includes a subcarrier 4n+2 of the resource unit in frequency domain; and when a time-frequency resource to which the third DMRS port group is mapped is the second symbol in time domain, the time-frequency resource includes a subcarrier 4n of the resource unit in frequency domain.

When a time-frequency resource to which the fourth DMRS port group is mapped is the first symbol in time domain, the time-frequency resource includes a subcarrier 4n+3 of the resource unit in frequency domain; and when a time-frequency resource to which the fourth DMRS port group is mapped is the second symbol in time domain, the time-frequency resource includes a subcarrier 4n+1 of the resource unit in frequency domain.

n may be any one or more integers greater than or equal to 0 and less than $\lfloor M/4 \rfloor$.

(d) in FIG. 24 is a schematic diagram of a mapping rule of the 12 DMRS ports. Each small shaded block indicates an RE to which a DMRS port group is mapped, and n=0, 1, or 2.

Fifth: Time-frequency resources to which the first and second DMRS port groups are mapped include the first symbol in time domain, and time-frequency resources to which the third and fourth DMRS port groups are mapped include the second symbol in time domain.

When the time-frequency resource to which the first DMRS port group is mapped is the first symbol in time domain, the time-frequency resource includes at least one of a subcarrier 12n, a subcarrier 12n+1, a subcarrier 12n+2, a subcarrier 12n+6, a subcarrier 12n+7, and a subcarrier 12n+8 of the resource unit in frequency domain.

When the time-frequency resource to which the second DMRS port group is mapped is the first symbol in time domain, the time-frequency resource includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

When the time-frequency resource to which the third DMRS port group is mapped is the second symbol in time domain, the time-frequency resource includes at least one of a subcarrier 12n, a subcarrier 12n+1, a subcarrier 12n+2, a subcarrier 12n+6, a subcarrier 12n+7, and a subcarrier 12n+8 of the resource unit in frequency domain.

When the time-frequency resource to which the fourth DMRS port group is mapped is the second symbol in time domain, the time-frequency resource includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

(e) in FIG. 24 is a schematic diagram of a mapping rule of the 12 DMRS ports. Each small shaded block indicates an RE to which a DMRS port group is mapped, and n=0.

(3) The 12 DMRS ports are divided into three DMRS port groups, and each DMRS port group includes four DMRS ports. The three DMRS port groups include a first DMRS port group, a second DMRS port group, and a third DMRS port group. A same time-frequency resource is multiplexed in a CDM manner for DMRSs corresponding to DMRS ports in each DMRS port group. Mapping rules of the three DMRS port groups are as follows:

First: A time-frequency resource to which each DMRS port group is mapped includes the first symbol and the second symbol.

When a time-frequency resource to which the first DMRS port group is mapped is the first symbol and the second symbol in time domain, the time-frequency resource includes at least one of a subcarrier 12n, a subcarrier 12n+1, a subcarrier 12n+2, and a subcarrier 12n+3 of the resource unit in frequency domain.

When a time-frequency resource to which the second DMRS port group is mapped is the first symbol and the second symbol in time domain, the time-frequency resource includes at least one of a subcarrier 12n+4, a subcarrier 12n+5, a subcarrier 12n+6, and a subcarrier 12n+7 of the resource unit in frequency domain.

When a time-frequency resource to which the third DMRS port group is mapped is the first symbol and the second symbol in time domain, the time-frequency resource includes at least one of a subcarrier 12n+8, a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

Figure 25:
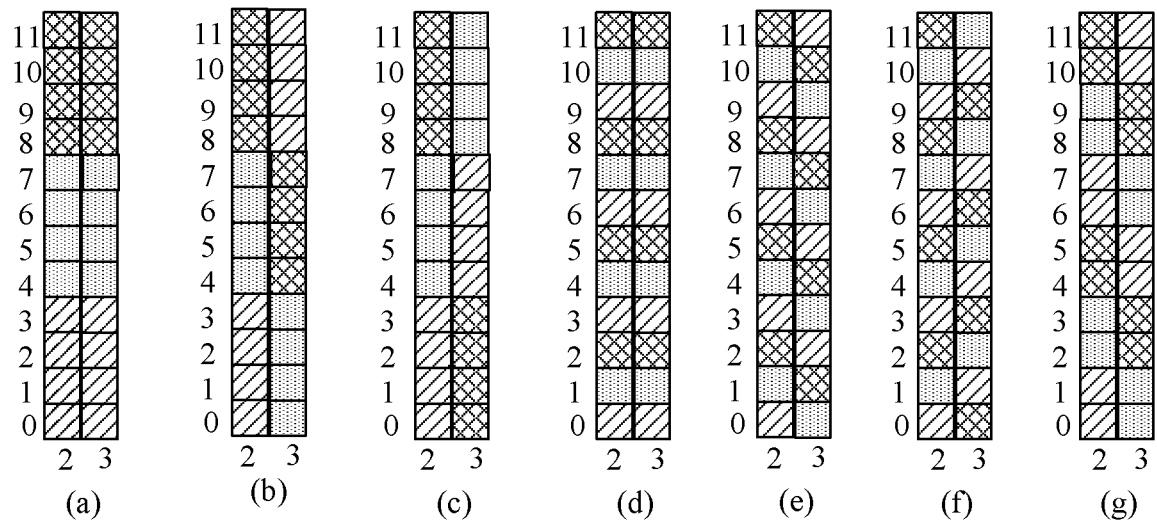
FIG. 25 is a schematic diagram of another pilot pattern for 12 ports according to an embodiment of this application.
Figure 26:
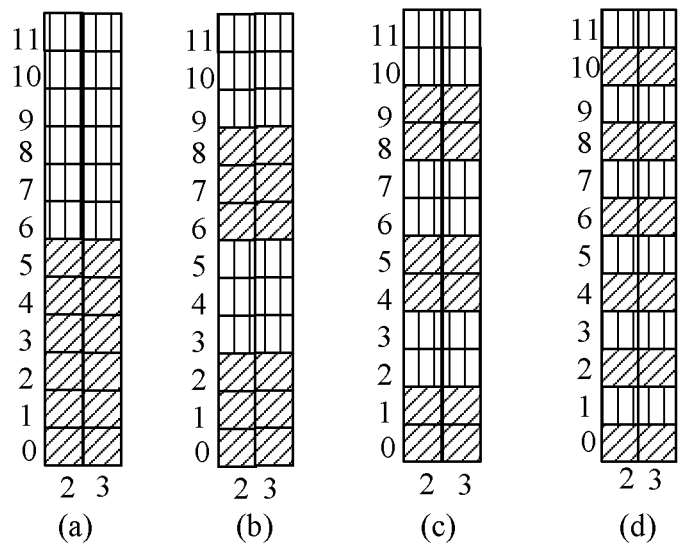
FIG. 26 is a schematic diagram of another pilot pattern for 12 ports according to an embodiment of this application.

(a) in FIG. 25 is a schematic diagram of a mapping rule of the 12 DMRS ports. Each small shaded block indicates an RE to which a DMRS port group is mapped, and n=0.

Second: A time-frequency resource to which each DMRS port group is mapped includes the first symbol and the second symbol.

When a time-frequency resource to which the first DMRS port group is mapped is the first symbol in time domain, the time-frequency resource includes a subcarrier 12n, a subcarrier 12n+1, a subcarrier 12n+2, and a subcarrier 12n+3 of the resource unit in frequency domain; and when a time-frequency resource to which the first DMRS port group is mapped is the second symbol in time domain, the time-frequency resource includes at least one of a subcarrier 12n+8, a subcarrier 12n+9, a subcarrier 12n+10, and a subcarrier 12n+11 of the resource unit in frequency domain.

When a time-frequency resource to which the second DMRS port group is mapped is the first symbol in time domain, the time-frequency resource includes a subcarrier 12n+4, a subcarrier 12n+5, a subcarrier 12n+6, and a subcarrier 12n+7 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+2, and a subcarrier 12n+3 of the resource unit in frequency domain.

When a time-frequency resource to which the third DMRS port group is mapped is the first symbol in time domain, the time-frequency resource includes at least one of a subcarrier 12n+8, a subcarrier 12n+9, a subcarrier 12n+10, and a subcarrier 12n+11 of the resource unit in frequency domain; and when a time-frequency resource to which the third DMRS port group is mapped is the second symbol in time domain, the time-frequency resource includes at least one of a subcarrier 12n+4, a subcarrier 12n+5, a subcarrier 12n+6, and a subcarrier 12n+7 of the resource unit in frequency domain.

n may be any one or more integers greater than or equal to 0 and less than $\lfloor M/12 \rfloor$.

(b) in FIG. 25 is a schematic diagram of a mapping rule of the 12 DMRS ports. Each small shaded block indicates an RE to which a DMRS port group is mapped, and n=0.

Third: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+2, and a subcarrier 12n+3 of the resource unit in frequency domain; and when a time-frequency resource to which the first DMRS port group is mapped is the second symbol in time domain, the time-frequency resource includes at least one of a subcarrier 12n+4, a subcarrier 12n+5, a subcarrier 12n+6, and a subcarrier 12n+7 of the resource unit in frequency domain.

When a time-frequency resource to which the second DMRS port group is mapped is the first symbol in time domain, the time-frequency resource includes at least one of a subcarrier 12n+4, a subcarrier 12n+5, a subcarrier 12n+6, and a subcarrier 12n+7 of the resource unit in frequency domain; and when a time-frequency resource to which the second DMRS port group is mapped is the second symbol in time domain, the time-frequency resource includes at least one of a subcarrier 12n+8, a subcarrier 12n+9, a subcarrier 12n+10, and a subcarrier 12n+11 of the resource unit in frequency domain.

When a time-frequency resource to which the third DMRS port group is mapped is the first symbol in time domain, the time-frequency resource includes at least one of a subcarrier 12n+8, a subcarrier 12n+9, a subcarrier 12n+10, and a subcarrier 12n+11 of the resource unit in frequency domain; and when a time-frequency resource to which the third DMRS port group is mapped is the second symbol in time domain, the time-frequency resource includes at least one of a subcarrier 12n, a subcarrier 12n+1, a subcarrier 12n+2, and a subcarrier 12n+3 of the resource unit in frequency domain.

n may be any one or more integers greater than or equal to 0 and less than $\lfloor M/12 \rfloor$.

(c) in FIG. 25 is a schematic diagram of a mapping rule of 12 DMRS ports. Each small shaded block indicates an RE to which a DMRS port group is mapped, and n=0.

Fourth: A time-frequency resource to which each DMRS port group is mapped includes the first symbol and the second symbol.

When the time-frequency resource to which the first DMRS port group is mapped is the first symbol and the second symbol in time domain, the time-frequency resource includes a subcarrier 3n of the resource unit in frequency domain.

When the time-frequency resource to which the second DMRS port group is mapped is the first symbol and the second symbol in time domain, the time-frequency resource includes a subcarrier 3n+1 of the resource unit in frequency domain.

When the time-frequency resource to which the third DMRS port group is mapped is the first symbol and the second symbol in time domain, the time-frequency resource includes a subcarrier 3n+2 of the resource unit in frequency domain.

n may be any one or more integers greater than or equal to 0 and less than $\lfloor M/3 \rfloor$.

(d) in FIG. 25 is a schematic diagram of a mapping rule of the 12 DMRS ports. Each small shaded block indicates an RE to which a DMRS port group is mapped, and n=0, 1, 2, or 3. In this solution, the ports are evenly distributed in frequency domain and distributed on the two symbols, and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In addition, in this solution, a port mapping location is fixed. Therefore, this solution is more generally used, and system indication overheads are reduced. In addition, in this solution, the ports are evenly mapped in frequency domain, thereby facilitating flexible scheduling. Further, power boosting or data transmission may be performed at a location of an unoccupied port group.

Fifth: A time-frequency resource to which each DMRS port group is mapped includes the first symbol and the second symbol.

When a time-frequency resource to which the first DMRS port group is mapped is the first symbol in time domain, the time-frequency resource includes a subcarrier 3n of the resource unit in frequency domain; and when a time-frequency resource to which the first DMRS port group is mapped is the second symbol in time domain, the time-frequency resource includes a subcarrier 3n+2 of the resource unit in frequency domain.

When a time-frequency resource to which the second DMRS port group is mapped is the first symbol in time domain, the time-frequency resource includes a subcarrier 3n+1 of the resource unit in frequency domain; and when a time-frequency resource to which the second DMRS port group is mapped is the second symbol in time domain, the time-frequency resource includes a subcarrier 3n of the resource unit in frequency domain.

When a time-frequency resource to which the third DMRS port group is mapped is the first symbol in time domain, the time-frequency resource includes a subcarrier 3n+2 of the resource unit in frequency domain; and when a time-frequency resource to which the third DMRS port group is mapped is the second symbol in time domain, the time-frequency resource includes a subcarrier 3n+1 of the resource unit in frequency domain.

n may be any one or more integers greater than or equal to 0 and less than $\lfloor M/3 \rfloor$.

(e) in FIG. 25 is a schematic diagram of a mapping rule of the 12 DMRS ports. Each small shaded block indicates an RE to which a DMRS port group is mapped, and n=0, 1, 2, or 3.

Sixth: A time-frequency resource to which each DMRS port group is mapped includes the first symbol and the second symbol.

When a time-frequency resource to which the first DMRS port group is mapped is the first symbol in time domain, the time-frequency resource includes a subcarrier 3n of the resource unit in frequency domain; and when a time-frequency resource to which the first DMRS port group is mapped is the second symbol in time domain, the time-frequency resource includes a subcarrier 3n+1 of the resource unit in frequency domain.

When a time-frequency resource to which the second DMRS port group is mapped is the first symbol in time domain, the time-frequency resource includes a subcarrier 3n+1 of the resource unit in frequency domain; and when a time-frequency resource to which the second DMRS port group is mapped is the second symbol in time domain, the time-frequency resource includes a subcarrier 3n+2 of the resource unit in frequency domain.

When a time-frequency resource to which the third DMRS port group is mapped is the first symbol in time domain, the time-frequency resource includes a subcarrier 3n+2 of the resource unit in frequency domain; and when a time-frequency resource to which the third DMRS port group is mapped is the second symbol in time domain, the time-frequency resource includes a subcarrier 3n of the resource unit in frequency domain.

n may be any one or more integers greater than or equal to 0 and less than $\lfloor M/3 \rfloor$.

(f) in FIG. 25 is a schematic diagram of a mapping rule of the 12 DMRS ports. Each small shaded block indicates an RE to which a DMRS port group is mapped, and n=0, 1, 2, or 3.

Seventh: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+6, and a subcarrier 12n+7 of the resource unit in frequency domain; and when a time-frequency resource to which the first DMRS port group is mapped is the second symbol in time domain, the time-frequency resource includes at least one of a subcarrier 12n+4, a subcarrier 12n+5, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+2, a subcarrier 12n+3, a subcarrier 12n+8, and a subcarrier 12n+9 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+6, and a subcarrier 12n+7 of the resource unit in frequency domain.

When a time-frequency resource to which the third DMRS port group is mapped is the first symbol in time domain, the time-frequency resource includes at least one of a subcarrier 12n+4, a subcarrier 12n+5, a subcarrier 12n+10, and a subcarrier 12n+11 of the resource unit in frequency domain; and when a time-frequency resource to which the third DMRS port group is mapped is the second symbol in time domain, the time-frequency resource includes at least one of a subcarrier 12n+2, a subcarrier 12n+3, a subcarrier 12n+8, and a subcarrier 12n+9 of the resource unit in frequency domain.

n may be any one or more integers greater than or equal to 0 and less than $\lfloor M/12 \rfloor$.

(g) in FIG. 25 is a schematic diagram of a mapping rule of the 12 DMRS ports. Each small shaded block indicates an RE to which a DMRS port group is mapped, and n=0.

(4) The 12 DMRS ports are divided into two DMRS port groups, and each DMRS port group includes six DMRS ports. The two DMRS port groups include a first DMRS port group and a second DMRS port group. A same time-frequency resource is multiplexed in a CDM manner for DMRSs corresponding to DMRS ports in each DMRS port group. Mapping rules of the two DMRS port groups are as follows:

First: A time-frequency resource to which each DMRS port group is mapped includes the first symbol and the second symbol; and for the time-frequency resource to which each DMRS port group is mapped in frequency domain, reference may be made to the solution corresponding to (a) in FIG. 21. In this case, an example is shown in (a) in FIG. 26.

Second: A time-frequency resource to which each DMRS port group is mapped includes the first symbol and the second symbol; and for the time-frequency resource to which each DMRS port group is mapped in frequency domain, reference may be made to the solution corresponding to (b) in FIG. 21. In this case, an example is shown in (b) in FIG. 26.

Third: A time-frequency resource to which each DMRS port group is mapped includes the first symbol and the second symbol; and for the time-frequency resource to which each DMRS port group is mapped in frequency domain, reference may be made to the solution corresponding to (c) in FIG. 21. In this case, an example is shown in (c) in FIG. 26.

Fourth: A time-frequency resource to which each DMRS port group is mapped includes the first symbol and the second symbol; and for the time-frequency resource to which each DMRS port group is mapped in frequency domain, reference may be made to the solution corresponding to (d) in FIG. 21. In this case, an example is shown in (d) in FIG. 26.

Fifth: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+2, a subcarrier 12n+3, a subcarrier 12n+4, and a subcarrier 12n+5 of the resource unit in frequency domain; and when a time-frequency resource to which the first DMRS port group is mapped is the second symbol in time domain, the time-frequency resource includes at least one of a subcarrier 12n+6, a subcarrier 12n+7, a subcarrier 12n+8, a subcarrier 12n+9, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+6, a subcarrier 12n+7, a subcarrier 12n+8, a subcarrier 12n+9, a subcarrier 12n+10, and a subcarrier 12n+11 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+2, a subcarrier 12n+3, a subcarrier 12n+4, and a subcarrier 12n+5 of the resource unit in frequency domain.

n may be any one or more integers greater than or equal to 0 and less than $\lfloor M/12 \rfloor$.

Figure 27:
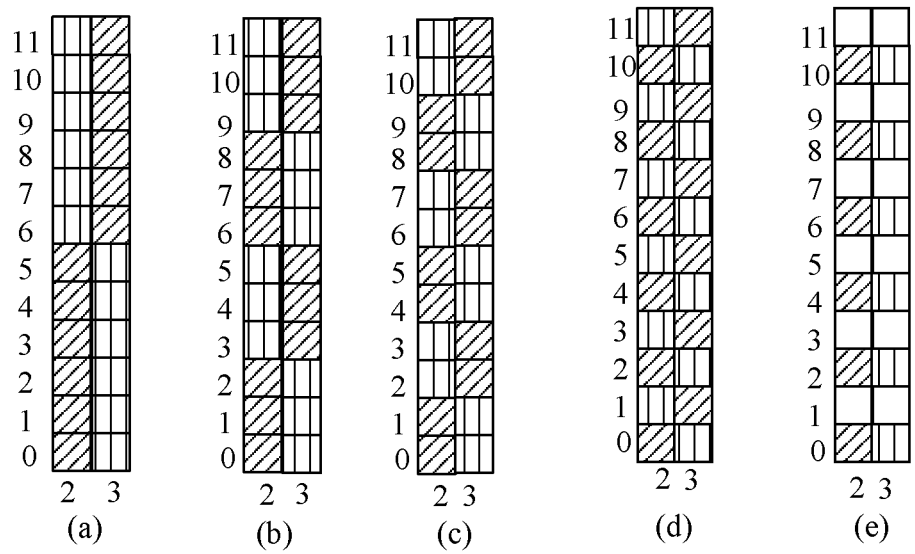
FIG. 27 is a schematic diagram of another pilot pattern for 12 ports according to an embodiment of this application.

(a) in FIG. 27 is a schematic diagram of a mapping rule of the 12 DMRS ports. Each small shaded block indicates an RE to which a DMRS port group is mapped, and n=0.

Sixth: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+2, a subcarrier 12n+6, a subcarrier 12n+7, and a subcarrier 12n+8 of the resource unit in frequency domain; and when a time-frequency resource to which the first DMRS port group is mapped is the second symbol in time domain, the time-frequency resource includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+3, a subcarrier 12n+4, a subcarrier 12n+5, a subcarrier 12n+9, a subcarrier 12n+10, and a subcarrier 12n+11 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+2, a subcarrier 12n+6, a subcarrier 12n+7, and a subcarrier 12n+8 of the resource unit in frequency domain.

n may be any one or more integers greater than or equal to 0 and less than $\lfloor M/12 \rfloor$.

(b) in FIG. 27 is a schematic diagram of a mapping rule of the 12 DMRS ports. Each small shaded block indicates an RE to which a DMRS port group is mapped, and n=0.

Seventh: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain; and when a time-frequency resource to which the first DMRS port group is mapped is the second symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

When a time-frequency resource to which the second DMRS port group is mapped is the first symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

n may be any one or more integers greater than or equal to 0 and less than $\lfloor M/12 \rfloor$.

(c) in FIG. 27 is a schematic diagram of a mapping rule of the 12 DMRS ports. Each small shaded block indicates an RE to which a DMRS port group is mapped, and n=0.

Eighth: A time-frequency resource to which each DMRS port group is mapped includes the first symbol and the second symbol.

When a time-frequency resource to which the first DMRS port group is mapped is the first symbol in time domain, the time-frequency resource includes a subcarrier 2n of the resource unit in frequency domain; and when a time-frequency resource to which the first DMRS port group is mapped is the second symbol in time domain, the time-frequency resource includes a subcarrier 2n+1 of the resource unit in frequency domain.

When a time-frequency resource to which the second DMRS port group is mapped is the first symbol in time domain, the time-frequency resource includes a subcarrier 2n+1 of the resource unit in frequency domain; and when a time-frequency resource to which the second DMRS port group is mapped is the second symbol in time domain, the time-frequency resource includes a subcarrier 2n of the resource unit in frequency domain.

n may be any one or more integers greater than or equal to 0 and less than $\lfloor M/2 \rfloor$.

(d) in FIG. 27 is a schematic diagram of a mapping rule of the 12 DMRS ports. Each small shaded block indicates an RE to which a DMRS port group is mapped, and n=0, 1, 2, 3, 4, or 5.

Ninth: A time-frequency resource to which the first DMRS port group is mapped includes the first symbol in time domain, and a time-frequency resource to which the second DMRS port group is mapped includes the second symbol in time domain.

When the time-frequency resource to which the first DMRS port group is mapped is the first symbol in time domain, the time-frequency resource is a subcarrier 2n of the resource unit in frequency domain.

When the time-frequency resource to which the second DMRS port group is mapped is the second symbol in time domain, the time-frequency resource is a subcarrier 2n of the resource unit in frequency domain.

n may be any one or more integers greater than or equal to 0 and less than $\lfloor M/2 \rfloor$.

(e) in FIG. 27 is a schematic diagram of a mapping rule of the 12 DMRS ports. Each small shaded block indicates an RE to which a DMRS port group is mapped, and n=0, 1, 2, 3, 4, or 5. Each small blank block indicates an RE to which a DMRS port group is not mapped.

(4) A same time-frequency resource is multiplexed in a CDM manner for DMRSs corresponding to the 12 DMRS ports. In this case, the 12 DMRS ports may be considered as one DMRS port group. Mapping rules of the DMRS port group are as follows:

When the time-frequency resource to which the DMRS port group is mapped is the first symbol and the second symbol in time domain, the time-frequency resource includes a subcarrier n of the resource unit in frequency domain.

n may be any one or more integers greater than or equal to 0 and less than M.

Figure 28:
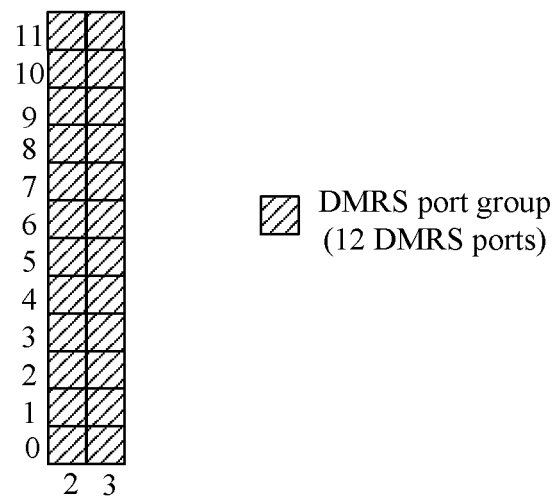
FIG. 28 is a schematic diagram of another pilot pattern for 12 ports according to an embodiment of this application.

FIG. 28 is a schematic diagram of a mapping rule of the 12 DMRS ports. Each small shaded block indicates an RE to which a DMRS port group is mapped, and n=0, 1, 2, 3, 4, 5, 6, 7, 8, 9, 10, or 11.

A total quantity of system-supported DMRS ports is 16.

1. Time-frequency resources to which the 16 DMRS ports are mapped include a first symbol of a resource unit in time domain.

(1) The 16 DMRS ports are divided into four DMRS port groups, and each DMRS port group includes four DMRS ports. The four DMRS port groups include a first DMRS port group, a second DMRS port group, a third DMRS port group, and a fourth DMRS port group. A same time-frequency resource is multiplexed in a CDM manner for DMRSs corresponding to DMRS ports in each DMRS port group. Mapping rules of the four DMRS port groups are as follows:

First:

A time-frequency resource to which the first DMRS port group is mapped includes at least one of a subcarrier 12n, a subcarrier 12n+1, and a subcarrier 12n+2 of the resource unit in frequency domain.

A time-frequency resource to which the second DMRS port group is mapped includes at least one of a subcarrier 12n+3, a subcarrier 12n+4, and a subcarrier 12n+5 of the resource unit in frequency domain.

A time-frequency resource to which the third DMRS port group is mapped includes at least one of a subcarrier 12n+6, a subcarrier 12n+7, and a subcarrier 12n+8 of the resource unit in frequency domain.

A time-frequency resource to which the fourth DMRS port group is mapped includes at least one of a subcarrier 12n+9, a subcarrier 12n+10, and a subcarrier 12n+11 of the resource unit in frequency domain.

n may be any one or more integers greater than or equal to 0 and less than $\lfloor M/12 \rfloor$.

Figure 29:
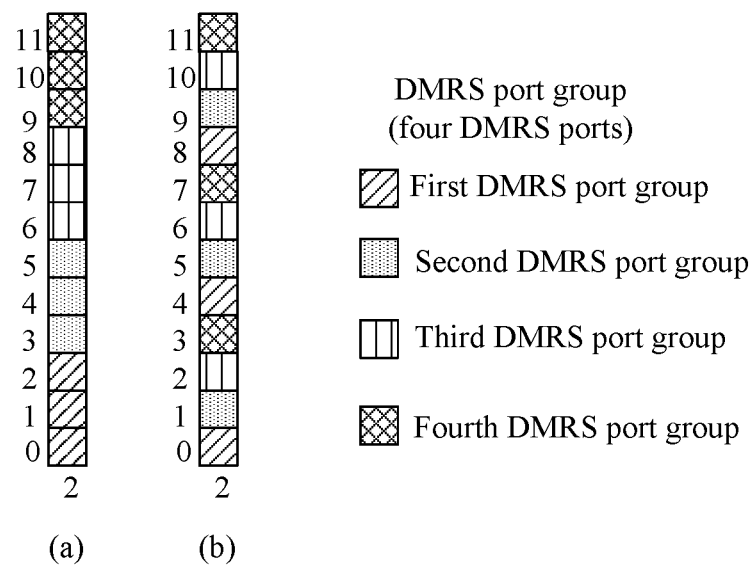
FIG. 29 is a schematic diagram of a pilot pattern for 16 ports according to an embodiment of this application.

(a) in FIG. 29 is a schematic diagram of a mapping rule of the 16 DMRS ports. Each small shaded block indicates an RE to which a DMRS port group is mapped, and n=0.

Second:

A time-frequency resource to which the first DMRS port group is mapped includes a subcarrier 4n of the resource unit in frequency domain.

A time-frequency resource to which the second DMRS port group is mapped includes a subcarrier 4n+1 of the resource unit in frequency domain.

A time-frequency resource to which the third DMRS port group is mapped includes a subcarrier 4n+2 of the resource unit in frequency domain.

A time-frequency resource to which the fourth DMRS port group is mapped includes a subcarrier 4n+3 of the resource unit in frequency domain.

n may be any one or more integers greater than or equal to 0 and less than $\lfloor M/4 \rfloor$.

(b) in FIG. 29 is a schematic diagram of a mapping rule of the 16 DMRS ports. Each small shaded block indicates an RE to which a DMRS port group is mapped, and n=0, 1, or 2.

(2) The 16 DMRS ports are divided into two DMRS port groups, and each DMRS port group includes eight DMRS ports. The two DMRS port groups include a first DMRS port group and a second DMRS port group. A same time-frequency resource is multiplexed in a CDM manner for DMRSs corresponding to DMRS ports in each DMRS port group. Mapping rules of the two DMRS port groups are as follows:

First:

A time-frequency resource to which the first DMRS port group is mapped includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

A time-frequency resource to which the second DMRS port group is mapped includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

n may be any one or more integers greater than or equal to 0 and less than $\lfloor M/12 \rfloor$.

Figure 30:
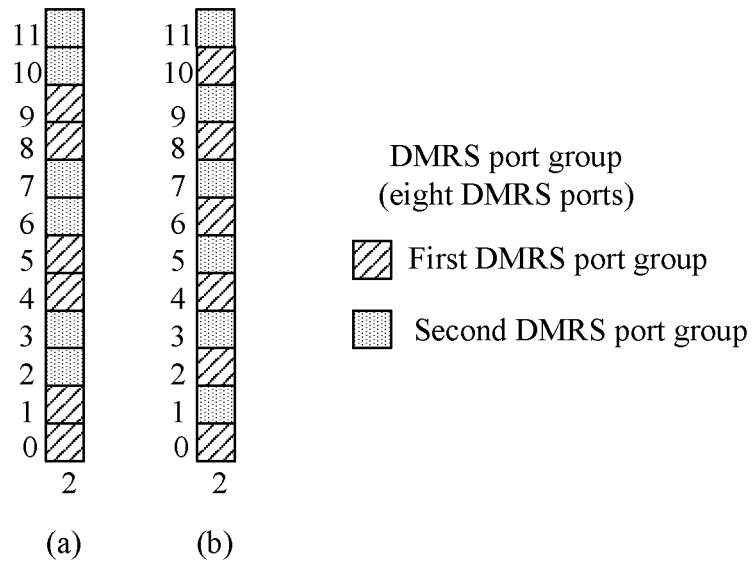
FIG. 30 is a schematic diagram of another pilot pattern for 16 ports according to an embodiment of this application.

(a) in FIG. 30 is a schematic diagram of a mapping rule of the 16 DMRS ports. Each small shaded block indicates an RE to which a DMRS port group is mapped, and n=0.

Second:

A time-frequency resource to which the first DMRS port group is mapped includes a subcarrier 2n of the resource unit in frequency domain.

A time-frequency resource to which the second DMRS port group is mapped includes a subcarrier 2n+1 of the resource unit in frequency domain.

n may be any one or more integers greater than or equal to 0 and less than $\lfloor M/2 \rfloor$.

(b) in FIG. 30 is a schematic diagram of a mapping rule of the 16 DMRS ports. Each small shaded block indicates an RE to which a DMRS port group is mapped, and n=0, 1, 2, 3, 4, or 5.

(3) A same time-frequency resource is multiplexed in a CDM manner for DMRSs corresponding to the 16 DMRS ports. In this case, the 16 DMRS ports may be considered as one DMRS port group. Mapping rules of the DMRS port group are as follows:

A time-frequency resource to which the DMRS port group is mapped includes a subcarrier n of the resource unit in frequency domain.

n may be any one or more integers greater than or equal to 0 and less than M.

Figure 31:
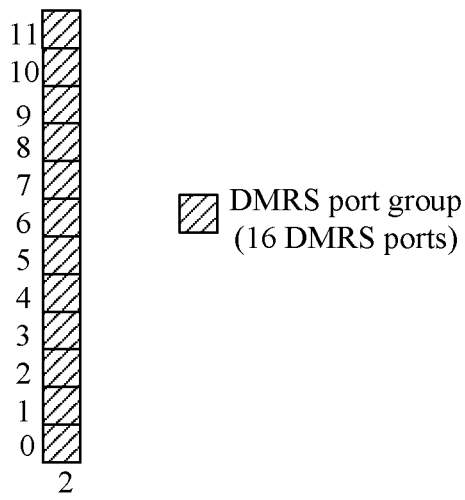
FIG. 31 is a schematic diagram of another pilot pattern for 16 ports according to an embodiment of this application.

FIG. 31 is a schematic diagram of a mapping rule of the 16 DMRS ports. Each small shaded block indicates an RE to which a DMRS port group is mapped, and n=0, 1, 2, 3, 4, 5, 6, 7, 8, 9, 10, or 11.

2. Time-frequency resources to which the 16 DMRS ports are mapped include a first symbol and a second symbol of a resource unit in time domain.

(1) The 16 DMRS ports are divided into four DMRS port groups, and each DMRS port group includes four DMRS ports. The four DMRS port groups include a first DMRS port group, a second DMRS port group, a third DMRS port group, and a fourth DMRS port group. A same time-frequency resource is multiplexed in a CDM manner for DMRSs corresponding to DMRS ports in each DMRS port group. Mapping rules of the four DMRS port groups are as follows:

First: A time-frequency resource to which each DMRS port group is mapped includes the first symbol and the second symbol; and for the time-frequency resource to which each DMRS port group is mapped in frequency domain, reference may be made to the solution corresponding to (a) in FIG. 29. In this case, an example is shown in (a) in FIG. 32.

Second: A time-frequency resource to which each DMRS port group is mapped includes the first symbol and the second symbol; and for the time-frequency resource to which each DMRS port group is mapped in frequency domain, reference may be made to the solution corresponding to (b) in FIG. 29. In this case, an example is shown in (b) in FIG. 32. In this solution, the ports are evenly distributed in frequency domain and distributed on the two symbols, and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby implementing joint design of uplink and downlink transmission or multi-waveform transmission; and this solution is applicable to an MU-MIMO scenario, thereby reducing DMRS indication overheads and design complexity of a system. In addition, in this solution, a port mapping location is fixed. Therefore, this solution is more generally used, and system indication overheads are reduced. In this solution, the ports are evenly mapped in frequency domain, thereby facilitating flexible scheduling. Further, power boosting or data transmission may be performed at a location of an unoccupied port group.

Third: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, and a subcarrier 12n+2 of the resource unit in frequency domain; and when a time-frequency resource to which the first DMRS port group is mapped is the second symbol in time domain, the time-frequency resource includes at least one of a subcarrier 12n+6, a subcarrier 12n+7, and a subcarrier 12n+8 of the resource unit in frequency domain.

When a time-frequency resource to which the second DMRS port group is mapped is the first symbol in time domain, the time-frequency resource includes at least one of a subcarrier 12n+3, a subcarrier 12n+4, and a subcarrier 12n+5 of the resource unit in frequency domain; and when a time-frequency resource to which the second DMRS port group is mapped is the second symbol in time domain, the time-frequency resource includes at least one of a subcarrier 12n+9, a subcarrier 12n+10, and a subcarrier 12n+11 of the resource unit in frequency domain.

When a time-frequency resource to which the third DMRS port group is mapped is the first symbol in time domain, the time-frequency resource includes at least one of a subcarrier 12n+6, a subcarrier 12n+7, and a subcarrier 12n+8 of the resource unit in frequency domain; and when a time-frequency resource to which the third DMRS port group is mapped is the second symbol in time domain, the time-frequency resource includes at least one of a subcarrier 12n, a subcarrier 12n+1, and a subcarrier 12n+2 of the resource unit in frequency domain.

Figure 32:
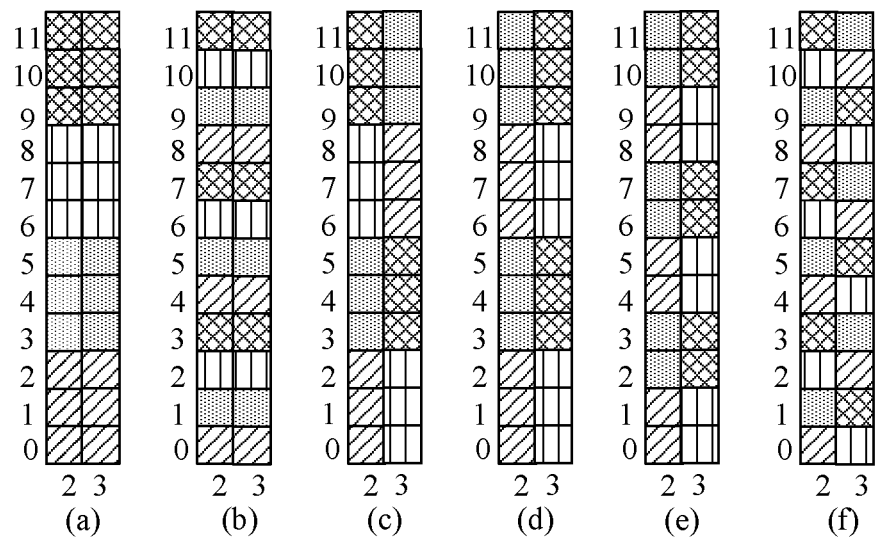
FIG. 32 is a schematic diagram of another pilot pattern for 16 ports according to an embodiment of this application.

When a time-frequency resource to which the fourth DMRS port group is mapped is the first symbol in time domain, the time-frequency resource includes at least one of a subcarrier 12n+9, a subcarrier 12n+10, and a subcarrier 12n+11 of the resource unit in frequency domain; and when a time-frequency resource to which the fourth DMRS port group is mapped is the second symbol in time domain, the time-frequency resource includes at least one of a subcarrier 12n+3, a subcarrier 12n+4, and a subcarrier 12n+5 of the resource unit in frequency domain.

n may be any one or more integers greater than or equal to 0 and less than $\lfloor M/12 \rfloor$ (c) in FIG. 32 is a schematic diagram of a mapping rule of the 16 DMRS ports. Each small shaded block indicates an RE to which a DMRS port group is mapped, and n=0.

Fourth: Time-frequency resources to which the first and second DMRS port groups are mapped include the first symbol in time domain, and time-frequency resources to which the third and fourth DMRS port groups are mapped include the second symbol in time domain.

When the time-frequency resource to which the first DMRS port group is mapped is the first symbol in time domain, the time-frequency resource is at least one of a subcarrier 12n, a subcarrier 12n+1, a subcarrier 12n+2, a subcarrier 12n+6, a subcarrier 12n+7, and a subcarrier 12n+8 of the resource unit in frequency domain.

When the time-frequency resource to which the second DMRS port group is mapped is the first symbol in time domain, the time-frequency resource is at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

When the time-frequency resource to which the third DMRS port group is mapped is the second symbol in time domain, the time-frequency resource is at least one of a subcarrier 12n, a subcarrier 12n+1, a subcarrier 12n+2, a subcarrier 12n+6, a subcarrier 12n+7, and a subcarrier 12n+8 of the resource unit in frequency domain.

When the time-frequency resource to which the fourth DMRS port group is mapped is the second symbol in time domain, the time-frequency resource is at least one of a subcarrier 12n+3, a subcarrier 12n+4, a subcarrier 12n+5, a subcarrier 12n+9, a subcarrier 12n+10, and a subcarrier 12n+11 of the resource unit in frequency domain.

n may be any one or more integers greater than or equal to 0 and less than $\lfloor M/12 \rfloor$ (d) in FIG. 32 is a schematic diagram of a mapping rule of the 16 DMRS ports. Each small shaded block indicates an RE to which a DMRS port group is mapped, and n=0.

Fifth: Time-frequency resources to which the first and second DMRS port groups are mapped include the first symbol in time domain, and time-frequency resources to which the third and fourth DMRS port groups are mapped include the second symbol in time domain.

When the time-frequency resource to which the first DMRS port group is mapped is the first symbol in time domain, the time-frequency resource is at least one of a subcarrier 12n, a subcarrier 12n+1, a subcarrier 12n+4, a subcarrier 12n+5, a subcarrier 12n+8, and a subcarrier 12n+9 of the resource unit in frequency domain.

When the time-frequency resource to which the second DMRS port group is mapped is the first symbol in time domain, the time-frequency resource is at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

When the time-frequency resource to which the third DMRS port group is mapped is the second symbol in time domain, the time-frequency resource is at least one of a subcarrier 12n, a subcarrier 12n+1, a subcarrier 12n+4, a subcarrier 12n+5, a subcarrier 12n+8, and a subcarrier 12n+9 of the resource unit in frequency domain.

When the time-frequency resource to which the fourth DMRS port group is mapped is the second symbol in time domain, the time-frequency resource is at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

n may be any one or more integers greater than or equal to 0 and less than $\lfloor M/12 \rfloor$ (e) in FIG. 32 is a schematic diagram of a mapping rule of the 16 DMRS ports. Each small shaded block indicates an RE to which a DMRS port group is mapped, and n=0.

Sixth: A time-frequency resource to which each DMRS port group is mapped includes the first symbol and the second symbol.

When a time-frequency resource to which the first DMRS port group is mapped is the first symbol in time domain, the time-frequency resource includes a subcarrier 4n of the resource unit in frequency domain; and when a time-frequency resource to which the first DMRS port group is mapped is the second symbol in time domain, the time-frequency resource includes a subcarrier 4n+2 of the resource unit in frequency domain.

When a time-frequency resource to which the second DMRS port group is mapped is the first symbol in time domain, the time-frequency resource includes a subcarrier 4n+1 of the resource unit in frequency domain; and when a time-frequency resource to which the second DMRS port group is mapped is the second symbol in time domain, the time-frequency resource includes a subcarrier 4n+3 of the resource unit in frequency domain.

When a time-frequency resource to which the third DMRS port group is mapped is the first symbol in time domain, the time-frequency resource includes a subcarrier 4n+2 of the resource unit in frequency domain; and when a time-frequency resource to which the third DMRS port group is mapped is the second symbol in time domain, the time-frequency resource includes a subcarrier 4n of the resource unit in frequency domain.

When a time-frequency resource to which the fourth DMRS port group is mapped is the first symbol in time domain, the time-frequency resource includes a subcarrier 4n+3 of the resource unit in frequency domain; and when a time-frequency resource to which the fourth DMRS port group is mapped is the second symbol in time domain, the time-frequency resource includes a subcarrier 4n+1 of the resource unit in frequency domain.

n may be any one or more integers greater than or equal to 0 and less than $\lfloor M/4 \rfloor$.

(f) in FIG. 32 is a schematic diagram of a mapping rule of the 16 DMRS ports. Each small shaded block indicates an RE to which a DMRS port group is mapped, and n=0, 1, or 2.

(2) The 16 DMRS ports are divided into two DMRS port groups, and each DMRS port group includes eight DMRS ports. The two DMRS port groups include a first DMRS port group and a second DMRS port group. A same time-frequency resource is multiplexed in a CDM manner for DMRSs corresponding to DMRS ports in each DMRS port group. Mapping rules of the two DMRS port groups are as follows:

First: A time-frequency resource to which each DMRS port group is mapped includes the first symbol and the second symbol; and for the time-frequency resource to which each DMRS port group is mapped in frequency domain, reference may be made to the solution corresponding to (a) in FIG. 30. In this case, an example is shown in (a) in FIG. 33.

Second: A time-frequency resource to which each DMRS port group is mapped includes the first symbol and the second symbol; and for the time-frequency resource to which each DMRS port group is mapped in frequency domain, reference may be made to the solution corresponding to (b) in FIG. 30. In this case, an example is shown in (b) in FIG. 33. In this solution, the ports are evenly distributed in frequency domain and distributed on the two symbols, and have a high density. This ensures high channel estimation accuracy in various scenarios. In addition, the ports are evenly distributed but are mutually discrete in frequency domain. Therefore, this solution has a feature of a low PAPR, and is applicable to both a multi-carrier transmission scenario and a single-carrier transmission scenario, thereby facilitating joint design of uplink and downlink transmission or multi-waveform transmission; and this solution is applicable to an MU-MIMO scenario, thereby reducing DMRS indication overheads and design complexity of a system. In addition, in this solution, a port mapping location is fixed. Therefore, this solution is more generally used, and system indication overheads are reduced. In this solution, the ports are evenly mapped in frequency domain, thereby facilitating flexible scheduling. Further, power boosting or data transmission may be performed at a location of an unoccupied port group.

Third: A time-frequency resource to which each DMRS port group is mapped includes the first symbol and the second symbol.

When a time-frequency resource to which the first DMRS port group is mapped is the first symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain; and when a time-frequency resource to which the first DMRS port group is mapped is the second symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain.

Figure 33:
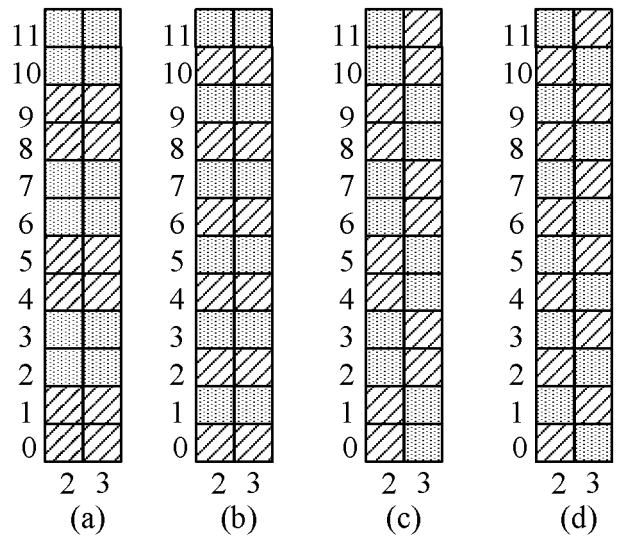
FIG. 33 is a schematic diagram of another pilot pattern for 16 ports according to an embodiment of this application.

When a time-frequency resource to which the second DMRS port group is mapped is the first symbol in time domain, the time-frequency resource includes at least one of a subcarrier 12n+2, a subcarrier 12n+3, a subcarrier 12n+6, a subcarrier 12n+7, a subcarrier 12n+10, and a subcarrier 12n+11 of the resource unit in frequency domain; and when a time-frequency resource to which the second DMRS port group is mapped is the second symbol in time domain, the time-frequency resource includes at least one of a subcarrier 12n, a subcarrier 12n+1, a subcarrier 12n+4, a subcarrier 12n+5, a subcarrier 12n+8, and a subcarrier 12n+9 of the resource unit in frequency domain.

n may be any one or more integers greater than or equal to 0 and less than $\lfloor M/12 \rfloor$ (c) in FIG. 33 is a schematic diagram of a mapping rule of the 16 DMRS ports. Each small shaded block indicates an RE to which a DMRS port group is mapped, and n=0.

Fourth: A time-frequency resource to which each DMRS port group is mapped includes the first symbol and the second symbol.

When a time-frequency resource to which the first DMRS port group is mapped is the first symbol in time domain, the time-frequency resource includes a subcarrier 2n of the resource unit in frequency domain; and when a time-frequency resource to which the first DMRS port group is mapped is the second symbol in time domain, the time-frequency resource includes a subcarrier 2n+1 of the resource unit in frequency domain.

When a time-frequency resource to which the second DMRS port group is mapped is the first symbol in time domain, the time-frequency resource includes a subcarrier 2n+1 of the resource unit in frequency domain; and when a time-frequency resource to which the second DMRS port group is mapped is the second symbol in time domain, the time-frequency resource includes a subcarrier 2n of the resource unit in frequency domain.

n may be any one or more integers greater than or equal to 0 and less than $\lfloor M/2 \rfloor$.

(d) in FIG. 33 is a schematic diagram of a mapping rule of the 16 DMRS ports. Each small shaded block indicates an RE to which a DMRS port group is mapped, and n=0, 1, 2, 3, 4, or 5.

(3) A same time-frequency resource is multiplexed in a CDM manner for DMRSs corresponding to the 16 DMRS ports. In this case, the 16 DMRS ports may be considered as one DMRS port group. Mapping rules of the DMRS port group are as follows:

A time-frequency resource to which the DMRS port group is mapped includes a subcarrier n of the resource unit in frequency domain.

n may be any one or more integers greater than or equal to 0 and less than M.

Figure 34:
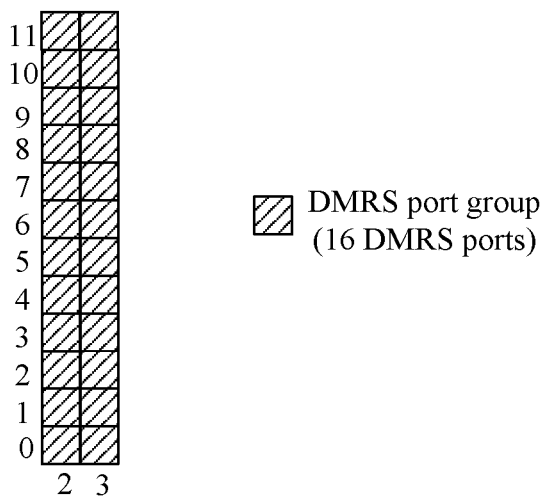
FIG. 34 is a schematic diagram of another pilot pattern for 16 ports according to an embodiment of this application.

FIG. 34 is a schematic diagram of a mapping rule of the 16 DMRS ports. Each small shaded block indicates an RE to which a DMRS port group is mapped, and n=0, 1, 2, 3, 4, 5, 6, 7, 8, 9, 10, or 11.

The foregoing mainly describes, from a perspective of interaction between network elements, the solutions provided in the embodiments of this application. It can be understood that the network elements may be, for example, base stations or terminals. To implement the foregoing functions, the network elements include corresponding hardware structures and/or software modules for performing the functions. A person skilled in the art should be easily aware that in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division of function modules may be performed on the base station or the terminal based on the foregoing method examples. For example, the function modules may be divided based on the corresponding functions, or two or more functions may be integrated into one processing module. The integrated module may be implemented in a form of hardware, or may be implemented in a form of a software function module. It should be noted that the module division in the embodiments of this application is an example and is merely logical function division. During actual implementation, there may be other division manners. The following provides descriptions by using examples in which function modules are divided based on corresponding functions.

Figure 35:
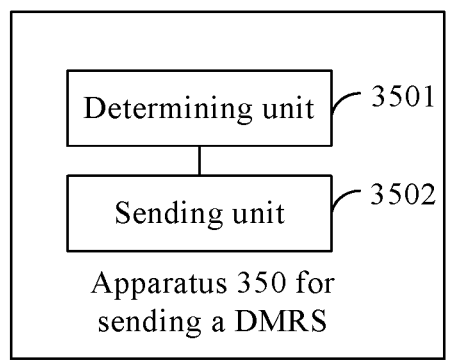
FIG. 35 is a schematic structural diagram of an apparatus for sending a DMRS according to an embodiment of this application.

FIG. 35 is a schematic structural diagram of an apparatus 350 for sending a DMRS. The apparatus 350 may be the base station 100 or the terminal 200. The apparatus 350 may include a determining unit 3501 and a sending unit 3502. The determining unit 3501 may be configured to perform FIG. 6 and/or other processes used to support the technologies described in this specification. The sending unit 3502 may be configured to perform an action performed by the transmit end in S102 in FIG. 6 and/or other processes used to support the technologies described in this specification. All related content of the steps in the foregoing method embodiments may be used for describing functions of the corresponding function modules, and therefore details are not described herein again.

Figure 36:
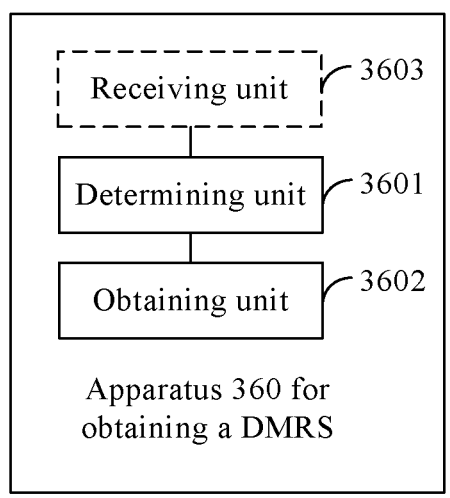
FIG. 36 is a schematic structural diagram of an apparatus for obtaining a DMRS according to an embodiment of this application.

FIG. 36 is a schematic structural diagram of an apparatus 360 for obtaining a DMRS. The apparatus 360 may include a determining unit 3601, an obtaining unit 3602, and a receiving unit 3603. The apparatus 360 may be the terminal 200 or the base station 100. The determining unit 3601 may be configured to perform S103 in FIG. 6 and/or other processes used to support the technologies described in this specification. The obtaining unit 3602 may be configured to perform S104 in FIG. 6 and/or other processes used to support the technologies described in this specification. The receiving unit 3603 is configured to perform an action performed by the receive end in S102 in FIG. 6. All related content of the steps in the foregoing method embodiments may be used for describing functions of the corresponding function modules, and therefore details are not described herein again. For example, in a specific implementation process, it can be understood that the apparatus 360 first obtains, through, for example, but not limited to, inverse Fourier transform (IFFT), a symbol carried on each RE (for example, obtains a symbol carried on each subcarrier and in each OFDM symbol), and then obtains a DMRS from the obtained symbol based on a time-frequency resource on which the DMRS is located.

Figure 37:
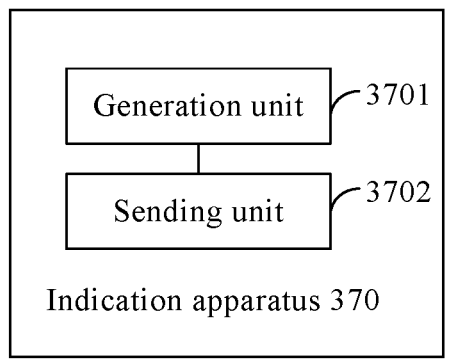
FIG. 37 is a schematic structural diagram of an indication apparatus according to an embodiment of this application.

FIG. 37 is a schematic structural diagram of an indication apparatus. The apparatus 370 may be the base station 100. The apparatus 370 may include a generation unit 3701 and a sending unit 3702. The generation unit 3701 may be configured to perform S201 in FIG. 6a and/or other processes used to support the technologies described in this specification. The sending unit 3702 may be configured to perform an action performed by the base station in S202 in FIG. 6a and/or other processes used to support the technologies described in this specification. All related content of the steps in the foregoing method embodiments may be used for describing functions of the corresponding function modules, and therefore details are not described herein again.

Figure 38:
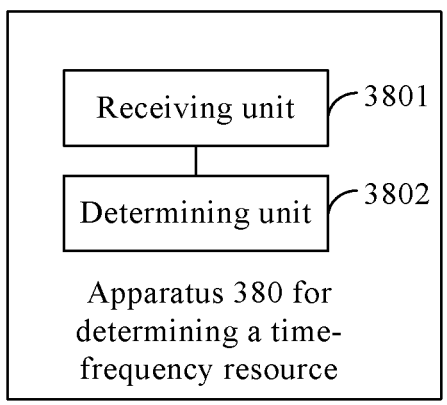
FIG. 38 is a schematic structural diagram of an apparatus for determining a time-frequency resource according to an embodiment of this application.

FIG. 38 is a schematic structural diagram of an apparatus 380 for determining a time-frequency resource. The apparatus 380 may include a receiving unit 3801 and a determining unit 3802. The apparatus 380 may be the base station 100. The receiving unit 3801 is configured to perform an action performed by the receive end in S202 in FIG. 6a and/or other processes used to support the technologies described in this specification. The determining unit 3802 may be configured to perform S203 in FIG. 6a and/or other processes used to support the technologies described in this specification. All related content of the steps in the foregoing method embodiments may be used for describing functions of the corresponding function modules, and therefore details are not described herein again.

In embodiments of this application, the apparatus 350 to the apparatus 380 are presented in a form of dividing the function modules based on the corresponding functions, or are presented in a form of dividing the function modules in an integrated manner. The "modules" herein may be an application-specific integrated circuit (ASIC), a processor that executes one or more software or firmware programs and a memory, an integrated logic circuit, and/or another device capable of providing the foregoing functions, where the processor and the memory may be integrated together or independent of each other.

Figure 39:
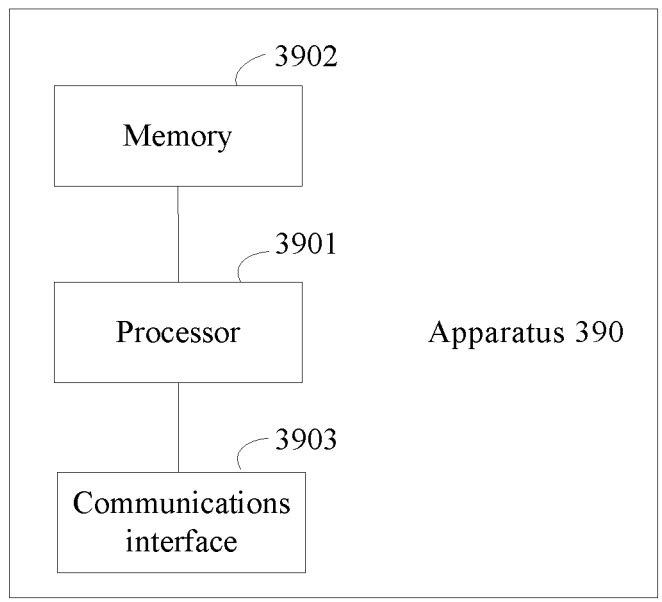
FIG. 39 is a schematic structural diagram of an apparatus for transmitting a DMRS according to an embodiment of this application.

In a simple embodiment, a person skilled in the art may figure out that any one of the apparatus 350 to the apparatus 380 is implemented by a structure shown in FIG. 39.

As shown in FIG. 39, an apparatus 390 may include a memory 3902, a processor 3901, and a communications interface 3903. The memory 3902 is configured to store a computer executable instruction. When the apparatus 390 runs, the processor 3901 executes the computer executable instruction stored in the memory 3902, so that the apparatus 390 performs an information transmission method provided in an embodiment of this application. For a specific information transmission method, refer to related descriptions in the foregoing and the accompanying drawings. Details are not described herein again. The communications interface 3903 may be a transceiver.

Optionally, the apparatus 390 may be a field-programmable gate array (FPGA), an application-specific integrated chip (ASIC), a system on chip (SoC), a central processing unit (CPU), a network processor (NP), a digital signal processing circuit (DSP), or a micro controller (MCU), or may be a programmable controller (PLD) or another integrated chip.

An embodiment of this application further provides a storage medium. The storage medium may include the memory 3902.

An information transmission apparatus provided in an embodiment of this application may be configured to perform the information transmission method. Therefore, for a technical effect that can be achieved by the information transmission apparatus, refer to the foregoing method embodiments. Details are not described again in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions described in the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement other variations of the disclosed embodiments by viewing the accompanying drawings, the disclosed content, and the accompanying claims. In the claims, "comprising" does not exclude other component or other steps, and "a" or "one" does not exclude a case of "a plurality of". A single processor or other units may implement several functions enumerated in the claims. Some measures are recorded in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, this specification and the accompanying drawings are merely example descriptions of this application defined by the accompanying claims, and are considered as any of or all modifications, variations, combinations or equivalents that cover the scope of this application. Apparently, a person skilled in the art can make various modifications and variations to this application without departing from the spirit and scope of this application. In this way, this application is intended to cover these modifications and variations of this application, provided that these modifications and variations fall within the scope defined by the claims of this application and equivalent technologies thereof

What is claimed is:

1. A method for sending a demodulation reference signal (DMRS), comprising:
   determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in frequency domain and is an integer greater than or equal to 1; and
   sending the DMRS by using the time-frequency resource.

2. A method for obtaining a demodulation reference signal (DMRS), comprising:
   determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and obtaining the DMRS by using the time-frequency resource.

3. An indication method, comprising:
generating indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and
sending the indication information.

4. A method for determining a time-frequency resource, comprising:
receiving indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and
determining the time-frequency resource based on the indication information.

5. An apparatus for sending a demodulation reference signal (DMRS), comprising:
at least one processor, and one or more memories coupled to the at least one processor and storing computer instructions for execution by the at least one processor to configure the apparatus for:
determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and
sending the DMRS by using the time-frequency resource.

6. An apparatus for obtaining a demodulation reference signal (DMRS), comprising:
at least one processor, and one or more memories coupled to the at least one processor and storing computer instructions for execution by the at least one processor to configure the apparatus for:
determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than ⌊M/12⌋, M is a quantity of subcarriers of each resource unit in a frequency domain and is an integer greater than or equal to 1; and obtaining the DMRS by using the time-frequency resource.

7. An indication apparatus, comprising:

at least one processor, and one or more memories coupled to the at least one processor and storing computer instructions for execution by the at least one processor to configure the apparatus for:

generating indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than ⌊M/12⌋, M is a quantity of subcarriers of each resource unit in a frequency domain and is an integer greater than or equal to 1; and sending the indication information.

8. An apparatus for determining a time-frequency resource, comprising:

at least one processor, and one or more memories coupled to the at least one processor and storing computer instructions for execution by the at least one processor to configure the apparatus for:

receiving indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than ⌊M/12⌋, M is a quantity of subcarriers of each resource unit in a frequency domain and is an integer greater than or equal to 1; and determining the time-frequency resource based on the indication information.

9. An apparatus for sending a demodulation reference signal (DMRS), comprising:

a processor, configured to determine a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than ⌊M/12⌋, M is a quantity of subcarriers of each resource unit in a frequency domain and is an integer greater than or equal to 1; and a transceiver, configured to send the DMRS by using the time-frequency resource.

10. An apparatus for obtaining a demodulation reference signal (DMRS), comprising:

a processor, configured to determine a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and a transceiver, configured to obtain the DMRS by using the time-frequency resource.

11. An indication apparatus, comprising:

a processor, configured to generate indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and a transceiver, configured to send the indication information.

12. An apparatus for determining a time-frequency resource, comprising:

a transceiver, configured to receive indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and a processor, configured to determine the time-frequency resource based on the indication information.

13. A non-transitory computer storage medium, wherein the computer storage medium stores a computer instruction, and when the computer instruction runs on a computer, the computer performs steps comprising:

determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in frequency domain and is an integer greater than or equal to 1; and sending the DMRS by using the time-frequency resource.

14. A non-transitory computer storage medium, wherein the computer storage medium stores a computer instruction, and when the computer instruction runs on a computer, the computer performs steps comprising:

determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and obtaining the DMRS by using the time-frequency resource.

15. A non-transitory computer storage medium, wherein the computer storage medium stores a computer instruction, and when the computer instruction runs on a computer, the computer performs steps comprising:

generating indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and sending the indication information.

16. A non-transitory computer storage medium, wherein the computer storage medium stores a computer instruction, and when the computer instruction runs on a computer, the computer performs steps comprising:

receiving indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and determining the time-frequency resource based on the indication information.

17. A computer program product, comprising a non-transitory computer readable medium storing computer instructions, wherein when the computer instructions run on a computer, the computer performs steps comprising:

determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in frequency domain and is an integer greater than or equal to 1; and sending the DMRS by using the time-frequency resource.

18. A computer program product, comprising a non-transitory computer readable medium storing computer instructions, wherein when the computer instructions run on a computer, the computer performs steps comprising:

determining a time-frequency resource used to carry a DMRS, wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and obtaining the DMRS by using the time-frequency resource.

19. A computer program product, comprising a non-transitory computer readable medium storing computer instructions, wherein when the computer instructions run on a computer, the computer performs steps comprising:

generating indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and sending the indication information.

20. A computer program product, comprising a non-transitory computer readable medium storing computer instructions, wherein when the computer instructions run on a computer, the computer performs steps comprising:

receiving indication information, wherein the indication information is used to indicate a time-frequency resource used to carry a demodulation reference signal (DMRS), wherein the DMRS is carried in at least one resource unit, wherein a total quantity of system-supported DMRS ports is 6, the six DMRS ports are divided into three DMRS port groups, each DMRS port group comprises two DMRS ports, the three DMRS port groups comprise a first DMRS port group, a second DMRS port group, and a third DMRS port group, and a same time-frequency resource is multiplexed for the DMRS ports in each DMRS port group in a code division multiplexing (CDM) manner, wherein, in each resource unit, a time-frequency resource to which the first DMRS port group is mapped comprises a subcarrier 12n, a subcarrier 12n+1, a subcarrier 12n+6, and a subcarrier 12n+7 that are in a first symbol in time domain, a time-frequency resource to which the second DMRS port group is mapped comprises a subcarrier 12n+2, a subcarrier 12n+3, a subcarrier 12n+8, and a subcarrier 12n+9 that are in the first symbol in time domain, and a time-frequency resource to which the third DMRS port group is mapped comprises a subcarrier 12n+4, a subcarrier 12n+5, a subcarrier 12n+10, and a subcarrier 12n+11 that are in the first symbol in time domain, and wherein n is any one or more integers greater than or equal to 0 and less than $\lfloor M/12 \rfloor$, M is a quantity of subcarriers of each resource unit in a frequency domain and is an integer greater than or equal to 1; and determining the time-frequency resource based on the indication information.

* * * * *